US009692039B2

(12) United States Patent
Holme et al.

(10) Patent No.: US 9,692,039 B2
(45) Date of Patent: Jun. 27, 2017

(54) NANOSTRUCTURED MATERIALS FOR ELECTROCHEMICAL CONVERSION REACTIONS

(71) Applicant: QuantumScape Corporation, San Jose, CA (US)

(72) Inventors: Timothy Holme, Mountain View, CA (US); Jagdeep Singh, Los Gatos, CA (US); Rainer Fasching, Mill Valley, CA (US); Joseph Han, Redwood City, CA (US); Weston Arthur Hermann, Palo Alto, CA (US); Cheng Chieh Chao, Santa Clara, CA (US); Bradley O. Stimson, Monte Sereno, CA (US); Karl Brown, Santa Clara, CA (US)

(73) Assignee: QuantumScape Corporation, San Jose, CA (US)

( * ) Notice: Subject to any disclaimer, the term of this patent is extended or adjusted under 35 U.S.C. 154(b) by 0 days.

(21) Appl. No.: 13/922,214

(22) Filed: Jun. 19, 2013

(65) Prior Publication Data
US 2014/0170493 A1 Jun. 19, 2014

Related U.S. Application Data

(60) Provisional application No. 61/674,961, filed on Jul. 24, 2012, provisional application No. 61/814,821, filed on Apr. 23, 2013.

(51) Int. Cl.
*H01M 4/36* (2006.01)
*H01M 4/04* (2006.01)
(Continued)

(52) U.S. Cl.
CPC ........... *H01M 4/04* (2013.01); *H01M 4/0402* (2013.01); *H01M 4/0423* (2013.01);
(Continued)

(58) Field of Classification Search
CPC ........ H01M 4/363; H01M 4/04; H01M 4/364; H01M 4/0402; H01M 4/0423;
(Continued)

(56) References Cited

U.S. PATENT DOCUMENTS

| 2,722,490 A | 11/1955 | Haynes et al. |
| 2,722,559 A | 11/1955 | Farlow et al. |

(Continued)

FOREIGN PATENT DOCUMENTS

| CN | 101443932 A | 5/2009 |
| CN | 101901936 | 12/2010 |

(Continued)

OTHER PUBLICATIONS

Al-Sharab, J. F., et al. "EELS Compositional and Valence Mapping in Iron Fluoride-Carbon Nanocomposites", Journal of Nanoparticle Research, 15:1500; Mar. 2013, 12 pages.
(Continued)

*Primary Examiner* — Emily Le
*Assistant Examiner* — Seenam Agbetiafan
(74) *Attorney, Agent, or Firm* — Squire Patton Boggs (US) LLP

(57) ABSTRACT

The disclosure is related to battery systems. More specifically, embodiments of the disclosure provide a nanostructured conversion material for use as the active material in battery cathodes. In an implementation, a nanostructured conversion material is a glassy material and includes a metal material, one or more oxidizing species, and a reducing cation species mixed at a scale of less than 1 nm. The glassy conversion material is substantially homogeneous within a volume of 1000 nm$^3$.

17 Claims, 22 Drawing Sheets

(51) Int. Cl.

| | |
|---|---|
| *H01M 4/139* | (2010.01) |
| *H01M 4/62* | (2006.01) |
| *H01M 4/58* | (2010.01) |
| *H01M 4/1395* | (2010.01) |
| *H01M 4/1397* | (2010.01) |
| *H01M 10/0585* | (2010.01) |
| *H01M 6/40* | (2006.01) |
| *H01M 4/02* | (2006.01) |
| *B82Y 30/00* | (2011.01) |
| *H01M 4/70* | (2006.01) |
| *H01M 10/04* | (2006.01) |
| *H01M 10/052* | (2010.01) |
| *H01M 10/0562* | (2010.01) |

(52) U.S. Cl.
CPC ......... *H01M 4/0426* (2013.01); *H01M 4/139* (2013.01); *H01M 4/1395* (2013.01); *H01M 4/1397* (2013.01); *H01M 4/364* (2013.01); *H01M 4/58* (2013.01); *H01M 4/582* (2013.01); *H01M 4/62* (2013.01); *H01M 4/624* (2013.01); *H01M 6/40* (2013.01); *H01M 10/0585* (2013.01); *B82Y 30/00* (2013.01); *H01M 4/0419* (2013.01); *H01M 4/366* (2013.01); *H01M 4/70* (2013.01); *H01M 10/0436* (2013.01); *H01M 10/052* (2013.01); *H01M 10/0562* (2013.01); *H01M 2004/021* (2013.01); *H01M 2004/028* (2013.01); *H01M 2010/0495* (2013.01); *H01M 2220/30* (2013.01); *Y02E 60/122* (2013.01); *Y02P 70/54* (2015.11); *Y10T 29/49108* (2015.01)

(58) Field of Classification Search
CPC ......... H01M 4/139; H01M 4/62; H01M 4/58; H01M 4/0426; H01M 4/1395; H01M 4/1397; H01M 4/582; H01M 4/624; H01M 10/0585; H01M 6/40; H01M 4/0419; H01M 4/366; H01M 2004/028; H01M 2220/30; H01M 4/70; H01M 10/0436; H01M 10/052; H01M 10/0562; Y10T 29/49108; Y02E 60/122; B82Y 30/00

See application file for complete search history.

(56) References Cited

U.S. PATENT DOCUMENTS

| | | |
|---|---|---|
| 3,764,380 A | 10/1973 | Grossman |
| 3,918,988 A | 11/1975 | Abens |
| 4,007,122 A | 2/1977 | Owens et al. |
| 4,127,708 A | 11/1978 | Liang et al. |
| 4,312,718 A | 1/1982 | Watanabe et al. |
| 4,367,267 A | 1/1983 | Oi |
| 4,463,212 A | 7/1984 | Imai |
| 4,476,204 A | 10/1984 | Auborn |
| 4,544,615 A | 10/1985 | Shishikura et al. |
| 4,560,633 A | 12/1985 | Kobayashi et al. |
| 4,589,197 A | 5/1986 | North |
| 4,840,859 A | 6/1989 | Williams et al. |
| 4,845,015 A | 7/1989 | Kurematsu et al. |
| 5,069,764 A | 12/1991 | Watanabe et al. |
| 5,360,686 A | 11/1994 | Peled et al. |
| 5,670,277 A | 9/1997 | Barker et al. |
| 5,744,258 A | 4/1998 | Bai et al. |
| 5,759,720 A | 6/1998 | Amatucci |
| 5,792,574 A | 8/1998 | Mitate et al. |
| 5,824,434 A | 10/1998 | Kawakami et al. |
| 5,965,293 A | 10/1999 | Idota et al. |
| 6,037,095 A | 3/2000 | Miyasaka |
| 6,087,042 A * | 7/2000 | Sugiyama et al. ............ 429/224 |
| 6,168,884 B1 | 1/2001 | Neudecker et al. |
| 6,379,841 B1 | 4/2002 | Potanin et al. |
| 6,413,673 B1 | 7/2002 | Kasai et al. |
| 6,423,131 B1 | 7/2002 | Seeger et al. |
| 6,432,581 B1 | 8/2002 | Amatucci et al. |
| 6,495,481 B1 | 12/2002 | Margaryan |
| 6,517,974 B1 | 2/2003 | Kobayashi et al. |
| 6,645,452 B1 | 11/2003 | Barker et al. |
| 6,680,145 B2 | 1/2004 | Obrovac et al. |
| 6,686,090 B2 | 2/2004 | Inagaki et al. |
| 6,753,112 B2 | 6/2004 | Ooya et al. |
| 6,756,155 B1 | 6/2004 | Kweon et al. |
| 6,835,499 B2 | 12/2004 | Phillips |
| 6,890,686 B1 | 5/2005 | Barker |
| 6,974,486 B1 | 12/2005 | Kweon et al. |
| 7,169,471 B1 | 1/2007 | Dreher et al. |
| 7,371,338 B2 * | 5/2008 | Amatucci .................. 252/518.1 |
| 7,625,671 B2 | 12/2009 | Amatucci |
| 7,947,392 B2 | 5/2011 | Amatucci et al. |
| 8,039,149 B2 | 10/2011 | Amatucci et al. |
| 8,389,160 B2 | 3/2013 | Venkatachalam et al. |
| 8,518,604 B2 | 8/2013 | Amatucci et al. |
| 8,623,549 B2 | 1/2014 | Pereira et al. |
| 8,951,668 B2 | 2/2015 | Pereira et al. |
| 9,065,137 B2 | 6/2015 | Amatucci et al. |
| 9,070,945 B2 | 6/2015 | Amatucci et al. |
| 9,203,082 B2 | 12/2015 | Pereira et al. |
| 2001/0046629 A1 | 11/2001 | Inagaki et al. |
| 2002/0086208 A1 | 7/2002 | Hayashi et al. |
| 2002/0098411 A1 | 7/2002 | Gan et al. |
| 2002/0168573 A1 | 11/2002 | Baker et al. |
| 2003/0013019 A1 | 1/2003 | Barker et al. |
| 2003/0148188 A1 | 8/2003 | Umemoto |
| 2004/0062994 A1 | 4/2004 | Amatucci et al. |
| 2004/0121235 A1 | 6/2004 | Amatucci et al. |
| 2004/0126300 A1 | 7/2004 | Barker et al. |
| 2004/0126659 A1 | 7/2004 | Graetz et al. |
| 2004/0185346 A1 | 9/2004 | Takeuchi |
| 2004/0191633 A1 * | 9/2004 | Johnson et al. ............ 429/246 |
| 2005/0003270 A1 | 1/2005 | Phillips |
| 2005/0136328 A1 | 6/2005 | Eylem et al. |
| 2006/0014078 A1 | 1/2006 | Swoyer et al. |
| 2006/0019163 A1 | 1/2006 | Amatucci et al. |
| 2006/0035147 A1 | 2/2006 | Lam et al. |
| 2006/0199886 A1 | 9/2006 | Ryang |
| 2007/0009800 A1 | 1/2007 | Barker et al. |
| 2007/0188979 A1 | 8/2007 | Takeda et al. |
| 2007/0190414 A1 | 8/2007 | Amatucci et al. |
| 2007/0221635 A1 | 9/2007 | Boulos et al. |
| 2007/0243466 A1 | 10/2007 | Amatucci et al. |
| 2008/0003496 A1 | 1/2008 | Neudecker et al. |
| 2008/0034579 A1 | 2/2008 | Potanin |
| 2008/0102373 A1 | 5/2008 | Potanin |
| 2008/0153002 A1 | 6/2008 | Nazar et al. |
| 2008/0199772 A1 * | 8/2008 | Amatucci et al. ............ 429/188 |
| 2009/0004560 A1 | 1/2009 | Amatucci et al. |
| 2009/0029237 A1 | 1/2009 | Yazami |
| 2009/0087362 A1 | 4/2009 | Sun et al. |
| 2010/0159324 A1 | 6/2010 | Irvin et al. |
| 2010/0210453 A1 | 8/2010 | Hu et al. |
| 2010/0323098 A1 | 12/2010 | Kosuzu et al. |
| 2011/0065001 A1 | 3/2011 | Pereira et al. |
| 2011/0200883 A1 | 8/2011 | Cui et al. |
| 2012/0009469 A1 | 1/2012 | Visco et al. |
| 2012/0032118 A1 | 2/2012 | Fichtner et al. |
| 2012/0056470 A1 | 3/2012 | Kim |
| 2012/0077082 A1 | 3/2012 | Se-Hee et al. |
| 2012/0171469 A1 | 7/2012 | Shmyreva |
| 2012/0225356 A1 | 9/2012 | Wietelmann |
| 2012/0263998 A1 * | 10/2012 | Thackeray et al. ............ 429/156 |
| 2013/0048924 A1 | 2/2013 | Amatucci et al. |
| 2013/0177821 A1 | 7/2013 | Tsuchida et al. |
| 2013/0224594 A1 | 8/2013 | Yushin |
| 2013/0236764 A1 | 9/2013 | Hu |
| 2013/0302682 A1 | 11/2013 | Amatucci et al. |
| 2013/0335030 A1 | 12/2013 | Joe |
| 2013/0344391 A1 * | 12/2013 | Yushin et al. ............ 429/231.8 |
| 2014/0117291 A1 | 5/2014 | Amatucci et al. |

(56) References Cited

U.S. PATENT DOCUMENTS

| | | |
|---|---|---|
| 2015/0207140 A1 | 7/2015 | Amatucci et al. |
| 2015/0236341 A1 | 8/2015 | Amatucci et al. |

FOREIGN PATENT DOCUMENTS

| | | |
|---|---|---|
| DE | 39 30 804 | 3/1991 |
| EP | 0 149 421 | 7/1985 |
| EP | 0 651 450 A1 | 5/1995 |
| EP | 0 938 147 | 8/1999 |
| EP | 1 049 182 | 11/2000 |
| EP | 1 914 823 B1 | 2/2010 |
| EP | 1540752 B1 | 3/2010 |
| EP | 20030788901 B1 | 8/2010 |
| EP | 2 615 057 A1 | 7/2013 |
| EP | 2 816 639 A2 | 12/2014 |
| JP | 08138635 | 5/1996 |
| JP | 2008-527652 | 7/2008 |
| JP | 2009-529222 | 8/2009 |
| JP | 2013-073792 A | 4/2013 |
| KR | 2001063879 | 7/2001 |
| WO | WO 01/63879 A1 | 8/2001 |
| WO | WO 02/097907 A2 | 12/2002 |
| WO | WO 2004/034489 A2 | 4/2004 |
| WO | WO 2006/026773 A2 | 3/2006 |
| WO | WO 2006/078472 A3 | 7/2006 |
| WO | WO 2006/137903 A3 | 12/2006 |
| WO | WO 2007/146453 A2 | 12/2007 |
| WO | 2008/095197 A2 | 8/2008 |
| WO | WO 2009/143324 A1 | 11/2009 |
| WO | WO 2011/057263 | 5/2011 |
| WO | WO 2013/133906 A2 | 9/2013 |
| WO | 2013/192205 A1 | 12/2013 |
| WO | WO 2014/159545 A1 | 10/2014 |
| WO | WO 2015/130831 A1 | 9/2015 |

OTHER PUBLICATIONS

Amatucci, G. G., et al. "Formation of Lithium Fluoride/Metal Nanocomposites for Energy Storage through Solid State Reduction of Metal Fluorides", Journal of Fluorine Chemistry, 2011, vol. 132, pp. 1086-1094.

Arai, H., "Cathode Performance and Voltage Estimation of Metal Trihalides", Journal of Power Sources, 68, 1997, p. 716-719.

Arai, H., et al. "Characterization and Cathode Performance of Li1-xNi1+xO2 Prepared with the Excess Lithium Method", Solid State Ionics 80, 1995, pp. 261-269.

Badway, F., et al. "Carbon Metal Fluoride Nanocomposites: High-Capacity Reversible Metal Fluoride Conversion Materials as Rechargeable Positive Electrodes for Li Batteries", Journal of the Electrochemical Society, vol. 150, Issue 10, 2003, pp. A1318-A1327.

Badway, F., et al. "Structure and Electrochemistry of Copper Fluoride Nanocomposites Utilizing Mixed Conducting Matrices", Chemistry of Materials, 2007, vol. 19 (17), pp. 4129-4141.

Behl, W. K., and Read, J. A. "A Study of Cobalt and Manganese Fluorides as Cathode Materials for Rechargeable Lithium Cells", ECS Transactions, 2012, vol. 41, Issue 41, pp. 97-106.

Bervas, M., et al. "Investigation of the Lithiation and Delithiation Conversion Mechanisms of Bismuth Fluoride Nanocomposites", Journal of the Electrochemical Society, 2006, vol. 153, Issue 4, pp. A799-A808.

Cabana, J., et al. "Beyond Intercalation-Based Li-Ion Batteries: The State of the Art and Challenges of Electrode Materials Reacting Through Conversion Reactions", Advanced Materials, vol. 22, Issue 35, Sep. 15, 2010, pp. E170-E192.

Chevrier, V. L., et al. "First-Principles Study of Iron OxyFluorides and Lithiation of FeOF", Physical Review B 87, 094118, Mar. 29, 2013, 9 pages.

Cui, Y., et al. "The Investigation on Electrochemical Reaction Mechanism of CuF2 Thin Film with Lithium", Electrochimica Acta, 2011, vol. 56, pp. 2328-2335.

Doe, R., et al. "First Principles Investigation of Li—Fe—F Phase diagram and Equilibrium and Nonequilibrium Conversion Reactions of Iron Fluorides with Lithium", Chemistry of Materials, 2008, vol. 20, No. 16, pp. 5274-5283.

Doe, R., et al. "First Principles Study of Li—Bi—F Phase Diagram and Bismuth Fluoride Conversion Reactions with Lithium", Electrochemical and Solid State Letters, 2009, vol. 12(7), pp. A125-A128.

Ezema, F. I. and Nnabuchi, M. N. "Optical Properties of Chemical Bath Deposited Bismuth Fluoride (Bif3) Thin Films", Discovery and Innovation vol. 19 (1), 2007, pp. 33-36.

Fu, Z.W., et al. "Electrochemical Reaction of Lithium with Cobalt Fluoride Thin Film Electrode", Journal of the Electrochemical Society, 2005, vol. 152, Issue 2, pp. E50-E55.

Gmitter, A. J., et al. "Electrolyte Development for Improved Cycling Performance of Bismuth Fluoride Nanocomposite Positive Electrodes", Journal of Power Sources vol. 217, 2012, pp. 21-28.

Gmitter, A. J., et al. "Formation, Dynamics, and Implication of Solid Electrolyte Interphase in High Voltage Reversible Conversion Fluoride Nanocomposites", Journal of Materials Chemistry, vol. 20, No. 20, May 28, 2010, p. 3997-4232.

Gocheva, I.D., et al. "Direct Synthesis of Cryolite Type Li3FeF6 and Its Characterization as Positive Electrode in Li Cell", Engineering Sciences Reports, Kyushu University, vol. 31, No. 1, Apr. 2009, pp. 7-11.

Johnson, Z., et al. "Advanced FeF3 Cathode Enabled Lithium-ion Battery", SAE International Journal of Aerospace, Apr. 2009, vol. 1, No. 1, pp. 1018-1023.

Kim, S., et al. "Fabrication of FeF3 Nanoflowers on CNT Branches and Their Application to High Power Lithium Rechargeable Batteries", Advanced Materials, 2010, vol. 22, pp. 5260-5264.

Larcher, D., et al. "Effect of Particle Size on Lithium Intercalation into $\alpha$-Fe2O3", Journal of the Electrochemical Society, 2003, vol. 150 (1), pp. A133-A139.

Lee, D. H., et al. "Conversion Mechanism of Nickel Fluoride and NiO-Doped Nickel Fluoride in Li Ion Batteries", Electrochimica Acta, 2012, vol. 59, pp. 213-221.

Li, C., et al. "A Mesoporous Iron-Based Fluoride Cathode of Tunnel Structure for Rechargeable Lithium Batteries", Advanced Functional Materials, 2011, vol. 27, pp. 1391-1397.

Li, C., et al. "Carbon Nanotube Wiring of Electrodes for High-Rate Lithium Batteries Using an Imidazolium-Based Ionic Liquid Precursor as Dispersant and Binder: A Case Study on Iron Fluoride Nanoparticles", ACS Nano, 2011, vol. 5, Issue 4, pp. 2930-2938.

Li, C., et al. "Low-Temperature Ionic-Liquid-Based Synthesis of Nanostructured Iron-Based Fluoride Cathodes for Lithium Batteries", Advanced Materials, 2010, vol. 22, pp. 3650-3654.

Li, L., et al. "High-Capacity Lithium-Ion Battery Conversion Cathodes Based on Iron Fluoride Nanowires and Insights into the Conversion Mechanism", Nano Letters, vol. 12 (11), pp. 6030-6037.

Li, R. F., et al. "Structural and Electronic Properties of Li-Ion Battery Cathode Material FeF3", The Journal of Physical Chemistry C, 2010, vol. 114(39), pp. 16813-16817.

Li, T., et al. "Reversible Three-Electron Redox Behaviros of FeF3 Nanocrystals as High-Capacity Cathode-Active Materials for Li-Ion Batteries", Journal of Physical Chemistry C, Feb. 25, 2010, vol. 114, Issue 7, pp. 3190-3195.

Liao, P., et al. "Combinatorially Prepared [LiF]1—xFex Nanocomposites for Positive Electrode Materials in Li-Ion Batteries", Chemistry of Materials, 2008, vol. 20 (2), pp. 454-461.

Liu, L., et al. "Excellent Cycle Performance of Co-doped FeF3/C Nanocomposite Cathode Material for Lithium-Ion Batteries", Journal of Materials Chemistry, 2012, Issue 22, pp. 17539-17550.

Liu, P., et al. "Thermodynamics and Kinetics of the Li/FeF3 Reaction by Electrochemical Analysis", The Journal of Physical Chemistry C, 2012, vol. 116(10), pp. 6467-6473.

Ma, Y. and Garofalini, S. H. "Atomistic Insights into the Conversion Reaction in Iron Fluoride: A Dynamically Adaptive Force Field Approach", Journal of the Amerian Chemical Society, 2012, vol. 132, pp. 8205-8211.

Ma, D., et al. "Three-Dimensionally Ordered Macroporous FeF3 and its in situ Homogenous Polymerization Coating for High

(56) References Cited

OTHER PUBLICATIONS

Energy and Power Density Lithium Ion Batteries", Energy & Environmental Science, 2012, 5, pp. 8538-8542.
Makimura, Y., et al. "Electrochemical behavior of low temperature grown iron fluoride thin films", Electrochemistry Communications, 2006, vol. 8, pp. 1769-1774.
Makimura, Y, et al. "Pulsed Laser Deposited Iron Fluoride Thin Films for Lithium-Ion Batteries", Applied Surface Science 252 (2006), p. 4587-4592.
Mansour, A.N., et al. "In Situ X-ray Absorption Spectroscopic Investigation of the Electrochemical Conversion Reactions of $CuF_2$—$MoO_3$ Nanocomposite", Journal of Solid State Chemistry, 2010, vol. 183, pp. 3029-3038.
Naghash, A. R. and Lee, J. Y. "Lithium Nickel Oxyfluoride ($Li1-zNi1+zFyO2-y$) and Lithium Magnesium Nickel Oxide ($Li1-z(MgxNi1-x)1+zO2$) Cathodes for Lithium Rechargeable Batteries: Part I. Synthesis and Characterization of Bulk Phases", Electrochimica Acta, 2001, vol. 46, pp. 941-951.
Nishijima, M., et al. "Cathode Properties of Metal Trifluorides in Li and Na Secondary Batteries", Journal of Power Sources, 2009, vol. 190, pp. 552-562.
Parkinson, M. F., et al. "Effect of Vertically Structured Porosity on Electrochemical Performance of $FeF_2$ Films for Lithium Batteries", Electrochemica Acta, Apr. 2014, vol. 125, p. 71-82.
Pereira, N., et al. "Iron Oxyfluorides as High Capacity Cathode Materials for Lithium Batteries", Journal of the Electrochemical Society, 2009, vol. 156 (6), pp. A407-A416.
Plitz, I., et al. "Structure and Electrochemistry of Carbon-Metal Fluoride Nanocomposites Fabricated by Solid-State Redox Conversion Reaction", Journal of the Electrochemical Society, 152 (2), 2005, A307-A315.
Polzot, P., et al. "Nano-sized Transition-Metal Oxides as Negative-Electrode Materials for Lithium-Ion Batteries", Letters to Nature, Sep. 28, 2000, vol. 407, pp. 496-499.
Prakash, R., et al. "A Ferrocene-Based Carbon-Iron Lithium Fluoride Nanocomposite as a Stable Electrode Material in Lithium Batteries", Journal of Materials Chemistry, 2010, vol. 20, pp. 1871-1876.
Prakash, R., et al. "Modified Synthesis of [FE/LiF/C] Nanocomposite, and its Application as Conversion Cathode Material in Lithium Batteries", Journal of Power Sources, 196, 2011, p. 5936-5944.
Rangan, S., et al. "Conversion Reaction of $FeF_2$ Thin Films Upon Exposure to Atomic Lithium", Journal of Physical Chemistry, 2012, vol. 116 (19), pp. 10498-10503.
Rangan, S., et al. "Electronic Structure and Chemical Composition of Candidate Conversion Material Iron Oxifluoride", $220^{th}$ ECS Meeting, Nov. 3, 2011, Abstract only, 3 pages.
Reddy, M. A. and Fichtner, M. "Batteries Based on Fluoride Shuttle", Journal of Materials Chemistry, 2011, vol. 21, pp. 17059-17062.
Reddy, M. A., et al. "CFx Derived Carbon-$FeF_2$ Nanocomposites for Reversible Lithium Storage", Advanced Energy Materials, vol. 3, Issue 3, Mar. 2013, pp. 308-313.
Sharafat, S., and Ghodiem, N. M. "Chemical Compatibility of Structural Materials with Liquid Li and Sn-Li", APEX Meeting, May 10-12, 2000, Argonne National Laboratory, 31 pages.
Shearer-Turrell, S., et al. "Structural Studies of Iron Hexafluorides: Infrared Spectra of $M_3FeF_6$ (M=Li, Na, K, Rb, Cs, Ag, Ti)", Journal of Molecular Structure, 1971, vol. 7, pp. 289-300.
Tressaud, et al. "Les Hesxafluoferrites $M_3FeF_6$ (M=Li, Na, K, Rb, Cs, Ag, Ti, $NH_4$): Etude Radiocristallo-graphique, Spectroscopique et Magnetique", Journal of Inorganic and Nuclear Chemistry, 1970, vol. 32, pp. 2179-2186.
Wang, F., et al. "Conversion Reaction Mechanisms in Lithium Ion Batteries: Study of the Binary Metal Fluoride Electrodes", Journal of the American Chemical Society, vol. 133 (46), pp. 18828-18836.
Wang, F., et al. "Ionic and Electronic Transport in Metal Fluoride Conversion Electrodes", Northeastern Center for Chemical Energy Storage, PRiME 2012, 222nd Meeting Electrochemical Society, Oct. 9, 2012, 23 pages.
Wang, F., et al. "Tracking Lithium Transport and Electrochemical Reactions in Nanoparticles", Nature Communications, vol. 3, Nov. 13, 2012, 8 pages.
Wiaderek, K. M., et al. "Comprehensive Insights into the Structural and Chemical Changes in Mixed-Anion FeOF Electrodes by Using Operando PDF and NMR Spectroscopy", Journal of the American Chemical Society, Jan. 8, 2013, 9 pages.
Yamakawa, N., et al. "Identifying the Local Structures Formed During Lithiation of the Conversion Material, Iron Fluoride, in a Li Ion Battery: A Solid-State NMR, X-ray Diffraction, and Pair Distribution Function Analysis Study", Journal of American Chemical Society, 131, 2009, p. 10525-10536.
Yamakawa, N., et al. "Investigation of the Conversion Reaction Mechanisms for Binary Copper (II) Compounds by Solid-State NMR Spectroscopy and X-ray Diffraction", Chemistry of Materials, 2009, vol. 21, pp. 3162-3176.
Yan-Hua, C., et al. "Electrochemical Properties of $MnF_2$ Films Fabricated by Pulsed Laser Deposition", Journal of Inorganic Material, vol. 25, No. 2, Feb. 2010, 6 pages.
Yang, Z., et al. "First Principles Study on the Structural, Magnetic and Electronic Properties of Co-doped $FeF_3$", Computational and Theoretical Chemistry, 2012, vol. 980, pp. 44-48.
Yao, W., et al. "Multilayered Cobalt Oxide Platelets for Negative Electrode Material of a Lithium-Ion Battery", Journal of the Electrochemical Society, 2008, vol. 155, Issue 12, pp. A903-A908.
Zhang, H., et al. "Nanostructured Nickel Fluoride Thin Film as a New Li Storage Material", Solid State Sciences, 2008, vol. 10, pp. 1166-1172.
Zhang, W., et al. "Synthesis and Characterization of in Situ $Fe_2O_3$-Coated $FeF_3$ Cathode Materials for Rechargeable Lithium Batteries", Journal of Materials Chemistry, 2012, vol. 22, pp. 24769-24775.
Zhou, M., et al. "Thermal Stability of $FeF_3$ Cathode for Li-ion batteries", Journal of Power Sources, 195, 2010, p. 4952-4956.
Zhou, Y., et al. "LiF/Co Nanocomposite as a New Li Storage Material", Electrochemical and Solid-State Letters, vol. 9, No. 3, 2006, p. A147-A150.
Zu, C. and Li, H. "Thermodynamic Analysis on Energy Densities of Batteries", Energy & Environmental Science, 2011, vol. 4, pp. 2614-2624.
"Cathode performance and voltage estimation of metal trihalides", by Hajime Arai, Shigeto Okada, Yoji Sakurai, Jun-ichi Yamaki, issued on "Journal of Power Sources 68 (1997)".
"Characterization and cathode performance of Li 1-x,Ni 1 +X O2 prepared with the excess lithium method", by H. Arai, S. Okada, H. Ohtsuka, M. Ichimura, J. Yamaki, issue on "Solid State Ionics 80 (1995)".
"High-Capacity Reversible Metal Fluoride Conversion Materials as Rechargeable Positive Electrodes for Li Batteries", by F. Badway, F. Cosandey, N. Pereira, and G. G. Amatucci, issued on "Journal of the Electrochemical Society".
"Electrolyte development for improved cycling performance of bismuth fluoride nanocomposite positive electrodes", by Andrew J. Gmitter, John Gural, Glenn G. Amatucci, issued on "Journal of Power Sources".
"Investigation of the Lithiation and Delithiation Conversion Mechanisms of Bismuth Fluoride Nanocomposites", by M. Bervas, A. N. Mansour, W.-S. Yoon, J. F. Al-Sharab, F. Badway, F. Cosandey, L. C. Klein and G. G. Amatucci, issue on "Journal of the Electrochemical Society".
"Optical Properties of Chemical Bath Deposited Bismuth Fluoride (Bif3) Thin Films", by Ezema F. I. and M. N. Nnabuchi, issued on "Discov. Innov., 2007; 19 (1)".
"First-principles study of iron oxyfluorides and lithiation of FeOF", by Vincent L. Chevrier, Geoffroy Hautier, Shyue Ping Ong, Robert E. Doe, and Gerbrand Ceder, issued on "Physical Review B 87, 094118 (2013)".
"CFx Derived Carbon-FeF 2 Nanocomposites for Reversible Lithium Storage", by M. Anji Reddy , Ben Breitung , Venkata Sai

(56) References Cited

OTHER PUBLICATIONS

Kiran Chakravadhanula, Clemens Wall, Michael Engel, Christian Kübel, Annie K. Powell, Horst Hahn, and Maximilian Fichtner, issued on "Advanced Energy Materials".
"A Study of Cobalt and Manganese Fluorides as Cathode Materials for Rechargeable Lithium Cells", by Wishvender K. Behl and Jeffrey A. Read, issued on "ECS Transactions, 41 (41) 97-106 (2012)".
"First principles study on the structural, magnetic and electronic properties of Co-doped FeF3", by Zhenhua Yang, Yong Pei, Xianyou Wang, Li Liu, Xuping Su, issued on "Computational and Theoretical Chemistry 980 (2012) 44-48".
"Electrochemical Reaction of Lithium with Cobalt Fluoride Thin Film Electrode", by Zheng-Wen Fu, Chi-Lin Li, Wen-Yuan Liu, Jun Ma, Ying Wang, and Qi-Zong Qin, issued on "Journal of the Electrochemical Society, 152 (2) E50-E55 (2005)".
"Conversion Reaction of FeF2 Thin Films upon Exposure to Atomic Lithium", by Sylvie Rangan, Ryan Thorpe, Robert Allen Bartynski, Mahsa Sina, Frederic Cosandey, Ozgur Celik, and Daniel D. T. Mastrogiovanni, issued on "The Journal of Physical Chemistry C".
"Multilayered Cobalt Oxide Platelets for Negative Electrode Material of a Lithium-Ion Battery", by Wenli Yao, Jun Yang, Jiulin Wang, and Yanna Nuli, issued on "Journal of the Electrochemical Society, 155 (12) A903-A908 (2008)".
"Structure and Electrochemistry of Copper Fluoride Nanocomposites Utilizing Mixed Conducting Matrices", by F. Badway, A. N. Mansour, N. Pereira, J. F. Al-Sharab, F. Cosandey, Plitz, and G. G. Amatucci, issued on "Chem. Mater. 2007, 19, 4129-4141".
"In situ X-ray absorption spectroscopic investigation of the electrochemical conversion reactions of CuF2—MoO3 nanocomposite", by A.N. Mansour, F.Badway, W.-S.Yoon, K.Y. Chung, G.G.Amatucci, issued on "Journal of Solid State Chemistry 183 (2010) 3029-3038".
"The investigation on electrochemical reaction mechanism of CuF2 thin film with lithium", by Yan-Hua Cuia, Ming-Zhe Xue, Yong-Ning Zhou, Shu-Ming Peng, Xiao-Lin Wang, Zheng-Wen Fu, issued on "Electrochimica Acta 56 (2011) 2328-2335".
"Conversion Reaction Mechanisms in Lithium Ion Batteries: Study of the Binary Metal Fluoride Electrodes", by Feng Wang, Rosa Robert, Natasha A. Chernova, Nathalie Pereira, Fredrick Omenya, Fadwa Badway,Xiao Hua, Michael Ruotolo, Ruigang Zhang, Lijun Wu, Vyacheslav Volkov, Dong Su, Baris Key, M. Stanley Whittingham, Clare P. Grey, Glenn G. Amatucci, Yimei Zhu, and Jason Graetz, issued on "Journal of the American Chemical Society".
"Investigation of the Conversion Reaction Mechanisms for Binary Copper(II) Compounds by Solid-State NMR Spectroscopy and X-ray Diffraction", by Naoko Yamakawa, Meng Jiang, and Clare P. Grey, issued on "Chem. Mater. 2009, 21, 3162-3176".
"Beyond Intercalation-Based Li-Ion Batteries: The State of the Art and Challenges of Electrode Materials Reacting Through Conversion Reactions", by Jordi Cabana, Laure Monconduit, Dominique Larcher, and M. Rosa Palacín, issued on "Advanced Energy Materials".
"Ionic and electronic transport in metal fluoride conversion electrodes", by Feng Wang, Nathalie Pereira, Glenn Amatucci, Hui-Chia Yu, Anton Van der Ven, Katsuyo Thornton, Yimei Zhu and Jason Graetz, issued on "222nd Meeting Electrochemical Society".
"Batteries based on fluoride shuttle", by M. Anji Reddy and M. Fichtner, issued on "Journal of Materials Chemistry".
"Synthesis and characterization of in situ Fe2O3-coated FeF3 cathode materials for rechargeable lithium batteries", by Wei Zhang, Lin Ma, Hongjun Yue and Yong Yang, issued on "Journal of Materials Chemistry".
"Effect of Particle Size on Lithium Intercalation into a-Fe2O3", by D. Larcher, C. Masquelier, D. Bonnin, Y. Chabre, V. Masson, J.-B. Leriche, and J.-M. Tarascon, issued on "Journal of The Electrochemical Society, 150 (1) A133-A139 (2003)".
"Electronic Structure and Chemical Composition of Candidate Conversion Material Iron Oxifluoride", by Sylvie Rangana, Ryan Thorpea, Robert A. Bartynskia, Ozgur Celikb, Nathalie Pereirac and Glenn Amatucci, issued on "220th ECS Meeting".
"Tracking lithium transport and electrochemical reactions in nanoparticles", by Feng Wang, Hui-Chia Yu, Min-Hua Chen, Lijun Wu, Nathalie Pereira, Katsuyo Thornton, Anton Van der Ven, Yimei Zhu, Glenn G. Amatucci & Jason Graetz, issued on "Nature Communications".
"Three-dimensionally ordered macroporous FeF3 and its in situ homogenous polymerization coating for high energy and power density lithium ion batteries", by De-long Ma, Zhan-yi Cao, Heng-guo Wang, Xiao-lei Huang, Li-min Wang and Xin-bo Zhang, issued on "Energy & Environmental Science".
"Fabrication of FeF3 Nanoflowers on CNT Branches and Their Application to High Power Lithium Rechargeable Batteries", by Sung-Wook Kim, Dong-Hwa Seo, Hyeokjo Gwon, Jongsoon Kim, and Kisuk Kang, issued on "Advanced Materials".
"Excellent Cycle Performance of Co-doped FeF3/C nanocomposite Cathode material for Lithium-Ion Batteries", by Li Liu, Meng Zhou, Lanhua Yi, Haipeng Guo, Jinli Tan, Hongbo Shu, Xiukang Yang, Zhenhua Yang, Xianyou Wang, issued on "Journal of Materials Chemistry".
"Advanced FeF3 Cathode Enabled Lithium-ion Battery", by Za Johnson, Stephen Cordova and G. G. Amatucci, issued on "SAE International".
"Structural and Electronic Properties of Li-Ion Battery Cathode Material FeF3", by R. F. Li, S. Q. Wu, Y. Yang, and Z. Z. Zhu, issued on "J. Phys. Chem. C 2010, 114, 16813-16817".
"High-Capacity Lithium-Ion Battery Conversion Cathodes Based on Iron Fluoride Nanowires and Insights into the Conversion Mechanism", by Linsen Li, Fei Meng, and Song Jin, issued on "Nano Letters".
"Thermodynamics and Kinetics of the Li/FeF3 Reaction by Electrochemical Analysis", Ping Liu, John J. Vajo, John S. Wang, Wen Li, and Jun Liu, issued on "The Journal of Physical Chemistry C".
"A ferrocene-based carbon-iron lithium fluoride nanocomposite as a stable electrode material in lithium batteries", by Raju Prakash, Ajay Kumar Mishra, Arne Roth, Christian Kubel, Torsten Scherer, Mohammad Ghafari, Horst Hahn and Maximilian Fichtner, issued on "Journal of Materials Chemistry".
"Iron Oxyfluorides as High Capacity Cathode Materials for Lithium Batteries", by N. Pereira, z F. Badway, M. Wartelsky, S. Gunn, and G. G. Amatucci, issued on "Journal of the Electrochemical Society, 156 (6) A407-A416 (2009)".
"Chemical Compatibility of Structural Materials with Liquid Li and Sn-Li", by S. Sharafat and N. M. Ghoniem, issued on APEX Meeting.
"Thermodynamic analysis on energy densities of batteries", by Chen-Xi Zu, Hong Li, issued on "Energy & Environmental Science".
"Effect of Vertically Structured Porosity on Electrochemical Performance of FeF2 Films for Lithium Batteries", by Matthew F. Parkinson, Jonathan K. Ko, Anna Halajko, Sheel Sanghvi, and Glenn G. Amatucci.
"Low-Temperature Ionic-Liquid-Based Synthesis of Nanostructured Iron-Based Fluoride Cathodes for Lithium Batteries", by Chilin Li, Lin Gu, Susumu Tsukimoto, Peter A. van Aken, and Joachim Maier, issued on "Advanced Energy Materials".
"Reversible Three-Electron Redox Behaviors of FeF3 Nanocrystals as High-Capacity Cathode-Active Materials for Li-Ion Batteries", by Ting Li, Lei Li, Yu L. Cao, Xin P. Ai, and Han X. Yang, issued on "J. Phys. Chem. C 2010, 114, 3190-3195".
"Carbon Nanotube Wiring of Electrodes for High-Rate Lithium Batteries Using an Imidazolium-Based Ionic Liquid Precursor as Dispersant and Binder: A Case Study on Iron Fluoride Nanoparticles", by Chilin Li, Lin Gu, Jianwei Tong, and Joachim Maier, issued on "ACS NANO".
"Direct synthesis of Cryolite type Li3FeF6 and its characterization as positive electrode in Li cell", by Gocheva, Irina D; Kamimura, Yuichi; Doi, Takayuki; Okada, Shigeto; Yamaki, Juna'ichi; Nishida, Tetsuaki, issued on "Engineering sciences reports, Kyushu University ∥ 31(1) ∥ p. 7-11".

(56) References Cited

OTHER PUBLICATIONS

"Structural Studies of Iron Hexafluorides: Tnfrared Spectra of M3FeF6 (M =Li, Na, K, Rb, Cs, Ag, Ti)", by Sylvia Shearer-Turrell, Alain Tressaud and Josik Portier, issued on "Journal of Molecular Structure".
"Les Hexafluoferrites MzFeF6 (M=Li, Na, K, Rb, Cs, Ag, Tl, NH4): Etude Radiocristallographique, Spectroscopique et Magnetique", by Alain Tressaud, Josik Portier, Sylvia Shearer-Turrell, Jean-Louis Dupin et Paul Hagenmuller, issued on "J.inorg. nucl. Chem.,1970, vol. 32,pp. 2179-2186".
"Formation of lithium fluoride/metal nanocomposites for energy storage through solid state reduction of metal fluorides", by G.G. Amatucci, N. Pereira 1, F. Badway, M. Sina, F. Cosandey, M. Ruotolo, C. Cao, issued on "Journal of Fluorine Chemistry".
"Combinatorially Prepared [LiF]1-xFex Nano composites for Positive Electrode Materials in Li-Ion Batteries" , by Peng Liao, Bretton L. MacDonald, R. A. Dunlap,† ‡ and J. R. Dahn, issued on "*Chem. Mater*. 2008, 20, 454-461".
"First Principles Study of the Li—Bi—F Phase Diagram and Bismuth Fluoride Conversion Reactions with Lithium" by Robert E. Doe, Kristin A. Persson, Geoffroy Hautier, and Gerbrand Ceder, issued on "Electrochemical and Solid-State Letters, 12 (7) A125-A128 (2009)".
"Nano-sizedtransition-metaloxidesas negative-electrode materials for lithium-ion batteries", by P. Poizot, S. Laruelle, S. Grugeon, L. Dupont & J-M. Tarascon, issued on "Nature |vol. 407 | Sep. 28, 2000".
"First-Principles Investigation of the Li—Fe—F Phase Diagram and Equilibrium and Nonequilibrium Conversion Reactions of Iron Fluorides with Lithium", by Robert E. Doe, Kristin A. Persson, Y. Shirley Meng, and Gerbrand Ceder, issued on "Chem. Mater. 2008, 20, 5274-5283".
"Atomistic Insights into the Conversion Reaction in Iron Fluoride: A Dynamically Adaptive Force Field Approach", by Ying Ma and Stephen H. Garofalini, issued on "Journal of the American Chemical Society".
"Cathode properties of metal trifluorides in Li and Na secondary batteries", by Manabu Nishijima, Irina D. Gocheva, Shigeto Okada, Takayuki Doi, Jun-ichi Yamaki, Tetsuaki Nishida, issued on "Journal of Power Sources 190 (2009) 558-562".
"A Mesoporous Iron-Based Fluoride Cathode of Tunnel Structure for Rechargeable Lithium Batteries", by Chilin Li , Lin Gu , Jianwei Tong , Susumu Tsukimoto , and Joachim Maier, issued on "Adv. Funct. Mater. 2011, 21, 1391-1397".
"Lithium nickel oxyfluoride (Li1-zNi1+z F O2-y) and lithium magnesium nickel oxide (Li1-z-(Mg-x-Ni1-x)1+zO2) cathodes for lithium rechargeable batteries", by A.R. Naghash, Jim Y. Lee, issued on "Electrochimica Acta 46 (2001) 941-951".
"Conversion mechanism of nickel fluoride and NiO-doped nickel fluoride in Li ion batteries", by Dae Hoe Leea, Kyler J. Carroll, Scott Calvin, Sungho Jin, Ying Shirley Meng, issued on "Electrochimica Acta 59 (2012) 213-221".
"Nanostructured nickel fluoride thin film as a new Li storage material", by Hua Zhang, Yong-Ning Zhou, Qian Sun, Zheng-Wen Fu, issued on "Solid State Sciences 10 (2008) 1166-1172".
"Electrochemical behaviour of low temperature grown iron fluoride thin films", by Y. Makimura, A. Rougier, L. Laffont, M. Womes, J.-C. Jumas, J.-B. Leriche, J.-M. Tarascon, issued on "Electrochemistry Communications 8 (2006) 1769-1774".
"Pulsed laser deposited iron fluoride thin films for lithium-ion batteries", by Yoshinari Makimura, Aline Rougier, Jean-Marie Tarascon, issued on "Applied Surface Science 252 (2006) 4587-4592".
"Structure and Electrochemistry of Carbon-Metal Fluoride Nanocomposites Fabricated by Solid-State Redox Conversion Reaction", by I. Plitz, F. Badway, J. Al-Sharab, A. DuPasquier, F. Cosandey, and G. G. Amatucci, issued on "Journal of the Electrochemical Society, 152 (2) A307-A315 (2005)".
"Modified synthesis of [Fe/LiF/C] nanocomposite, and its application as conversion cathode material in lithium batteries", by Raju Prakash, Clemens Wall, Ajay Kumar Mishra, Christian Kubel, Mohammad Ghafari, Horst Hahn, Maximilian Fichtner, issued on "Journal of Power Sources 196 (2011) 5936-5944".
"Formation, dynamics, and implication of solid electrolyte interphase in high voltage reversible conversion fluoride nanocomposites", by Andrew J. Gmitter, Fadwa Badway, Sylvie Rangan, Robert A. Bartynski, Anna Halajko, Nathalie Pereiraa and Glenn G. Amatucci, issued on "J. Mater. Chem., 2010, 20, 4149-4161".
"Thermal stability of FeF3 cathode for Li-ion batteries", by Mingjiong Zhoua, Liwei Zhao, Takayuki Doi, Shigeto Okada, Jun-ichi Yamaki, issued on "Journal of Power Sources 195 (2010) 4952-4956".
"Identifying the Local Structures Formed during Lithiation of the Conversion Material, Iron Fluoride, in a Li Ion Battery: A Solid-State NMR, X-ray Diffraction, and Pair Distribution Function Analysis Study", by Naoko Yamakawa, Meng Jiang, Baris Key, and Clare P. Grey, issued on "J. Am. Chem. Soc. 2009, 131, 10525-10536".
"Electrochemical Properties of MnF2 Films Fabricated by Pulsed Laser Deposition", by Cui Yan-Hua, Xue Ming-Zhe, Hu Ke, Li Da, Wang Xiao-Lin, Su Wei, Liu Xiao-Jiang, Meng Fan-Ming, Fu Zheng-Wen, issued on "Journal of Inorganic Material".
"LiF/Co Nanocomposite as a New Li Storage Material", by Yongning Zhou, Wenyuan Liu, Mingzhe Xue, Le Yu, Changliang Wu, Xiaojing Wu, and Zhengwen Fu, issued on "*Electrochemical and Solid-State Letters*, 9 (3) A147-A150 (2006)".
Office Action mailed Sep. 24, 2014 in U.S. Appl. No. 14/318,677, 16 pages.
Extended European Search Report mailed Apr. 14, 2015 in EP 14169514.8, 6 pages.
Office Action mailed Apr. 24, 2015 in U.S. Appl. No. 14/318,678, 14 pages.
Adam, J.-L., "Fluoride glass research in France: fundamentals and applications", Journal of Fluorine Chemistry, vol. 107 Feb. 2001, pp. 265-270.
Amatucci, G. et al., "Fluoride Based Electrode Materials for Advanced Energy Storage Devices", Journal of Fluorine Chemistry 128, 2007, available online Dec. 13, 2006, pp. 243-262.
Arico, A. et al., "Nanostructured Materials for Advanced Energy conversion and Storage Devices", Nature Materials, May 2005, vol. 4, pp. 366-377.
Armstrong, Robert A. et al., "Synthesis of Layered LiMnO$_2$ as an Electrode for Rechargeable Lithium Batteries", Nature, Jun. 6, 1996, vol. 381, pp. 499-500.
Badway, F. et al., "Carbon Metal Fluoride Nanocomposites", Journal of Electrochemcial Society, 2003, available electronically Jul. 17, 2003, vol. 150, No. 9, pp. A1209-A1218.
Bervas, M. et al., "Bismuth fluoride nanocomposites as a positive electrode material for rechargeable lithium batteries", Electrochem. Solid-State Letters, 2005, available electronically Feb. 10, 2005, vol. 8, No. 5, pp. A179-A183.
Bervas, M. et al., "Reversible conversion reactions with lithium in bismuth oxyfluoride nanocomposites", J. Electrochem. Soc., 2006, available electronically Dec. 12, 2005, vol. 153, No. 1, pp. A159-A170.
Bobe, J.M. et al., "Ion conductivity and diffusion in ZrF$_4$-based fluoride glasses containing LiF ($0 \leq_{LiF} \leq 0.60$)", Journal of Non-Crystalline Solids, Jan. 1997, vol. 209, pp. 122-136.
Dugat, P. et al., "Crystal Structures of Li$_4$ZrF$_8$ and Li$_3$Zr$_4$F$_{19}$ and Reinvestigation of the LiF-ZrF$_4$ Phase Diagram", Journal of Solid State Chemistry, Nov. 15, 1995, vol. 120, pp. 187-196.
Fiordiponti, P. et al., "Nonaqueous Batteries with BiF$_3$ Cathodes", Journal of the Electrochemical Society, Apr. 1978, vol. 125, No. 4, pp. 511-515.
Ghosh, S. et al., "Electrical conductivity and conductivity relaxation in mixed alkali fluoride glasses", Solid State Ionics, 2002, accepted Mar. 28, 2002, vol. 149, pp. 67-72.
Ghosh, S. et al., "Ion dynamics and mixed mobile ion effect in fluoride glasses", Journal of Applied Physics, Jun. 21, 2005,vol. 97, pp. 123525-1-123525-5.

(56) References Cited

OTHER PUBLICATIONS

Li, H. et al., "Li-Storage via Heterogeneous Reaction in Selected Binary Metal Fluorides and Oxides", Journal of Electrochemical Society, 2004, accepted Oct. 21, 2003, vol. 151, No. 11, pp. A1878-A1885.

Li, H. et al., "Reversible formation and decomposition of LiF clusters using transition metal fluorides as precursors and their application in rechargeable Li batteries," Advanced Materials, May 2, 2003, vol. 15, No. 9, pp. 736-739.

Mizushima, K. et al., "$Li_xCoO_2$ ( $0<x\leq$): A New Cathode Material for Batteries of High Energy Density", Mat. Res. Bull, 1980, vol. 15, No. 6, pp. 783-789.

Nel, A. et al., "Toxic Potential of Materials at the Nanolevel", Science, Feb. 3, 2006, vol. 311, pp. 622-627.

Padhi, A.K. et al., "Effect of Structure on the $Fe^{3+}/Fe2^+$ Redox Couple in Iron Phosphates", J. Electrochem. Soc., May 5, 1997, vol. 144, No. 5, pp. 1609-1613.

Padhi, A.K. et al., "Phospho-olivines as Positive-Electrode Materials for Rechargeable Lithium Batteries", J. Electrochem. Soc., Apr. 4, 1997, vol. 144, No. 4, pp. 1188-1194.

Pereira, N. et al., "The Electrochemistry of Germanium Nitride with Lithium", J. Electrochem. Soc., 2003, available electronically Jul. 1, 2003, vol. 150, No. 8, pp. A1118-A1128.

Poulain, M. "Advanced Glasses", Ann. Chim. Sci. Mat., Apr. 2003, vol. 28, pp. 87-94.

Roth, M. et al. "Nanocrystalline LiF via microemulsion systems", J. Mater. Chem., 1999, accepted Nov. 16, 1998, vol. 9, pp. 493-497.

Sorokin, N.I., "Anion-conducting fluoride and oxyfluoride glasses", Russian Chemical Reviews, 2001, vol. 70, No. 9, pp. 801-807.

Sural, M. et al., "Conductivity relaxation in zirconium fluoride glasses: effect of substitution of $Zr^{4+}$ by $Y^{3+}$ ions", Solid State Ionics, Apr. 1999, vol. 120, pp. 27-32.

Tarascon, J.M. et al., "Issues and challenges facing rechargeable lithium batteries", Nature, Nov. 2001, vol. 414, pp. 359-367.

Tarascon, J.M. et al., "The Spinel Phase of $LiMn_2O_4$ as a Cathode in Secondary Lithium Cells", J. Electrochem. Soc., Oct. 1991, vol. 138, No. 10, pp. 2859-2864.

Thackeray, M. M. et al. "Lithium Insertion into Manganese Spinels", Mater. Res. Bull., Feb. 1983, vol. 18, No. 4, pp. 461-472.

Thomas, M.G.S.R. et al., "Synthesis and Structural Characterization of the Normal Spinel Li $[Ni_2]O_4$", Mater. Res. Bull., Mar. 25, 1985, vol. 20, No. 10, pp. 1137-1146.

Trnovcova, V. et al., "Physical Properties of Multicomponent Fluoride Glasses for Photonic and Superionic Applications", Ionics, Jul. 2001, vol. 7, Issue 4, pp. 456-462.

Vlasse, M., et al., "The Refinement of the Crystal Structure of Iron Oxyfluoride, FeOF", Journal of Solid State Chemistry, Oct. 1973, vol. 8, Issue 2, pp. 109-113.

Wang, F. et al., "Ternary Metal Fluorides as New Cathodes of Rechargable Lithium Batteries with Ultrahigh Energy Desnity," The Electrochemical Society, Jun. 10, 2014, 2 pages.

Xiujian, Z. et al., "Mixed-alkali effect in fluorozirconate glasses", Journal of Materials Science Letters, Feb. 1987, vol. 6, Issue 2, pp. 143-144.

"Comprehensive Insights into the Structural and Chemical Changes in Mixed-Anion FeOF Electrodes by Using Operando PDF and NMR Spectroscopy", by Kamila M. Wiaderek, Olaf J. Borkiewicz, Elizabeth Castillo-Martinez, Rosa Robert, Nathalie Pereira, Glenn G. Amatucci, Clare P. Grey, Peter J. Chupas, and Karena W. Chapman, issued on "Journal of the American Chemical Society".

"EELS compositional and valence mapping in iron fluoride-carbon nanocomposites", by Jafar F. Al-Sharab, James Bentley, Fadwa Badway, Glenn G. Amatucci and Frederic Cosandey, issued on J Nanopart Res (2013).

* cited by examiner

Matrix with embedded sulfide plus fluoride core/shell: core=sulfide+fluoride, shell=3rd material ions move from negative electrode to the positive electrode during discharge. In the basic operations of a lithium battery, a conversion material undergoes a conversion reaction with lithium, and the performance of the conversion material is an important aspect of a battery.

NANOSTRUCTURED MATERIALS FOR ELECTROCHEMICAL CONVERSION REACTIONS

CROSS-REFERENCES TO RELATED APPLICATIONS

This application is a Non-provisional Patent Application that claims benefit of the following U.S. Provisional Patent Applications under 35 U.S.C. 119(e): U.S. Provisional Patent Application No. 61/674,961, filed Jul. 24, 2012, and titled "NANOSCALE LITHIUM COMPOUND AND METAL ELECTRODES"; and U.S. Provisional Patent Application No. 61/814,821 filed Apr. 23, 2013, and titled "NANOSTRUCTURED MATERIALS FOR ELECTROCHEMICAL CONVERSION REACTIONS", each of which is incorporated herein by reference in its entirety and for all purposes.

BACKGROUND

The present disclosure is related to battery systems.

In the recent years, with shortage of fossil-fuel based energy and adverse environmental effects from the consumption of fossil fuel, both public and private sectors have poured valuable resources into clean technologies. An important aspect of clean technologies is energy storage, or simply battery systems. Over the past, many battery types have been developed and used, with their respective advantages and disadvantages. For its chemical properties, including high charge density, lithium material has been used in various parts of a battery. For example, in a rechargeable lithium-ion battery, lithium ions move from negative electrode to the positive electrode during discharge. In the basic operations of a lithium battery, a conversion material undergoes a conversion reaction with lithium, and the performance of the conversion material is an important aspect of a battery.

Unfortunately, conventional battery systems and their manufacturing and processes result in relatively high cost, low energy density batteries that do not meet market demands for many applications. Therefore, it is desirable to have new systems and techniques for batteries.

SUMMARY

One aspect of the disclosure concerns a positive electrode material that may be characterized by particles or nanodomains having a median characteristic dimension of about 20 nm or less. These include (i) particles or nanodomains of a metal selected from the group consisting of iron, cobalt, manganese, copper, nickel, bismuth and alloys thereof, and (ii) particles or nanodomains of lithium fluoride.

In one implementation, the metal is iron, manganese or cobalt and the mole ratio of metal to lithium fluoride is about 2 to 8. In another implementation, the metal is copper or nickel and the mole ratio of metal to lithium fluoride is about 1 to 5. In certain embodiments, the metal is an alloy of iron with cobalt, copper, nickel and/or manganese.

In certain embodiments, the individual particles additionally include a fluoride of the metal. In some cases, the positive electrode material additionally includes an iron fluoride such as ferric fluoride. For example, the metal may be iron and the particles or nanodomains further include ferric fluoride.

In certain embodiments, some particles or nanodomains contain only the metal and other particles or nanodomains contain only lithium fluoride. In some embodiments, individual particles of the positive electrode material include both the metal and lithium fluoride. In one example, the lithium fluoride comprises lithium oxyfluoride.

In certain embodiments, the positive electrode material additionally includes (iii) a conductive additive. In some cases, the conductive additive is a mixed ion-electron conductor. In some cases, the conductive additive is a lithium ion conductor. In some implementations, the lithium ion conductor is or includes thio-LISICON, garnet, lithium sulfide, FeS, $FeS_2$, copper sulfide, titanium sulfide, $Li_2S$—$P_2S_5$, lithium iron sulfide, $Li_2S$—$SiS_2$, $Li_2S$—$SiS_2$—LiI, $Li_2S$—$SiS_2$—$Al_2S_3$, $Li_2S$—$SiS_2$—$GeS_2$, $Li_2S$—$SiS_2$—$P_2S_5$, $Li_2S$—$P_2S_5$, $Li_2S$—$GeS_2$—$Ga_2S_3$, or $Li_{10}GeP_2S_{12}$.

In some implementations, the median characteristic dimension of the particles or nanodomains is about 5 nm or less. In some materials, the metal in the particles is present as metal nanodomains having a median dimension of less than about 20 nm. In some materials, the particles or nanodomains are substantially homogeneous within a volume of about 1000 $nm^3$.

Another aspect of the disclosure concerns glassy conversion materials for a positive electrode. Such materials may be characterized by a metal, one or more oxidizing species, and a reducing cation mixed at a scale of less than 1 nm. Further, the glassy conversion material is substantially homogeneous within a volume of 1000 $nm^3$. In some implementations, the cation comprises lithium, sodium, or magnesium. In some implementations, the glassy conversion material is substantially free from clumps of a single species the metal or oxidizing species with a volume of greater than 125 $nm^3$.

Another aspect concerns positive electrodes that may be characterized by the following features: (a) a current collector; and (b) electrochemically active material in electrical communication with the current collector. The electrochemically active material includes (i) a metal component, and (ii) a lithium compound component intermixed with the metal component on a distance scale of about 20 nm or less. Further, the electrochemically active material, when fully charged to form a compound of the metal component and an anion of the lithium compound, has a reversible specific capacity of about 350 mAh/g or greater when discharged with lithium ions at a rate of at least about 200 mA/g. In some cases, the electrochemically active material is provided in a layer having a thickness of between about 10 nm and 300 μm.

In some cases, the positive electrode additionally includes a conductivity enhancing agent such as an electron conductor component and/or an ion conductor component. Some positive electrodes include a mixed ion-electron conductor component. In some cases, the mixed ion-electron conductor component contains less than about 30 percent by weight of the cathode. Examples of the mixed ion-electron conductor component include thio-LISICON, garnet, lithium sulfide, FeS, $FeS_2$, copper sulfide, titanium sulfide, $Li_2S$—$P_2S_5$, lithium iron sulfide, $Li_2S$—$SiS_2$, $Li_2S$—$SiS_2$—LiI, $Li_2S$—$SiS_2$—$Al_2S_3$, $Li_2S$—$SiS_2$—$GeS_2$, $Li_2S$—$SiS_2$—$P_2S_5$, $Li_2S$—$P_2S_5$, $Li_2S$—$GeS_2$—$Ga_2S_3$, and $Li_{10}GeP_2S_{12}$. In some embodiments, the mixed ion-electron conductor component has a glassy structure.

In some positive electrodes, the metal component is a transition metal, aluminum, bismuth, or an alloy of any of these. In some cases, the metal component is copper, manganese, cobalt, iron, or an alloy of any of these. For example, the metal component may be an alloy of iron with cobalt and/or manganese. In some positive electrodes, the metal component includes grains of metal with a median characteristic length of about 5 nm or less.

In certain embodiments, the lithium compound component is selected from lithium halides, lithium sulfides, lithium sulfur-halides, lithium oxides, lithium nitrides, lithium phosphides, and lithium selenides. In one example, the lithium compound component is lithium fluoride. In a further example, the lithium compound component is lithium fluoride and the metal component is manganese, cobalt, copper, iron, or an alloy of any of these. In some positive electrodes, the lithium compound component contains particles or nanodomains having a median characteristic length scale of about 5 nm or less. In certain embodiments, the lithium compound component includes an anion that forms a metal compound with the metal on charge, and the metal compound and lithium ions undergo a reaction to produce the metal and the lithium compound component, and the reaction has a Gibbs free energy of at least about 500 kJ/mol.

In some cases, the electrochemically active material, when fully charged, has a specific capacity of about 300 mAh/g or greater when discharged with lithium ions at a rate of at least about 6000 mA/g at a temperature of about 100° C. In certain embodiments, the positive electrode exhibits an average voltage hysteresis that is less than about 1V when cycled between 1V and 4V vs Li at a temperature of 100° C. and charged at a rate of about 200 mAh/g of positive electrode active material.

Another aspect of the disclosure concerns a solid-state energy storage device characterized by the following features: (i) an anode, (ii) a solid-state electrolyte, and (iii) a cathode including (a) a current collector, (b) electrochemically active material in electrical communication with the current collector. The electrochemically active material includes (i) a metal component, and (ii) a lithium compound component intermixed with the metal component on a distance scale of about 20 nm or less. Further, the electrochemically active material has a reversible specific capacity of about 600 mAh/g or greater when discharged with lithium ions at a rate of at least about 200 mA/g at 50° C. between 1 and 4V versus a Li.

In some energy storage devices, the anode, solid state electrolyte, and cathode, together provide a stack of about 1 µm to 10 µm thickness. In some designs, the electrochemically active material is provided in a layer having a thickness of between about 10 nm and 300 nm.

In some energy storage devices, the electrochemically active material has a reversible specific capacity of about 700 mAh/g or greater when discharged with lithium ions at a rate of at least about 200 mA/g. In some designs, the device has an average voltage hysteresis less than about 1V when cycled at a temperature of 100° C. and a charge rate of about 200 mAh/g of cathode active material.

In some cases, the cathode additionally includes a conductivity enhancing agent such as an electron conductor component and/or an ion conductor component. Some positive electrodes include a mixed ion-electron conductor component.

In certain embodiments, the metal component is a transition metal, aluminum, bismuth or an alloy of any of these. For example, the metal component is iron or an alloy thereof. In another example, the metal component is copper, cobalt, manganese, iron, or an alloy of any of these. In some cathodes, the metal component is provided as grains of metal with a median characteristic length of about 5 nm or less.

In certain embodiments, the lithium compound component is selected from the group of lithium halides, lithium sulfides, lithium oxides, lithium nitrides, lithium phosphides, lithium selenides, and combinations thereof. In example, the lithium compound component is lithium fluoride. In a further example, the a lithium compound component is lithium fluoride and the metal component comprises manganese, cobalt, copper or iron (e.g., iron or an alloy thereof). In certain embodiments, the lithium compound component is provided as particles or nanodomains having a median characteristic length scale of about 5 nm or less. In some energy storage devices, the lithium compound component contains an anion that forms a metal compound with the metal on charge, and when the metal compound and lithium ions undergo a reaction to produce the metal and the lithium compound component, the reaction has a Gibbs free energy of at least about 500 kJ/mol. In some cases, the cathode electrochemically active material contains a combination of two or more of lithium fluoride, iron, lithium metal and iron fluoride.

Another aspect of the disclosure concerns battery cells characterized by the following features: (a) an electrolyte; (b) a negative electrode; and (c) a solid-state conversion material provided with an interface to the electrolyte, the solid-state conversion material that in the discharged state comprises a metal, one or more oxidizing species, and a reducing cation mixed at a scale of less than 1 nm. In certain embodiments, the conversion material is substantially glassy. The metal may be a transition metal material such as cobalt, copper, nickel, manganese and/or iron material. The cation may be lithium, sodium, and/or magnesium material.

In another aspect, the disclosure pertains to battery devices characterized by the following features: (a) an anode region containing lithium; (b) an electrolyte region; (c) a cathode region containing a thickness of lithium fluoride material configured in an amorphous state; and (d) a plurality of iron metal particulate species spatially disposed within an interior region of the thickness of lithium fluoride to form a lithiated conversion material. Further, the battery device has an energy density characterizing the cathode region of greater than about 80% of a theoretical energy density of the cathode region. In certain embodiments, the first plurality of iron metal species is characterized by a diameter of about 5 nm to 0.2 nm. In certain embodiments, the thickness of lithium fluoride material is characterized by a thickness of 30 nm to 0.2 nm. In some cases, the thickness of lithium fluoride material is homogeneous. In certain embodiments, the cathode region is characterized by an iron to fluorine to lithium ratio of about 1:3:3. In certain embodiments, the cathode region is characterized by an iron to fluorine to lithium ratio from about 1:1.5:1.5 to 1:4.5:4.5.

An aspect of the disclosure pertains to methods of fabricating a battery. In some cases, such methods may be characterized by the following operations: (a) providing a cathode containing electrochemically active material in electrical communication with the current collector; and (b) combining the cathode with an anode and a solid-state electrolyte to form the battery. The electrochemically active material includes (i) a metal component, and (ii) a lithium compound component intermixed with the metal component on a distance scale of about 20 nm or less. Further, the cathode electrochemically active material, when fully charged to form a compound of the metal component and an anion of the lithium compound, has a reversible specific capacity of about 350 mAh/g or greater when discharged with lithium ions at a rate of at least about 200 mA/g between e.g., 1V to 4V versus a lithium standard electrode at 50° C.

In some embodiments, the electrochemically active material is prepared by solid state synthesis. In one example, the solid phase synthesis includes mixing and milling precursors or reactants for the electrochemically active material. In one example, the solid phase synthesis includes reacting an iron containing compound and a fluoride.

In some embodiments, the electrochemically active material is prepared by evaporation of one or more precursors of the electrochemically active material. In one example, evaporation involves evaporating a precursor selected from the group consisting of LiF, FeF3, FeF2, LiFeF3, Fe, and Li. In one example, evaporation involves reacting an evaporated precursor in an environment containing a gas selected from the group consisting of $F_2$, $CF_4$, $SF_6$, and $NF_3$.

In some embodiments, the electrochemically active material is prepared by (a) melting one or more precursors of the electrochemically active material; (b) atomizing the melted precursors into particles; and (c) cooling the particles to mix the metal component and the lithium compound component at a length scale of about 20 nm or less.

In some implementations, the cooling takes place at a rate of at least about 100 degrees Kelvin per second. In some implementations, the cooling is performed by contacting the particles on a spinning cooling surface.

Another aspect of the disclosure concerns methods of forming a conversion material, which methods may be characterized by the following operations: (i) providing a first precursor material, the first precursor material containing a metal material; (ii) providing a second precursor material, the second precursor material containing a reducing cation material; (iii) evaporating the first precursor material and the second precursor material to vapor state; (iv) mixing the first precursor material and the second precursor material in the vapor state within a vacuum chamber to form a mixed material within the chamber, the mixed material containing the first precursor material and the precursor material mixed at a length scale of less than about 20 nm; and (v) collecting the mixed material. In certain embodiments, the first precursor material and the second precursor material are characterized by a tendency of phase separation. In some implementations, the evaporating is performed using a thermal evaporation process, an electron beam process, or a flash evaporation process. In some implementations, the methods additionally include an operation of cooling the mixed material at a rate of at least about 10 degrees Kelvin per second.

Another aspect of the disclosure concerns methods of forming a conversion material, which methods are characterized by the following operations: (i) providing a first precursor material containing a metal material; (ii) providing a second precursor material containing a reducing cation material; (iii) melting the first precursor material and the second precursor material to liquid state; (iv) injecting the first precursor material and the second precursor into a cooling environment, where the first precursor material and the second precursor material form a mixed material that is cooled at a rate of at least about 100 degrees Kelvin per second to generate formed particles; and (v) collecting the formed particles. In some embodiments, the first precursor material and the second precursor material are characterized by a tendency of phase separation. In some embodiments, the formed particles contain the first precursor material and the precursor material mixed at a length scale of less than about 20 nm.

In some implementations, the cooling environment is a cooling chamber. The cooling environment may include a cooling surface. The cooling surface may be characterized by a high thermal conductivity. In some cases, the cooling includes exposing the mixed material to low temperature gaseous species.

In some implementations, the methods additionally include the following operations: injecting the first precursor material into a common region of the cooling chamber from a first nozzle; and injecting the second precursor material into the common region of the cooling chamber from a second nozzle.

In certain embodiments, the methods additionally include the following operations: combining the first precursor material and the second precursor material to form a combined material; and injecting the combined material into the cooling chamber.

The operation of melting of the first precursor material may be performed separately from melting the second precursor material. The melting may be performed at different temperatures for the first precursor material and the second precursor material.

Another aspect of the disclosure concerns forming a battery cell by: (i) receiving a layer of cathode current collector; (ii) forming a cathode region comprising a nanostructured conversion material comprising nanodomains of iron and nanodomains of lithium fluoride to form; (iii) forming a solid electrolyte layer overlaying the cathode region; and (iv) forming an anode and/or anode current collector overlaying the solid electrolyte layer. The nanostructured conversion material may be atomically mixed. In certain embodiments, the method includes the additional operation of forming electrical contacts to the cathode current collector and the anode and/or anode current collector.

These and other features of the disclosed embodiments will be set forth in more detail below with reference to the associated drawings.

DETAILED DESCRIPTION

Introduction

Figure 1A:
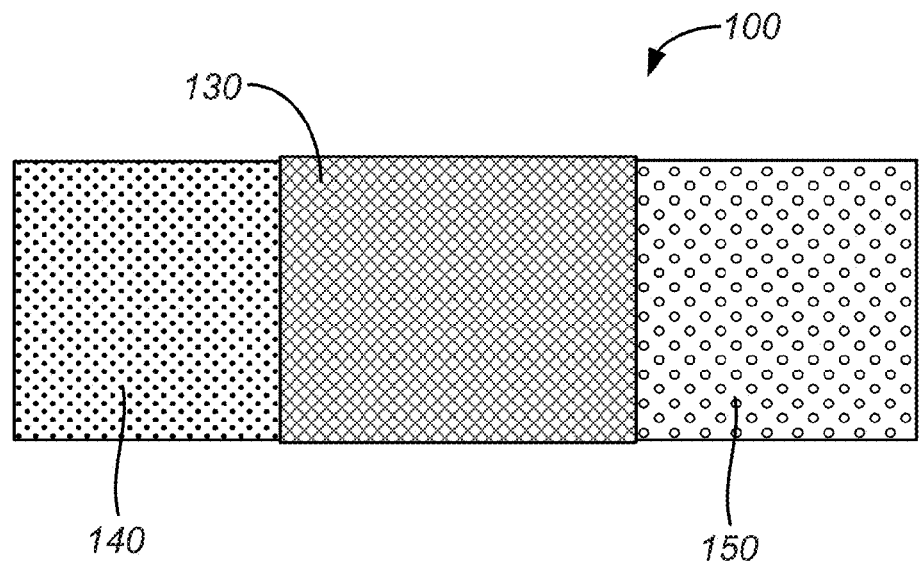
FIG. 1A presents a solid-state energy storage device including an anode and a cathode spaced apart and separated by a solid-state electrolyte.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph f. In particular, the use of "step of" or "act of" in the Claims herein is not intended to invoke the provisions of 35 U.S.C. 112, Paragraph f.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

The disclosed embodiments concern positive electrodes containing a high capacity material that reversibly undergoes a redox reaction at a high rate over many cycles of charge and discharge. Such materials are sometimes referred to herein as "conversion" materials.

In general, intercalation and/or conversion materials can be used in battery systems. For example, a positive electrode material may be used for intercalation or conversion with lithium. Intercalation materials, which can be prepared at a macro scale or at a nano scale, are commonly used in and typically have relatively low energy density (e.g., less than about 800 Wh/kg of active material). Conversion materials, in contrast, can provide much higher energy density (e.g., about 1000-2500 Wh/kg of active material). Battery systems and structures utilizing conversion material are described in U.S. Provisional Patent Application No. 61/778,455, filed 13 Mar. 2013, titled "IRON, FLUORINE, SULFUR COMPOUNDS FOR BATTERY CELL POSITIVE ELECTRODES", and U.S. Provisional Patent Application No. 61/674,961, filed Jul. 24, 2012, and titled "NANOSCALE LITHIUM COMPOUND AND METAL ELECTRODES", both of which are incorporated by reference herein in their entireties.

In certain embodiments, the conversion material includes an oxidizing species, a reducing cation species, and a metal species. These species are sometimes referred to herein as constituents or components. The oxidizing species is typically a strongly electronegative element, compound, or anion. Examples of oxidizing species anions include halides (fluorides, chlorides, bromides, and iodides), oxides, sulfides, and the like. The reducing cation species is typically an electropositive element or cation such as lithium, sodium, potassium, or magnesium and ions thereof. The metal species is typically less electropositive than the reducing cation species. Transition metals are sometimes used as the metal species. Examples include cobalt, copper, nickel, manganese, and iron. The conversion material may contain two or more oxidizing species, two or more reducing cation species, and/or two or more metal species.

As is understood in the art, batteries and their electrodes undergo electrochemical transitions during discharge and—in the case of secondary or rechargeable batteries—charge. The charge and discharge states of certain conversion materials will now be described.

Discharged state—In the discharged state, the metal species are generally more reduced than in the charged state. For example, the metal species is an elemental state or a lower oxidation state or positive valence (e.g., +2 rather than +3). Further, during discharge, the oxidizing species will pair with the reducing cation species and unpair from the metal species. Still further, during discharge, the reducing cation species tends to move into the positive electrode where it becomes oxidized by pairing with the oxidizing species. Pairing is typically manifest by formation of a chemical bond such as a covalent or ionic bond.

Depending on the implementation, in the discharged state, the conversion material may include an elemental metal material, one or more oxidizing species, and a reducing cation material. As an example, the discharge state may include at least an elemental metal such iron and a reducing cation halide such as lithium fluoride. The constituents of the discharged conversion material may be intimately distributed with one other in the discharged material. As described more fully below, these materials may be intermixed or distributed at a scale of about 20 nm or smaller.

It should be understood that a positive electrode of the type described herein may exist in various states of charge. In some cases, a battery is designed or operated so that full discharge is never attained. Thus, if the fully charged conversion material is ferric fluoride for example, the "fully" discharged positive electrode may contain a mixture of elemental iron, lithium fluoride, and some ferric fluoride, and possibly some ferrous fluoride. The use of "discharged" or "discharged state" herein is a relative term, referring only to a state of a conversion material that is more discharged than a charged state of the material. By the same token, the use of "charged" or "charged state" herein refers to a state of the conversion material that is more charged than a corresponding discharge state for the material.

Charged state—In a charged state, the metal species tends to pair with the oxidizing species often forming a compound. During charging, the oxidizing species tends to unpair from the reducing cation species and pair with the metal species. The reducing cation species tend to move out of the positive electrode and migrate and/or diffuse to the negative electrode where they exist in a more strongly reduced state (e.g., as an element metal such as lithium metal or lithium inserted in a matrix such as carbon or silicon).

As an example, during charge, elemental iron may pair with fluoride anions to form ferric fluoride and/or ferrous fluoride. Concurrently, fluoride anions may unpair from a reducing cation fluoride such as lithium fluoride. The now freed lithium cation migrates and/or diffuses to the positive electrode where it is reduced to elemental lithium or a lithium intercalation material.

The scale of the constituents in the conversion material, whether in the charged or discharged state, influences relevant electrochemical properties of the materials. It has been found that conversion materials having their constituents or components separated by very small distances, sometimes on the order of atomic scale, may possess certain performance benefits as compared to conversion materials that have constituents separated by greater distances. In some embodiments, the constituents are separated by distance no greater than about 20 nm. Such conversion materials have been observed to provide various benefits such as increased cycle lifetime, improved efficiency, improved energy density, improved power density, and improved low temperature performance. The term "nanostructured" is sometimes used to refer to conversion materials in charged or discharged states in which the constituent materials are separated from one another at a scale of about 20 nm or less In some embodiments, in the discharged state, the conversion material contains discrete domains of an elemental metal (or an alloy thereof) and a lithium compound. In some embodiments, the discrete grains of metal or alloy are embedded in a continuous matrix of the lithium compound. In other embodiments, the metal or alloy and lithium compound are present in small particles or other discrete structures. In either case, the various components of the conversion materials may be mixed and/or otherwise exist at a nanostructured scale. The individual domains may be nanodomains. Nanodomains may have an average or median characteristic dimension of about 20 nm or less or about 10 nm or less or about 5 nm or less. Using ferric fluoride as an example conversion material, the nanodomains may be primarily iron and lithium fluoride in the discharged state. In the charged state, the nanodomains are primarily ferric fluoride. In both charge states, the nanodomains may be crystalline or amorphous/glassy. Domains may be compositionally homogenous (e.g., containing exclusively metal species) or inhomogeneous (e.g., composed of a combination of metal species, oxidizing species, and reducing cation species).

In various embodiments, the conversion material is formed or mixed such that its constituents are separated on a scale of about 1 nm or less. Some such materials may be characterized as glassy or amorphous. A glassy material may be viewed as one that is substantially non-crystalline, substantially uniform in composition, and substantially lacking in long-range order. In some examples, a glassy conversion material is substantially homogeneous (compositionally and/or morphologically) within a volume of 1000 nm$^3$.

The conversion material is structured at a nano level (e.g., less than 20 nm in length). In one example, FeF$_3$ molecules in a charged conversion material may be characterized by a glassy or amorphous structure and being substantially homogeneous. In some examples, in the discharged state, the conversion material may include a glassy compound of lithium, sodium and/or magnesium. Such glassy or amorphous structures may be provided as particles, layers, etc. Within these particles or layers, the constituent metal, oxidizing, and reducing cation species are, on average, separated from one another by no greater distance than the length scales noted. In some cases, particles having a glassy or amorphous state substantially unagglomerated. In other cases, at least some of the particles form agglomerates.

Depending on the implementation, in the discharged state, the conversion material may include a metal material, one or more oxidizing species, and a reducing cation material separated at a scale of less than about 20 nm. More specifically, the conversion materials are substantially homogeneous within a volume of about 1000 nm$^3$ or less. In an example, molecules including metal, oxidizing species, and a reducing cation are structured at a nanometer scale. As presented in an example above, the discharged material may include an elemental form of the metal species and a compound of the reducing metal cation and an anion of the oxidizing species.

In the charged state, the conversion material contains a compound of the metal. In some embodiments, the electrochemical charge-discharge reaction at the positive electrode may be represented, without stoichiometry considerations, by the following equation:

$$M + LiX \leftarrow \rightarrow MX + Li^+ + e^-$$

where M is the metal species and X is the oxidizing species; e.g., an anion or electron rich species of an element such as a halide, oxygen, sulfur, phosphorus, nitrogen, selenium, or combination of such elements. In a specific example, the oxidizing species is combination of a halogen ion and a chalcogen ion (e.g., fluoride and sulfide). In certain variations of the above-referenced chemical equation, lithium is replaced with sodium, potassium, magnesium, or other electropositive metal ion.

The metal compound MX present in the charged positive electrode material should react with lithium ions according to discharge path of the above equation. Typically, the discharge reaction is associated with an appropriately large Gibbs free energy when considering the full cell reaction Li+MX→LiX+M. The Gibbs energy will correspond to the cell voltage of the reaction by $\Delta G_{rxn} = -E*n*F$ where E is the voltage, n is the number of electrons that react and F is the Faraday constant. In certain embodiments the Gibbs energy of the reaction is at least about 500 kJ/mol or at least about 750 kJ/mol or at least about 1 MJ/mol.

In certain implementations, the voltage of a fully charged positive electrode is at least about 2.0 V versus a lithium metal electrode or at least about 3.0 V versus a lithium metal electrode or at least about 4.0 V versus a lithium metal electrode or at least about 4.5 V versus lithium metal electrode.

In the charged state, the positive electrode conversion material may maintain the general morphological characteristics present in the discharged state. These characteristics include constituent separation distance (e.g., particle or crystallite size), matrix structure (e.g., glassy), etc. In some cases, the material will expand in the discharged state. Depending on the material, the volume change may be about 5% or greater or about 10% or greater.

Examples of suitable metal species M include transition metals, aluminum and bismuth. In some cases, the metal is selected from first row transition metals. Specific examples transition metals that may be used include vanadium, chromium, copper, iron, cobalt, manganese, nickel, ruthenium, titanium, silver, and tungsten. Alloys of such metals may also be used. Examples of such alloys include iron alloyed with cobalt and iron alloyed with manganese. Examples of suitable oxidizing species anions X include O, S, N, P, F, Se, Cl, I, and combinations thereof.

Examples of suitable charged state positive electrode materials include sulfides, oxides, halides, phosphides, nitrides, chalcogenides, oxysulfides, oxyfluorides, sulfurfluorides, and sulfur-oxyfluorides. In various embodiments, the charged conversion material includes one or more of the following: $AgF$; $AlF_3$; $BiF_3$; $B_2O_3$; $Co_3O_4$; $CoO$; $CoS_2$; $Co_{0.92}S$; $Co_3S_4$; $Co_9S_8$; $CON$; $Co_3N$; $CoP_3$; $CoF_2$; $CoF_3$; $Cr_2O_3$; $Cr_3O_4$; $CrS$; $CrN$; $CrF_3$; $CuO$; $Cu_2O$; $CuS$; $Cu_2S$; $CuP_2$; $Cu_3P$; $CuF_2$; $Fe_2O_3$; $FeO$; $FeOF$; $FeS_2$; $FeS$; $Fe_2S_2F_3$; $Fe_3N$; $FeP$; $FeF_2$; $FeF_3$; $FeOF$; $Ga_2O_3$; $GeO_2$; $MnO_2$; $Mn_2O_3$; $Mn_2O_5$; $MnO$; $MnS$; $MnS_2$; $MnP_4$; $MnF_2$; $MnF_3$; $MnF_4$; $MoO_3$; $MoO_2$; $MoS_2$; $Nb_2O_5$; $NiO$; $NiS_2$; $NiS$; $Ni_3S_2$; $Ni_3N$; $NiP_3$; $NiP_2$; $Ni_3P$; $NiF_2$; $PbO$; $RuO_2$; $Sb_2O_3$; $SnF_2$; $SnO_2$; $SrO_2$; $TiS_2$; $TiF_3$; $V_2O_3$; $V_2O_5$; $VF_3$; $WS_2$; $ZnF_2$; and combinations thereof.

The conversion material may be discharged with a cation that undergoes an exothermic reaction with the conversion material. The cation is often low-cost and lightweight (relative small atomic mass). Certain examples include Mg, Na, and Li. As an example for $FeF_3$ conversion material and Li cation, the conversion material when created, or when in the discharged state, may be an amorphous mixture of lithium, iron, and fluorine in the ratio of approximately $Li_3FeF_3$. In certain embodiments, the three elements are intimately intermixed on an atomic scale. In various implementations, the conversion material is characterized by an iron to fluorine to lithium ratio of from about 1:1.5:1.5 to 1:4.5:4.5.

Certain disclosed embodiments concern use of a redox reaction of lithium ions with a metal fluoride as a source of energy in positive electrode materials. As an example, a suitable positive electrode material is, in the charged state, ferric fluoride in very small particles, which may be the size of quantum dot (e.g., about 5 nm in the smallest cross-section) or in a glassy or amorphous state. In some embodiments, electrodes made of metal fluoride redox materials are employed in batteries having solid electrolytes such as inorganic electrolytes. A specific example of such electrolyte is LiPON.

In some implementations, the discharge of the positive electrode is accompanied by the reaction of ferric fluoride or other transition metal fluoride with lithium ions that have migrated into or inserted into the ferric fluoride matrix and there react to form lithium fluoride and elemental iron. The large Gibbs free energy associated with this reaction provides a very high available energy for a battery. This energy may be compared with that of a standard lithium insertion (or lithium intercalation depending on the electrode matrix) cathode materials such as lithium cobalt oxide, lithium manganese oxide, lithium titanate, and the like used in conventional lithium ion batteries. The materials disclosed herein combine during discharge with a large number of lithium atoms per transition metal. During charge, intercalation reactions involve at most one lithium atom per transition metal (e.g., as lithium is reduced from $Li^+$ to $Li^0$, cobalt oxidizes from $Co^{3+}$ to $Co^{4+}$), whereas in conversion reactions such as those producing $FeF_3$, 3 lithium atoms react per transition metal. In fact, most insertion compounds react half a lithium atom per transition metal because the electrode structure becomes unstable if more than ½ of the lithium is extracted. This is why the transition metal electrode materials disclosed herein provide a significantly higher capacity (e.g., about 700 mAh/g or greater) than conventional electrode materials, e.g., 140 mAh/g for $LiCoO_2$. This capacity is available even at high rates and over many cycles when the electrode possesses suitably high ionic and electronic conductivity as disclosed herein.

A non-oxide cathode also presents safety advantages. A typical Li-ion battery uses a high voltage oxide cathode that is in thermodynamic disequilibrium with oxygen gas in the atmosphere. A relation exists between the voltage and the thermodynamic oxygen partial pressure; for instance, at 4.2V vs $Li/Li^+$, the equilibrium oxygen partial pressure of an oxide, for example $LiCoO_2$ at room temperature is $10^{87}$ atm (Godshall et al, J ElectrochemSoc, 131 (1984) 543). Kinetics may prevent the rapid evolution of oxygen, but this large driving force will inevitably involve the release of oxygen, this is why batteries must have vents for safety purposes. If a safety event occurs that raises the temperature of the battery or otherwise presents an occasion for oxygen evolution, the rapid release of oxygen into the gas phase and the attendant expansion of oxygen as it transitions from solid to gas may result in an explosion. In contrast, due to the higher stability of lithium halides relative to lithium oxide, and the lower voltage of lithium halide electrodes, the safety risks are substantially lower. At 4V vs $Li/Li^+$ and even 100° C., the equilibrium partial pressure of fluorine is $10^{-55}$ atm.

A challenge associated with this technology is potentially slow mass transfer of lithium ions through iron fluoride or a lithium fluoride matrix (which may be in the form of particles). As a consequence, the full capacity of the material is not realized because many reactive sites are inaccessible in a period of time required for charging or discharging the battery in many applications. Further, the rate performance of the material is relatively poor given that the diffusion and migration time of lithium ions through the matrix takes too long. Still further, a significant mass transport overpotential is associated with charging and discharging these materials. This overpotential results in lower energy delivered to the application, more heat generation, which can cause problems at a systems level, and lower efficiency, which increases the cost to the consumer. This challenge may also exist in batteries employing conversion materials with metal species other than iron, oxidizing species other than fluoride, and/or reducing cation species other than lithium ions, as identified above.

To address the challenge of slow mass transport, the positive electrode material that contains elemental metal or alloy and a lithium compound (in the discharged state) or a metal compound (in the charged state) may be provided in the form of extremely small particles or nanodomains. In certain embodiments, these particles or domains have a median characteristic dimension of about 20 nm or less or about 10 nm or less. In some aspects, the particles or domains have a median characteristic dimension of about 5 nm or less. In some cases, the conversion material may be a glassy or amorphous material. In some implementations, the particles or domains of the positive electrode have a very tight distribution, e.g., a standard deviation of about 50% or less. In some implementations, at least about 90% of the particles or domains in the electrode have a characteristic dimension of between about 1 and 5 nm. In some embodiments, the particles' characteristic dimension has a $d_{50}$ value of about 20 nm or less or about 10 nm or less or about 5 nm or less. $d_{50}$ is defined as the characteristic dimension at which 50% of the particles are smaller. The particles or domains may be present in these sizes at any point in the life of the positive electrode. In some examples, the particles or domains are present in these sizes in the positive electrode as fabricated. In some examples, the particles or domains are present in these sizes after the first discharge of the positive electrode, or after the first full charge/discharge cycle of the positive electrode. In certain embodiments, the average size of the particles or domains of the positive electrode do not vary in characteristic dimension by more than about 500% or by about 100% over multiple cycles (e.g., 10 cycles, 50 cycles, 100 cycles, or 500 cycles).

The extremely small constituent separation distances described here provide a relatively short diffusion path for the lithium or other electropositive ions to move from the outside of the particle or domain to the reactive metal compound sites within the particle/domain (discharge) or from a lithium compound within the particle/domain to the particle/domain surface (charge). During charge, lithium ions must leave lithium fluoride, for example, and transport to the exterior of the particle/domain where they contact the electrolyte. After leaving a particle/domain, a lithium ion may have to contact some other ion conductive matrix in the electrode before reaching the electrolyte. Conversely, on discharge lithium ions undergo a journey from the electrolyte into the body of the electrode where they must travel some distance before reaching a destination particle/domain, which they enter and pass into before finding a reactive metal compound site. Only after this multistage transport does the lithium ion participate in the redox reaction to generate electrochemical energy (discharge). The reverse path is traversed during charge. The use small separation distances of active material permits the positive electrode to operate with improved rate performance, not available previously.

A further benefit derived from the extremely small constituent separation distances is the comparatively shorter diffusion distance between the metal atom and the anion. As the metal and anion atoms are larger and more massive, their transport is generally slower than that of lithium. The provided nanostructure puts metal atoms in close proximity to anions, reducing the distance they must diffuse.

An additional challenge to realizing the potential benefits of conversion materials arises from the high surface area/mass ratio of very small particles. The large surface area (as a function of mass of reactive material) results in a relatively large fraction of the active material converting to a solid electrolyte interface (SEI) layer, which extracts much of the available lithium and presents it in an unusable form. It also therefore results in a relatively short cycle life as the SEI layer may continue to grow for a few cycles. The SEI that forms around a particle which undergoes significant volume changes during cycling may sometimes crack, providing a fresh surface that must be covered by SEI. The growing SEI contains mass that does not contribute to the energy stored in the battery, and may present a barrier to lithium transport, reducing the rate performance of the battery.

In certain embodiments, this second challenge is addressed by using a solid electrolyte. The solid electrolyte provides an ionically conductive medium without consuming significant amounts of active material in the formation of SEI layers. Therefore the positive electrode material can maintain its intrinsically high reversible capacity. It should be understood, however, that in other embodiments, the positive electrodes described herein are used with liquid and gel phase electrolytes.

A typical Li-ion battery uses a flammable hydrocarbon electrolyte (e.g., a cyclic organic carbonate or mixture of these). If a safety event that generates heat (such as a short circuit) occurs, this electrolyte may burn, releasing its energy in a fire. If the increased temperature results in oxygen evolution from the oxide cathode, an explosion may result from the rapid expansion into the gas phase. In contrast, a solid electrolyte it much more stable—it does not provide a fuel in the event of a short circuit.

Many types of solid electrolyte layer can be used. In some cases, the electrolyte material has a relatively high lithium ion conductivity, e.g., at least about $10^{-6}$ Siemens/centimeter or at least about $10^{-3}$ Siemens/centimeter. Examples of inorganic materials that could be used as the sole electrolyte layer include LiPON and similar lithium ion conductors.

FIG. 1A shows one version of a solid-state energy storage device described herein. The device (100) includes an anode (140) and cathode (150) spaced apart and a solid-state electrolyte (130) disposed between the anode and cathode.

Figure 1B:
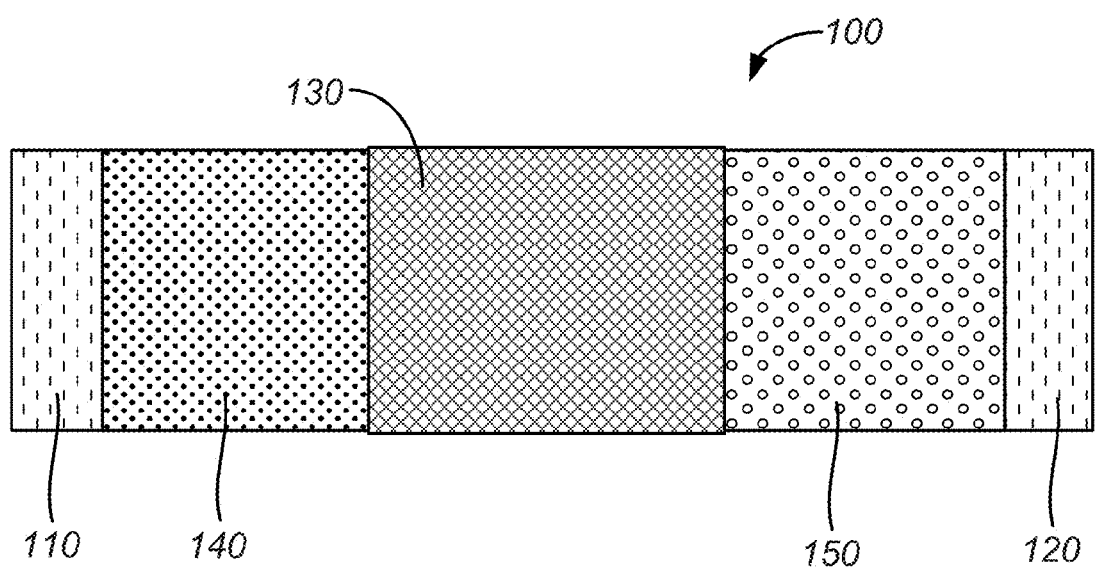
FIG. 1B presents a solid-state energy storage device with an anode current collector proximate to a anode and a cathode current collector proximate to a cathode.

FIG. 1B shows a version of a solid-state energy storage device with an anode current collector (110) proximate to the anode and a cathode current collector (120) proximate to the cathode. Generally, the current collector is a solid conductive substrate in intimate contact with the electrochemically active material of electrode. Forms of current collectors include sheets, foils, foams, meshes, perforated sheets, etc. The current collector should be made from a conductive material that is electrochemically compatible with the positive electrode material. Examples include copper, aluminum, nickel, tungsten, titanium, tantalum, molybdenum, tantalum nitride, and titanium nitride, steel, stainless steel, and alloys or mixtures thereof.

As used herein, a solid-state energy storage device means an energy storage device that includes a solid state anode, a solid state cathode, a solid state electrolyte and other optional components, but does not include any non-solid components that function as an anode, a cathode or an electrolyte.

Electrode Capacity

In certain embodiments, the positive electrode conversion material, as fabricated, has a specific capacity of least about 600 mAhr/g of the fully charged positive electrode material. In some embodiments, the positive electrode material maintains this fully charged capacity over multiple cycles. The fully charged material is the stoichiometric metal compound, MX. Examples of such compounds include the sulfides, fluorides, phosphides, selenides, nitrides, oxides, chalcogenides, oxysulfides, oxyfluorides, sulfur-fluorides, sulfur-oxyfluorides and chlorides identified above.

In certain embodiments, the positive electrode conversion material is able to maintain this high capacity at high discharge rates over multiple cycles. For example, the positive electrode material may maintain a capacity of at least about 600 mAh/g when discharged at a rate of at least about 200 mA/g of fully charged positive electrode material. In some implementations, the material maintains this capacity at higher discharge rates of at least about 600 mA/g of fully charged positive electrode material. In certain embodiments, the material maintains the capacity at discharge rates of up to about 6,000 mA/g of fully charged positive electrode material. This discharge rate may be maintained as a constant value or may vary over discharge without dropping below 200 mA/g. In some embodiments, the positive electrode material maintains a high capacity at high rates (e.g., 600 mAh/g at 200 mA/g) after a subsequent charge. In some cases, the electrode material is able to maintain such high rate capacity over about 10 cycles or more. Often it will be able maintain this high rate capacity even longer, e.g., over about 20 cycles or more, or over about 50 cycles or more, or over about 100 cycles or more, or over about 500 cycles or more. In each cycle the positive electrode material discharges the full 600 mAh/g charge. Such cycling may be conducted such that the voltage of the positive electrode is between 4V and 1V vs Li/Li$^+$. In some embodiments, the charge rate may be higher than 200 mA/g, higher than 600 mA/g, or higher than 6,000 mA/g and the material maintains a capacity of about at least 600 mAh/g.

High capacity performance may be achieved when cycling over a range of temperatures, e.g., from about 0 degrees celsius to 100 degrees celsius or about 20 degrees celsius to 100 degrees celsius.

In one version, the conversion material provides a capacity of greater than about 350 mAh/g of active material when cycled between 1 and 4 V versus a lithium metal negative electrode at about 100 degrees celsius with a charge/discharge rate of 200 mA/g. In other versions, the electrode material provides a capacity of greater than about 500 mAh/g, or greater than about 600 mAh/g or greater than about 700 mAh/g, in each case the capacity value is for the active material cycled in the voltage range of 1 to 4 V versus a lithium metal negative electrode when cycled at about 100 degrees celsius with a charge/discharge rate of 200 mA/g. In another version, the electrode materials described herein provide a capacity of between about 350 and 750 mAh/g when cycled between 1 and 4 V against a lithium metal negative electrode at about 100 degrees celsius with a charge/discharge rate of 200 mA/g. In another version, the electrode materials may have a specific capacity of greater than about 400 mAh/g when discharged between 1 and 4.5V versus a standard lithium metal electrode (Li/Li$^+$) at a rate of 400 mA/g and a temperature of 120° C. or between 1.5 to 4V vs Li at a rate greater than 1 C and a temperature above 50° C.

In some cases, positive electrodes fabricated from such materials have a high average discharge voltage greater than about 2V when discharged under above conditions. The high performance positive electrode materials disclosed herein maintain their good performance (e.g., high specific capacity, high energy density, high average discharge voltage, and low hysteresis) even when discharged at high rates. As shown in the examples below, their performance may not significantly degrade when the rate of discharge increases from 10 C to 100 C.

In another version, devices employing the positive electrode materials described herein provide an average voltage hysteresis of less than 1V in the voltage range of 1 to 4 V versus a lithium metal electrode at about 100 degrees celsius with a charge/discharge rate of 200 mA/g. In another version such devices provide an average voltage hysteresis of less than 0.7 V when cycled between 1 and 4 V versus a lithium metal electrode at about 100 degrees celsius with a charge/discharge rate of 200 mA/g. In an embodiment, the devices provide an average voltage hysteresis of less than about 1V when cycled between 1 and 4V versus a lithium metal electrode at about 100 degrees celsius with a charge/discharge rate of 600 mA/g. In an embodiment, the devices provide an average voltage hysteresis of less than about 1V when cycled between 1.5 and 4V versus a lithium metal electrode at about 50 degrees celsius with a charge/discharge rate of 200 mA/g. This hysteresis level is maintained for at least 10 cycles or at least 30 cycles or at least 50 cycles or at least 100 cycles.

Voltage hysteresis is the difference between the discharge voltage and the charge voltage, both varied as a function of state of charge. It represents the inefficiency of the battery—energy lost to heat, often due to sluggishness of either ion transport or reactions. As a result the overvoltages are required to drive the reactions, which cause the discharge voltage to be lower than the open circuit voltage and the charge voltage to be higher than the open circuit voltage. Low hysteresis means that the battery is efficient.

In the following discussion various positive electrode compositions are presented. In each of these, the particle/domain shapes and sizes may be varied as discussed. As examples, the particles/domains of active material in the positive electrode have a median characteristic dimension of about 20 nm or less, or about 10 nm or less, or about 5 nm or less. In some implementations, the material is glassy or amorphous. In some embodiments, particles/domains of the material have a standard deviation of about 50% or less. In some embodiments, the characteristic dimension of the particles/domains has a $d_{50}$ value of about 20 nm or less, or about 10 nm or less, or about 5 nm or less.

Cathode Active Component—Metal Component and a Lithium Compound Component

In one version of the devices described previously, when the device is in the discharged state the cathode includes an active component (conversion material) that includes an elemental form of a metal or alloy component and a lithium compound component.

Generally the metal component can be any metal or mixture or alloy of metals. In one version the metal component is a transition metal or mixture or alloy of transition metals. In one version the metal component is selected from Bi, Al, Ti, V, Cr, Mn, Fe, Co, Ni, Cu, Mo, W and Ru, or mixtures or alloys of the forgoing. In one version the metal component is selected from Fe, Cu, Mn and Co. In one version the metal component is Fe. In one version the metal component is Cu. In one version the metal component is Co. In one version, the metal component is an alloy of iron with another metal such as Co or Mn.

In one version, the metal component includes a mixture or alloy of a first metal and a second metal. In one version of mixed metal component, the metal component includes separate nanodomains of the first metal and the second metal. In another version, the metal component includes nanodomains of a mixture or alloy of the first and second metals. In one version, the first metal is Fe and the second metal is Cu. Generally the lithium compound component is any lithium compound that upon charging of the device yields (i) lithium ions, which migrate to the anode, and (ii) an anion that reacts with the metal component to provide a metal compound component. In the charged state, therefore, the cathode material comprises a metal compound component. The anion in the lithium compound may generally be any anion that forms the lithium compound in the discharged state and the metal compound in the charged state. In one version the lithium compound is a lithium halide, lithium oxide, lithium sulphide, lithium nitride, lithium phosphide, lithium sulfur-halide, lithium hydride, or mixtures thereof. In one version the lithium compound is a lithium halide. In one version the lithium compound is lithium fluoride.

In one version, the "conversion reaction," may be written as:

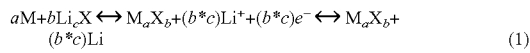

$$aM + bLi_nX \leftrightarrow M_aX_b + (b*c)Li^+ + (b*c)e^- \leftrightarrow M_aX_b + (b*c)Li \quad (1)$$

The left hand side of equation 1 represents the cathode active materials in the discharged state, where the cathode active component comprises a metal component, M, and a lithium compound component, $Li_nX$. c is the formal oxidation state of the anion X.

The right hand side of equation 1 represents the system in the charged state in which the cathode active materials have been converted into the metal compound component, $M_aX_b$, and the Li ions are provided for diffusion through the electrolyte to the anode and the electrons are provided to the external circuit.

X is generally any anionic species forming stable compounds, $Li_nX$ and $M_aX_b$, with lithium and metal, M, respectively. M can generally be any metal. In one version, M is a transition metal. In one version, M is selected from Bi, Ti, V, Cr, Mn, Fe, Co, Ni, Cu, Mo, W and Ru. In one version, M is selected from Fe, Co and Cu. In one version M is Cu. In one version M is Fe. In one version M is Co.

Specific examples of metal compounds, $M_aX_b$, that may be used include, without limitation, the following:

| | X = O | X = S | X = N | X = P | X = F |
|---|---|---|---|---|---|
| Bi | | | | | $BiF_3$ |
| Ti | | | | | $TiF_3$ |
| V | | | | | $VF_3$ |
| Cr | $Cr_2O_3$ | CrS | CrN | | $CrF_3$ |
| Mn | $MnO_2$, $Mn_2O_5$, MnO | MnS | | $MnP_4$ | |
| Fe | $Fe_2O_3$, FeO | $FeS_2$, FeS | $Fe_3N$ | FeP | $FeF_3$, $FeF_2$ |
| Co | $Co_3O_4$, CoO | $CoS_2$, $Co_{0.92}S$, $Co_9S_8$ | CoN, $Co_3N$ | $CoP_3$ | $CoF_2$, $CoF_3$ |
| Ni | NiO | $NiS_2$, NiS, $Ni_3S_2$ | $Ni_3N$ | $NiP_3$, $NiP_2$, $Ni_3P$ | $NiF_2$ |
| Cu | CuO, $Cu_2O$ | CuS, $Cu_2S$ | | $CuP_2$, $Cu_3P$ | $CuF_2$ |
| Mo | $MoO_3$, $MoO_2$ | $MoS_2$ | | | |
| W | | $WS_2$ | | | |
| Ru | $RuO_2$ | | | | |

In some implementations, the material described here is provided in particulate form (containing a collection of discrete unconnected particles). In some embodiments, it is provided in the form of one or more continuous layers having a matrix such as the lithium compound or an ion conductor with embedded nanodomains or regions of the metal component and/or the lithium compound component. In some embodiments, individual particles contain mixtures of the metal component and the lithium compound component. In some embodiments, some particles contain solely the metal component. In some embodiments, some particles contain solely the lithium compound component.

Figure 2A:
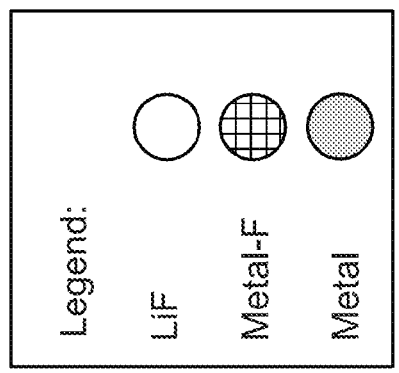
FIG. 2A presents a five examples of conversion materials having various nanodomain and particle formats.
Figure 2A:
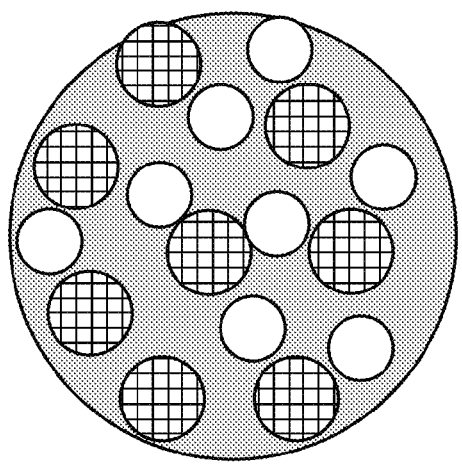
Figure 2A:
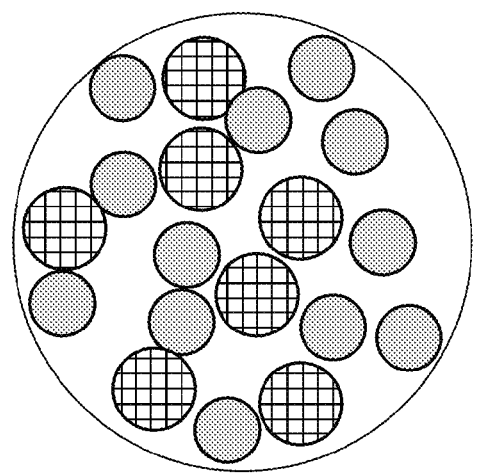
Figure 2A:
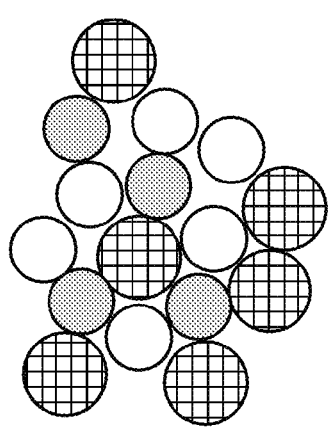
Figure 2A:
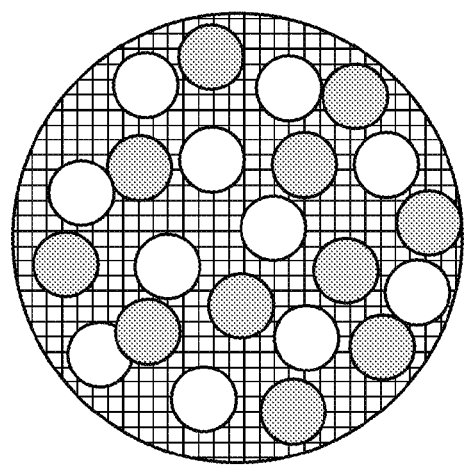

FIG. 2A presents a four examples of electrode formats. This diagram is merely an example, which should not unduly limit the scope of the claims. One of ordinary skill in the art would recognize many variations, alternatives, and modifications. It is to be understood that the particles or domains described above are nano-structured (e.g., separated from one another by less than about 20 nm length scale), and these particles or domains may be combined to form primary and secondary particle structures shown in Examples 1-4.

Example 1 (top left of FIG. 2A) depicts an embodiment in which the electrode active material includes non-encapsulated nanodomains of lithium fluoride, elemental metal, and metal fluoride. Such material may exist at any state of charge, but will most typically exist at or near full discharge. Example 2 (top right) depicts an electrode format in which metal fluoride nanoparticles and lithium fluoride nanoparticles are encapsulated in an elemental matrix. In each of the encapulation examples, the encapsulation unit may exist as distinct particles or as a continuous layer. Example 3 (bottom left) illustrates a format in which a metal fluoride matrix encapsulates lithium fluoride nanodomains and elemental metal nanodomains. Example 4 (bottom right) depicts a format in which lithium fluoride encapsulates metal fluoride particles or nanodomains and elemental metal particles or nanodomains.

Figure 2B:
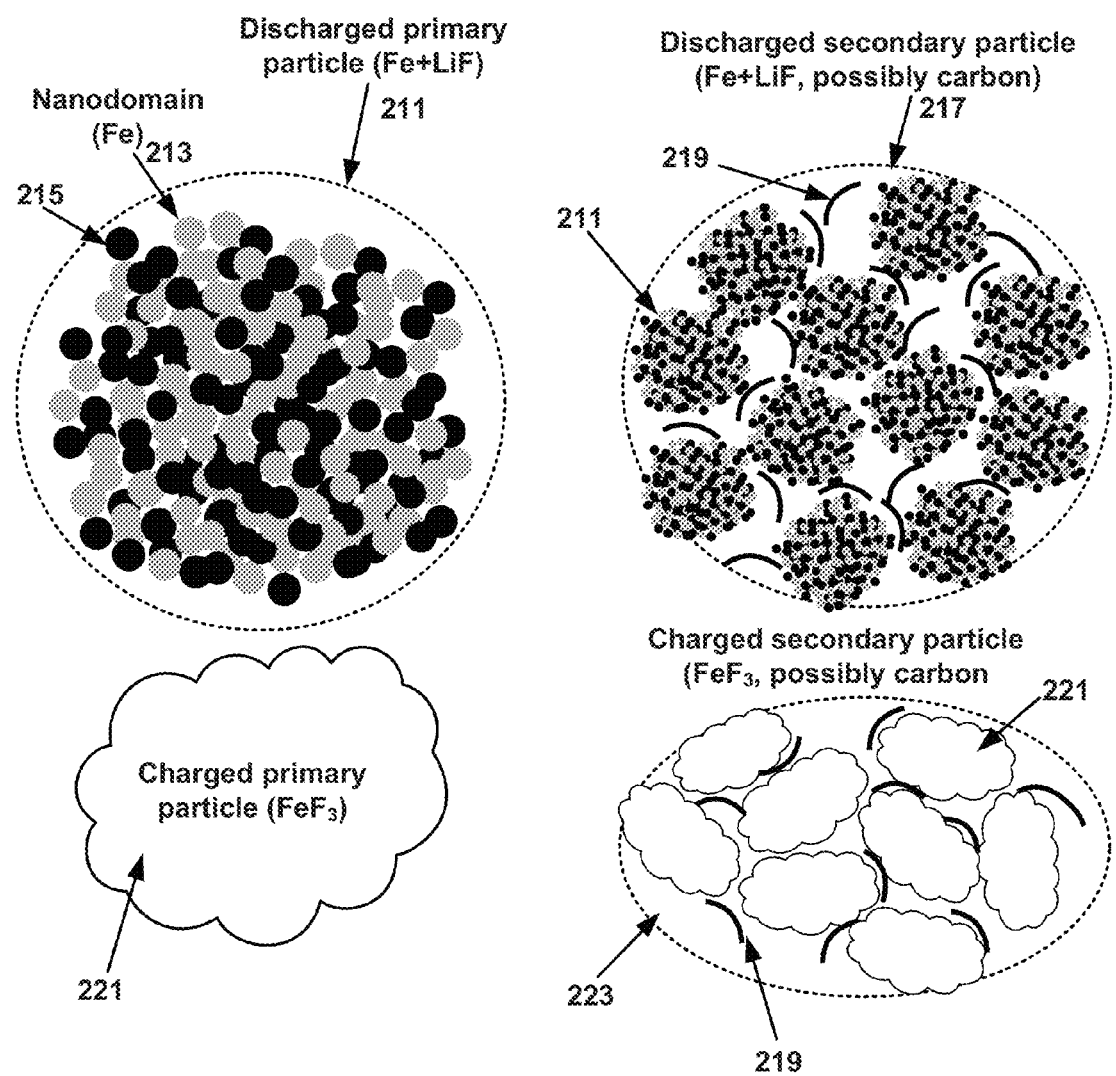
FIG. 2B presents additional examples of particle and nanodomain structures that may be employed in ferric fluoride and related conversion materials.

FIG. 2B presents additional examples of particle and nanodomain structures that may be employed in ferric fluoride and related conversion materials. In the example of FIG. 2B, the structure at the upper left side is a primary particle 211 that may be found in a discharged cathode. The primary particle 211 includes discrete nanodomains of iron metal 213 and lithium fluoride 215. Often, a primary particle has a characteristic cross-sectional dimension of about 100 nm or less. As mentioned, the nanodomains that make up a primary particle have cross-sectional dimensions of about 20 nm or less (e.g., about 5 nm or less). In some cases, the nanodomains are compositionally homogeneous.

The top right structure in FIG. 2B represents a secondary particle 217 (not drawn to scale) of discharged ferric fluoride conversion material. Secondary particles are made up of primary particles 211, such as those presented in the top left structure, and possibly particles of an ionically conductive material and/or electronically conductive material 219. Secondary particles may be agglomerates or clumps of primary particles and optionally particles of ionically/electronically conductive materials. In some implementations, secondary particles are present in a slurry used to coat a positive current collector when forming the cathode. In certain embodiments, secondary particles have a cross-sectional dimension of about 0.1 to 5 micrometers. All dimensions presented in the discussion of FIG. 2B are median values.

The lower left and lower right structures presented in FIG. 2B represents a primary particle 221 and a secondary particle 223, respectively, of fully charged ferric fluoride conversion material. Other conversion materials may be substituted for ferric fluoride and its discharge products in the structures presented in FIG. 2B.

The relative amounts of the lithium compound component and the metal component can vary widely, but should be appropriate for a battery cell. In other words, the components should be provided in relative amounts that do not introduce substantial unused material that will not contribute to electrochemical energy conversion or enhance conductivity. In some embodiments employing iron as the metal component, the mole ratio of iron to lithium in the positive electrode active material is about 2 to 8, or about 3 to 8. In some embodiments employing valence 2 metals such as copper, the mole ratio of metal to lithium in the positive electrode active material is about 1 to 5. In various implementations, the positive electrode material is characterized by an iron to fluorine to lithium ratio of about 1:3:3 or from about 1:1.5:1.5 to 1:4.5:4.5.

It is to be appreciated that while FIGS. 2A and 2B illustrate LiF and Metal-F material, other types of materials are possible as well, as explained above. For example, lithium fluoride may be substituted by a lithium fluoride and lithium sulfide combination. In such example, the metal fluoride may be substituted by a metal fluoride/sulfide combination.

Cathode Active Component—Lithium Metal Compound Component

In another version of the devices, at some point in the state of charge of the electrode, the cathode includes an active component that includes a lithium metal compound component. Generally the lithium metal compound component is any compound that includes lithium, a non-lithium metal and an anion and that upon charging of the device yields lithium ions that migrate to the anode and a metal compound.

In one version such reaction may be written as

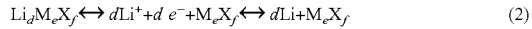

$$Li_d M_e X_f \leftrightarrow dLi^+ + d\ e^- + M_e X_f \leftrightarrow dLi + M_e X_f \quad (2)$$

The left hand side of equation 2 represents the cathode active materials in the discharged state, where the cathode active component comprises a lithium metal component, $Li_d M_e X_f$ and the right hand side of equation 2 represents the system in the charged state in which the cathode active materials have been converted into the metal compound component, $M_e X_f$, and the Li ions are provided for diffusion through the electrolyte to the anode and the electrons are provided to the external circuit. In reaction 2 all of the lithium in the lithium metal compound is converted to lithium ions. In another version, less than all of the lithium in the lithium metal compound is converted to lithium ions. One version of such reaction is given in equation 3

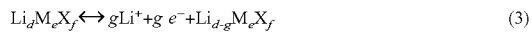

$$Li_d M_e X_f \leftrightarrow gLi^+ + g\ e^- + Li_{d-g} M_e X_f \quad (3)$$

where g<d. Depending on the thermodynamic and kinetic stability of the $Li_{d-g} M_e X_f$ compound, such compound may exist as $Li_{d-g} M_e X_f$ or may disproportionate into a mixture of one or more of a lithium compound, a metal compound and a lithium metal compound.

In one version the lithium metal compound component is a lithium metal oxide, a lithium metal sulphide, a lithium metal nitride, a lithium metal phosphide, a lithium metal halide or a lithium metal hydride, or mixtures thereof. In one version the lithium metal compound component is a lithium metal halide. In one version the lithium metal compound component is a lithium metal fluoride. In one version the lithium metal compound component is a lithium iron fluoride. In one version the lithium metal compound component is a lithium copper fluoride. In one version the lithium metal compound component is a lithium cobalt fluoride.

Cathode Active Component—Metal Component, Lithium Compound Component and Lithium Metal Compound Component In another version of the devices, at some point in the state of charge of the electrode, the cathode includes an active component that includes a metal component, a lithium compound component and a lithium metal compound component. The metal component, lithium compound component and lithium metal compound component may be as described above. In versions of the device, the metal, lithium, metal compound and/or lithium compound may have a median characteristic size of 30 nm or less or 20 nm or less or 10 nm or less or 5 nm or less. In some cases, the components are intermixed in single particles or layers and within these particles or layers are separated from one another on the length scales noted and/or exist together in a glassy or amorphous state.

Cathode Active Component—Metal Compound Component

As can be seen from equations 1, 2 and 3 above, in the charged state the cathode active component includes a metal compound component which includes a metal and an anion. In one version, the metal compound component is an oxide, nitride, sulphide, phosphide, halide, sulfur-halide, or hydride of a metal selected from Bi, Ti, V, Cr, Mn, Fe, Co, Ni, Cu, Mo, W and Ru. In one version, the metal compound component is a fluoride of a metal selected from Bi, Ti, V, Cr, Mn, Fe, Co, Ni, Cu, Mo, W and Ru. In one version, the metal compound component is a fluoride of a metal selected from Fe, Cu or Co. In one version the metal compound component is $FeF_3$, $FeF_2$, $CuF_2$, $CoF_2$, or $CoF_3$. In one version the metal compound component is $FeF_x$, where x is between 1 and 3. In one version the metal compound component is $CuF_x$, where x is between 1 and 3. In one version the metal compound component is $CoF_x$, where x is between 1 and 3.

Cathode MEIC, Electronic Conductors, and Ionic Conductors

In one version of the devices, the positive electrode includes a mixed electron-ion conducting component (the "MEIC component") together with an active component as described above. The MEIC component may generally be made of any material that is compatible with the other materials of the device and allows electron and lithium ion transport sufficient for operation of the device. In one version, the MEIC component is a material having an electronic conductivity of $10^{-7}$ S/cm or greater at the device operating temperature. In one version, the MEIC component is a material having a lithium ion conductivity of $10^{-7}$ S/cm or greater at the device operating temperature. Examples of materials that may be used as the MEIC component include, without limitation, lithium titanates, lithium iron phosphates, vanadium oxides, colbalt oxides, manganese oxides, lithium sulphides, molybdunum sulphides, iron sulphides, LiPON, $MoO_3$, $V_2O_5$, carbon, copper oxides, lithium insertion compounds such as $LiCoO_2$, $Li(CoMn)O_2$, $LiMn_2O_4$, $Li(CoNiMn)O_2$, $Li(NiCoAl)O_2$, or other materials having relatively high lithium ion conductivity. In one version, the MEIC component is made of the same material as that of the solid state electrolyte. In one version, the MEIC component is made of a different material than that of the solid state electrolyte. The MEIC component may itself possess electrochemical activity (for example $MoO_3$ or $V_2O_5$) or may not show electrochemical activity (for example LiPON). In one version, the MEIC is LiPON.

If the positive electrode includes an MEIC component, the minimum amount of MEIC component will generally be the amount that allows sufficient lithium ion and electron transport for functioning of the device. The maximum amount will be that amount of MEIC that provides a electrochemically active positive electrode material with the required specific capacity or other electrical characteristics when operating at required rates, voltage windows, and states of charge. In one version of the devices including an MEIC, the minimum amount of MEIC is about 1% by weight of the positive electrode material. In one version of the devices including including an MEIC, the minimum amount of MEIC is about 5% by weight of the positive electrode material. In one version of the devices including including an MEIC, the maximum amount of MEIC is about 50% by weight of the positive electrode material. In one version of the devices including including an MEIC, the maximum amount of MEIC is about 25% by weight of the positive electrode material.

The MEIC material may be provided in the electrode in various forms. In one example, small particles of MEIC are mixed with the electrochemically active particles and compressed. In another example, the MEIC coats the active material particles. In yet another example, the MEIC arrays into vertical wires. The MEIC may be comprised of at least two materials, one having high electron conductivity and another having high ionic conductivity.

In some versions of the device, the positive electrode includes an electron conductor dispersed to increase the electron conductivity of the electrode. In versions, the component has an electron conductivity above $10^{-7}$ S/cm. This compound may be a carbon or metal compound in some embodiments. Examples of forms of carbon that may be employed include graphite, activated carbon, nanotubes, nanofibers, nanowires, graphene, graphene oxide, etc. When present, an electron conductor may be present in an amount of about 20% by weight or less of the active material in the positive electrode or about 10% by weight or less. As examples, this material may be provided as nanowires, nanoparticles, nanocrystals, and may be oriented in the direction from the electrode to the electrolyte or may be randomly dispersed. In certain embodiments, the material forms a percolating network throughout the positive electrode.

In some versions of the device, the positive electrode includes a $Li^+$ ionic conductor dispersed to increase the ion conductivity of the electrode. As examples, this material may be provided in the form of nanowires, nanoparticles, nanocrystals, and may be oriented in the direction from the electrode to the electrolyte or may be randomly dispersed. The ion material may be formed in coatings around the active material particles. In certain embodiments, the material forms a percolating network throughout the positive electrode. In certain versions, the material has an ion conductivity of at least $10^{-7}$ S/cm at the operating temperature of the device. In some cases, the material has an ion conductivity of at least $10^{-5}$ S/cm, or the material has an ion conductivity of greater than $10^4$ S/cm. Materials with this $Li^+$ conductivity are known in the art; a non-limiting list includes lithium iron phosphate, carbon, $Li_2O$—$SiO_2$—$ZrO_2$, Li—Al—Ti—P—O—N, $LiMO_2$, $Li_{10}GeP_2S_{12}$, $Li_{1.5}Al_{0.5}Ge_{1.5}(PO_4)_3$, $Li_7La_3Zr_2O_{12}$, $Li_9SiAlO_8$, $Li_3Nd_3Te_2O_{12}$, $Li_5La_3M_2O_{12}$(M=Nb,Ta), $Li_{5+x}M_xLa_{3-x}Ta_2O_{12}$ (M=Ca,Sr,Ba), LiPON, lithium sulfide, lithium iron sulfide, iron sulfide, lithium phosphate, Lisicon, thio-lisicon, glassy structures, lanthanum lithium titanate, garnet structures, β" alumina, and lithium solid electrolytes. In versions, the material has an ion conductivity of at least greater than the electrolyte. The ion conductor is preferably present in amounts of about 20% by weight or less of the active material in the positive electrode and even more preferably about 10% by weight or less.

Cathode Morphology

In one version of the devices the positive electrode is a thin film comprising the active component and, optionally, the MEIC component. Any active component and MEIC component described above may be used. The thin film may be a continuous layer such as one deposited by sputtering. Alternatively, it could be a layer that includes particles and/or nanodomains and is optionally held together by a binder. In one version, the thin film cathode has a thickness of between about 2.5 and 500nm. In another version the thin film cathode has a thickness of between about 5 and 300nm. In another version the thin film cathode has a thickness of about 200nm or greater. In some cases, the components of the cathode material (the conversion material) are intermixed in single particles or layers and within these particles or layers are separated from one another on the length scales noted above and/or exist together in a glassy or amorphous state. In some cases, the components are provided in nanodomains.

According to an embodiment, the cathode contains a first thickness of lithium fluoride material configured in either an amorphous or polycrystalline state. In addition, the cathode contains a first plurality of iron metal species nucleated overlying the first thickness of lithium fluoride material. The cathode also has a second thickness of lithium fluoride material formed overlying the first plurality of iron metal species. The second thickness of lithium fluoride material is configured in either an amorphous or a polycrystalline state to cause formation of a lithiated conversion material. The cathode region may be characterized by an energy density of greater than 80% to about 100% of a theoretical energy density of the cathode region. In various implementations, the plurality of metal species nucleated overlying the first thickness of lithium fluoride material causes formation of exposed regions of the first thickness of lithium fluoride material or a thinner region of iron metal species disposed between a pair of the plurality of iron metal species. For example, each of the first thickness of lithium fluoride material or the second thickness of lithium fluoride material can be characterized by a thickness of 30 nm to 0.2 nm. Each of the first plurality of iron metal species can be characterized by a size 5 nm to 0.2 nm. The plurality of first iron metal species is spatially disposed evenly overlying the thickness of the first thickness of lithium fluoride material.

Cathode Morphology—Metal Compound Particles/Nanodomains

For devices in which the cathode includes a metal compound component and an optional MEIC, in one version the cathode comprises the optional MEIC and particles/nanodomains of the metal compound component. The particles or nanodomains containing the metal compound component may generally be of any shape and size. In one version, at least some of the particles or nanodomains containing the metal component are approximately spherical. However, they may be other shapes as well, such as rods, wires, pillows, polygons, flakes, and combinations of any of these, with or without spheres. As used herein, "approximately spherical" means that none of the three linear dimensions of the particle has a characteristic length that is more than twice the characteristic length of either of the other two dimensions. It should be understood that the approximately spherical particles or nanodomains described below can be substituted with non-spherical particles or nanodomains. In such cases, the recited "diameter" may be viewed as a characteristic dimension of the particles, which characteristic dimension is the shortest path across a particle or nanodomain.

In one version, at least some of the particles or nanodomains containing the metal compound component are approximately spherical and such particles have a median diameter of between about 1 and 20 nm. In one version, at least some of the particles or nanodomains containing the metal compound component are approximately spherical and such particles or nanodomains have a median diameter of between about 3 and 10 nm, or between about 1 and 5 nm. The diameter of the particles or nanodomains may be measured by methods known to those skilled in the art; methods include visual inspection of SEM and TEM micrographs, dynamic light scattering, laser diffraction, etc. In one version, metal compound component comprises particles or nanodomains of iron fluoride. In one version, the metal compound component comprises particles or nanodomains of iron fluoride (ferric fluoride and/or ferrous fluoride) at least some of which are approximately spherical and such spherical particles or nanodomains have a median diameter of between about 1 and 20 nm. In one version, the metal compound component comprises particles or nanodomains of iron fluoride at least some of which are approximately spherical and such spherical particles or nanodomains have a median diameter of between about 3 and 10 nm, or between about 1 and 5 nm. In one version, metal compound component comprises particles or nanodomains of copper fluoride. In one version, the metal compound component comprises particles or nanodomains of copper fluoride at least some of which are approximately spherical and such spherical particles or nanodomains have a median diameter of between about 1 and 20 nm. In one version, the metal compound component comprises particles or nanodomains of copper fluoride at least some of which are approximately spherical and such spherical particles or nanodomains have a median diameter of between about 3 and 10 nm, or between about 1 and 5 nm. In one version, metal compound component comprises particles or nanodomains of cobalt fluoride. In one version, the metal compound component comprises particles or nanodomains of cobalt fluoride at least some of which are approximately spherical and such spherical particles or nanodomains have a median diameter of between about 1 and 20 nm. In one version, the metal compound component comprises particles or nanodomains of cobalt fluoride at least some of which are approximately spherical and such spherical particles or nanodomains have a median diameter of between about 3 and 10 nm, or between about 1 and 5 nm. In one version, the metal compound component comprises particles or nanodomains of manganese fluoride at least some of which are approximately spherical and such spherical particles or nanodomains have a median diameter of between about 1 and 20 nm. In one version, the metal compound component comprises particles or nanodomains of manganese fluoride at least some of which are approximately spherical and such spherical particles or nanodomains have a median diameter of between about 3 and 10 nm, or between about 1 and 5 nm. In some cases, the components of the cathode material (the conversion material) are intermixed in single particles as described herein and within these particles they are separated from one another on the length scales noted above and/or exist together in a glassy or amorphous state.

In one version, the cathode comprises an MEIC component and particles of a metal compound component embedded in a matrix of the MEIC component. The particles or nanodomains of the metal compound component may be as described above.

Cathode Morphology—Metal Particles/Nanodomains and Lithium Compound Particles/Nanodomains For devices in which at some state of charge the positive electrode active material includes a metal component, a lithium compound component and an optional MEIC, in one version the positive electrode comprises the optional MEIC and particles or nanodomains of the metal component and particles or nanodomains of the lithium compound component. The particles of the metal component and the particles of the lithium compound component may generally be of any shape and size. Such active material may include some particles or nanodomains containing only metal and other particles or nanodomains containing only lithium compound (rather than particles containing both metal and lithium compound). In other embodiments, some or all of the particles contain both the metal and lithium compound. Unless stated otherwise herein, the particles may be either homogeneous (containing only metal, lithium compound or other material) or heterogeneous containing two more more materials in a single particle (e.g., containing both metal and lithium compound in a particle). When they are heterogeneous, the components of the cathode material (the conversion material) are intermixed in single particles and within these particles they are separated from one another on the length scales noted above and/or exist together in a glassy or amorphous state.

In one version, at least some of the particles or nanodomains of the metal component are approximately spherical. In one version, at least some of the particles or nanodomains of the metal component are approximately spherical and such particles or nanodomains have a median diameter of between 1 and 20 nm. In one version, at least some of the particles or nanodomains of the metal component are approximately spherical and such particles or nanodomains have a median diameter of between about 3 and 10 nm. In one version, the metal component comprises particles or nanodomains of iron. In one version, the metal component comprises particles or nanodomains of iron at least some of which are approximately spherical and such spherical particles or nanodomains have a median diameter of between about 1 and 20 nm. In one version, the metal component comprises particles or nanodomains of iron at least some of which are approximately spherical and such spherical particles or nanodomains have a median diameter of between about 3 and 10 nm, or between about 1 and 5 nm. In one version, the metal component comprises particles or nanodomains of copper. In one version, the metal component comprises particles or nanodomains of copper at least some of which are approximately spherical and such spherical particles or nanodomains have a median diameter of between about 1 and 20 nm. In one version, the metal component comprises particles or nanodomains of copper at least some of which are approximately spherical and such spherical particles or nanodomains have a median diameter of between about 3 and 10 nm, or between about 1 and 5 nm. In one version, the metal component comprises particles or nanodomains of cobalt. In one version, the metal component comprises particles or nanodomains of cobalt at least some of which are approximately spherical and such spherical particles or nanodomains have a median diameter of between about 1 and 20 nm. In one version, the metal component comprises particles or nanodomains of cobalt at least some of which are approximately spherical and such spherical particles or nanodomains have a median diameter of between about 3 and 10 nm, or between about 1 and 5 nm. In some embodiments, the metal component particles or nanodomains may have other shapes such as rods, wires, pillows, polygons, flakes, and combinations of any of these, with or without spheres. Any such particles or nanodomains can possess a characteristic dimension in the ranges identified here as diameters.

In one version, at least some of the particles or nanodomains of the lithium compound component are approximately spherical. In one version, at least some of the particles or nanodomains of the lithium compound component are approximately spherical and such particles or nanodomains have a median diameter of between about 1 and 20 nm. In one version, at least some of the particles or nanodomains of the lithium compound component are approximately spherical and such particles or nanodomains have a median diameter of between about 1 and 10 nm, or between about 1 and 5 nm. In one version, the lithium compound component comprises particles or nanodomains of lithium fluoride. In one version, the lithium compound component comprises particles or nanodomains of lithium fluoride at least some of which are approximately spherical and such spherical particles or nanodomains have a median diameter of between about 1 and 20 nm. In one version, the lithium compound component comprises particles or nanodomains of lithium fluoride at least some of which are approximately spherical and such spherical particles or nanodomains have a median diameter of between about 3 and 10 nm, or between about 1 and 5 nm. In some embodiments, the lithium compound particles or nanodomains may have other shapes such as rods, wires, pillows, polygons, flakes, and combinations of any of these, with or without spheres. Any such particles or nanodomains can possess a characteristic dimension in the ranges identified here as diameters.

In one version, the positive electrode includes an optional MEIC component, particles of iron or nanodomains and particles or nanodomains of lithium fluoride. In one version of this device, at least some of the iron particles or nanodomains are approximately spherical and such particles or nanodomains have a median diameter of between about 1 and 20 nm. In another version of this device, at least some of the iron particles or nanodomains are approximately spherical and such particles or nanodomains have a median diameter of between about 3 and 10 nm, or between about 1 and 5 nm. In some of these versions, at least some of the lithium fluoride particles or nanodomains are approximately spherical and such particles or nanodomains have a median diameter of between about 1 and 20 nm. In some embodiments, the iron and/or lithium fluoride particles or nanodomains may have other shapes such as rods, wires, pillows, polygons, flakes, and combinations of any of these, with or without spheres. Any such particles or nanodomains can possess a characteristic dimension in the ranges identified here as diameters.

In one version, the positive electrode includes an optional MEIC component, particles or nanodomains of copper and particles or nanodomains of lithium fluoride. In one version of this device, at least some of the copper particles or nanodomains are approximately spherical and such particles or nanodomains have a median diameter of between about 1 and 20 nm. In another version of this device, at least some of the copper particles or nanodomains are approximately spherical and such particles or nanodomains have a median diameter of between about 3 and 10 nm, or between about 1 and 5 nm. In some embodiments, the copper particles or nanodomains may have other shapes such as rods, wires, pillows, polygons, flakes, and combinations of any of these, with or without spheres. Any such particles or nanodomains can possess a characteristic dimension in the ranges identified here as diameters.

In one version, the positive electrode includes an optional MEIC component, particles or nanodomains of cobalt and particles or nanodomains of lithium fluoride. In one version of this device, at least some of the cobalt particles or nanodomains are approximately spherical and such particles or nanodomains have a median diameter of between about 1 and 20 nm. In another version of this device, at least some of the cobalt particles or nanodomains are approximately spherical and such particles or nanodomains have a median diameter of between about 3 and 10 nm, or between about 1 and 5 nm. In some embodiments, the cobalt particles or nanodomains may have other shapes such as rods, wires, pillows, polygons, flakes, and combinations of any of these, with or without spheres. Any such particles or nanodomains can possess a characteristic dimension in the ranges identified here as diameters.

In one version in which the positive electrode includes a metal component and a lithium compound component and an optional MEIC component, the cathode comprises an optional MEIC component and particles or nanodomains of the metal component embedded in a matrix of the lithium compound component. In one version, at least some of the particles or nanodomains of the metal component are approximately spherical. In one version, at least some of the particles or nanodomains of the metal component are approximately spherical and such particles or nanodomains have a median diameter of between about 1 and 20 nm. In one version, at least some of the particles or nanodomains of the metal component are approximately spherical and such particles or nanodomains have a median diameter of between about 3 and 10 nm, or between about 1 and 5 nm. In some embodiments, the metal component particles or nanodomains may have other shapes such as rods, wires, pillows, polygons, flakes, and combinations of any of these, with or without spheres. Any such particles or nanodomains can possess a characteristic dimension in the ranges identified here as diameters.

In one version, the positive electrode includes an optional MEIC component, particles or nanodomains of iron and a matrix of lithium fluoride. In one version of this device, at least some of the iron particles or nanodomains are approximately spherical and such particles or nanodomains have a median diameter of between about 1 and 20 nm. In another version of this device, at least some of the iron particles or nanodomains are approximately spherical and such particles or nanodomains have a median diameter of between about 3 and 10 nm, or between about 1 and 5 nm. In some embodiments, the iron particles or nanodomains may have other shapes such as rods, wires, pillows, polygons, flakes, and combinations of any of these, with or without spheres. Any such particles or nanodomains can possess a characteristic dimension in the ranges identified here as diameters.

In one version, the positive electrode includes an optional MEIC component, particles or nanodomains of copper and a matrix of lithium fluoride. In one version of this device, at least some of the copper particles or nanodomains are approximately spherical and such particles or nanodomains have a median diameter of between about 1 and 20 nm. In another version of this device, at least some of the copper particles or nanodomains are approximately spherical and such particles or nanodomains have a median diameter of between about 3 and 10 nm, or between about 1 and 5 nm. In some embodiments, the copper particles or nanodomains may have other shapes such as rods, wires, pillows, polygons, flakes, and combinations of any of these, with or without spheres. Any such particles or nanodomains can possess a characteristic dimension in the ranges identified here as diameters.

In one version, the positive electrode includes an optional MEIC component, particles or nanodomains of cobalt and a matrix of lithium fluoride. In one version of this device, at least some of the cobalt particles or nanodomains are approximately spherical and such particles or nanodomains have a median diameter of between about 1 and 20 nm. In another version of this device, at least some of the cobalt particles or nanodomains are approximately spherical and such particles or nanodomains have a median diameter of between about 3 and 10 nm, or between about 1 and 5 nm. In some embodiments, the cobalt particles or nanodomains may have other shapes such as rods, wires, pillows, polygons, flakes, and combinations of any of these, with or without spheres. Any such particles or nanodomains can possess a characteristic dimension in the ranges identified here as diameters.

In one version in which the positive electrode includes a metal compound and a lithium compound component and an MEIC component, the cathode contains particles or nanodomains of the metal compound and the lithium compound component embedded in a matrix of the MEIC material. In one version, at least some of the particles or nanodomains of the metal compound and/or at least some particles or nanodomains of the lithium compound component are approximately spherical. In one version, at least some of the particles or nanodomains of the metal compound and/or the lithium compound are approximately spherical and such particles or nanodomains have a median diameter of between about 1 and 20 nm. In one version, at least some of the particles or nanodomains of the metal compound and/or the lithium compound are approximately spherical and such particles or nanodomains have a median diameter of between about 3 and 10 nm, or between about 1 and 5 nm. In some embodiments, the metal compound and/or lithium compound particles or nanodomains may have other shapes such as rods, wires, pillows, polygons, flakes, and combinations of any of these, with or without spheres. Any such particles or nanodomains can possess a characteristic dimension in the ranges identified here as diameters.

Cathode Morphology—Lithium Metal Compound Particles or Nanodomains

For devices in which at some state of charge the positive electrode includes a lithium metal compound component and an optional MEIC, in one version the electrode includes the optional MEIC and particles or nanodomains of the lithium metal compound component. The particles or nanodomains of the lithium metal compound component may generally be of any shape and size.

In one version, at least some of the particles or nanodomains of the lithium metal compound component are approximately spherical. In one version, at least some of the particles or nanodomains of the lithium metal compound component are approximately spherical and such particles or nanodomains have a median diameter of between about 1 and 20 nm. In one version, at least some of the particles or nanodomains of the lithium metal compound component are approximately spherical and such particles or nanodomains have a median diameter of between about 3 and 10 nm, or between about 1 and 5 nm. In one version, the lithium metal compound component comprises particles or nanodomains of lithium iron fluoride or lithium copper fluoride or lithium cobalt fluoride. In one version, the lithium metal compound component comprises particles or nanodomains of lithium iron fluoride (or lithium copper fluoride or lithium cobalt fluoride) at least some of which are approximately spherical and such spherical particles or nanodomains have a median diameter of between about 1 and 20 nm. In one version, the lithium metal compound component comprises particles or nanodomains of lithium iron fluoride (or lithium copper fluoride or lithium cobalt fluoride) at least some of which are approximately spherical and such spherical particles or nanodomains have a median diameter of between about 3 and 10 nm, or between about 1 and 5 nm.

Solid State Electrolyte

The solid state electrolyte may generally be made of any material that is compatible with the other materials of the device, which has a lithium ion conductivity large enough to allow passage of lithium ions for functioning of the device and has an electronic conductivity small enough for functioning of the device. In one version the solid state electrolyte has a lithium ion conductivity of greater than $10^{-7}$ S/cm at 100 degrees celsius. Preferably, the material has an ion conductivity of at least $10^{-5}$ S/cm, and even more preferably the material has an ion conductivity of greater than $10^{-4}$ S/cm at 100 degrees celsius. In one version the solid state electrolyte has an electronic conductivity of less than $10^{-10}$ S/cm at 100 degrees celsius. In one version, the solid state electrolyte is selected from LiPON, lithium aluminum fluoride, $Li_2O-SiO_2-ZrO_2$, Li—Al—Ti—P—O—N, $Li_{3x}La_{2/3-x}TiO_3$, $Li_{10}GeP_2S_{12}$, $Li_{1.5}Al_{0.5}Ge_{1.5}(PO_4)_3$, $Li_7La_3Zr_2O_{12}$, $Li_9SiAlO_8$, $Li_3Nd_3Te_2O_{12}$, $Li_5La_3M_2O_{12}$ (M=Nb,Ta), $Li_{5+x}M_xLa_{3-x}Ta_2O_{12}$ (M=Ca,Sr,Ba), LiPON, lithium phosphate, Lisicon, thio-lisicon, $Li_2S$—X (X=$SiS_2$, $GeS_2$, $P_2S_5$, $B_2S_3$, $As_2S_3$), $Li_aAl_bGa_cB_dSe_e(PO_4)_f$, $Li_aAl_b$-$Ga_cB_dSe_e(BO_3)_f$, $Li_aGe_bSi_cS_d(PO_4)_e$, $Li_aGe_bSi_cS_d(BO_3)_e$, antiperovskite hydrate, glassy structures, lanthanum lithium titanate, garnet structures, β" alumina, and other lithium solid electrolytes. In one version, the solid state electrolyte is LiPON. In one version, the solid state electrolyte is a lithium aluminum fluoride. In one version, the solid state electrolyte is $LiAlF_4$. In certain embodiments, a liquid or gel electrolyte is used without a solid state electrolyte. Such electrolyte may be any of the types employed with conventional lithium ion cells.

Anode Material

The negative electrode may generally be made of any material that is compatible with the other materials of the device and which may store lithium atoms or ions when the device is in the charged state and may provide lithium ions for incorporation into the cathode when the device is in the discharged state. In one version of the devices the negative electrode active material is lithium metal. In one version of the devices the negative electrode material is a lithium silicide, Li—Sn, or other high capacity, low voltage material that alloys with lithium. In one version of the devices, the negative electrode active material is lithium intercalated into a carbon component, such as graphite. In some cases, the negative electrode active material is a material capable of inserting lithium ions at a higher reversible capacity than carbon. Such materials include tin, magnesium, germanium, silicon, oxides of these materials and the like.

In one version of the devices, the negative electrode material is a porous material that allows lithium plating into the pores, thereby relieving the swelling stress that would otherwise result on the electrolyte by anode swelling as a result of lithium plating. In one version, the pores are carbon nanotubes, carbon buckyballs, carbon fibers, activated carbon, graphite, porous silicon, aerogels, zeolites, xerogels, etc.

In one version of the devices, the anode is formed in situ during the first charge cycle of the battery. In case the device is fabricated in the discharged state (with a lithiated cathode), the first charge cycle will extract the lithium from the cathode and deposit it on the anode side. In the case where the anode is a lithium metal anode, the anode is therefore formed in situ by plating on the anode current collector. In this case, preferably, the anode current collector is a metal that does not alloy with or react with lithium; a non limiting list of possible choices for anode current collector metal includes TaN, TiN, Cu, Fe, stainless steel, steel, W, Ni, Mo, or alloys thereof. In one version, there is an excess of lithium in the device as fabricated on the cathode side. In another version, there is an excess of lithium in the device as fabricated on the anode side, possibly in the anode current collector. An excess of lithium is desirable to prolong the cycle life of the battery, as some lithium will inevitably be lost due to side reactions, alloying with current collectors, or in reactions with air and/or water that leak into the device.

In one version of the devices, there is an encapsulation that substantially prevents ingress of air and water into the active materials. The encapsulation may be LiPON, an oxide, nitride, oxynitride, resin, epoxy, polymer, parylene, metals such as Ti or Al, or multilayer combinations thereof. Moisture and oxygen barriers are known in food packaging, semiconductor packaging, etc.

Current Collectors

The devices described herein include optional positive and/or negative electrode current collectors. The current collectors generally may be made of any material capable of delivering electrons to the anode or the cathode from the external circuit or delivering electrons to the external circuit from the anode and cathode. In one version the current collectors are made of a highly electronically conductive material such as a metal. In one version, the device does not include a cathode current collector and electrons are transferred to and from the cathode directly to the external circuit. In one version, the device does not include an anode current collector and electrons are transferred to and from the anode directly to the external circuit. In one version, the device does not include either a cathode current collector or an anode current collector. In one version the negative electrode current collector is copper. In one version the negative current collector is a copper alloy. In one version, the negative current collector is copper alloyed with a metal selected from nickel, zinc and aluminum or copper coated on a metal or polymer foil. In one version the current collector is copper and also includes a layer of a non-copper metal disposed between the copper and the cathode or anode material. In one version the positive current collector is copper and also includes a layer of nickel, zinc or aluminum disposed between the copper and the anode material. In one version, the positive current collector is aluminum. In one version, the positive current collector is aluminum or an aluminum alloy. In one version, the positive current collector is aluminum and also includes a layer of a non-aluminum metal disposed between the aluminum and the cathode or anode material. In one version, the current collector is steel or stainless steel. In one version, the current collector is steel or stainless steel and also includes a layer of a non-steel metal disposed between the steel and the cathode or anode material. The positive electrode current collector and negative electrode current collector may be different materials chosen among those enumerated above or otherwise.

Energy Density

In one version, a device as described herein has an energy density of at least about 50 Whr/kg or between about 50 and 1000 Whr/kg when measured at a temperature of 100 degrees Celsius when cycled between 1 and 4V vs Li and at a current rate of at least about 200 mAh/g of cathode active material. In another version, a device as described herein has an energy density of between about 100 and 750 Whr/kg. In another version, a device as described herein has an energy density of between about 250 and 650 Whr/kg. In another version, a device as described herein has an energy density of greater than about 250 Whr/kg. As used herein, energy density is the energy density at the device level; i.e., the total energy stored in the device divided by the mass of the device, where the mass of the device includes the mass of the anode, cathode, electrolyte, current collectors and packaging of the device. From a volumetric perspective, in certain embodiments, the device has an energy density of at least about 600 Wh/L under the conditions set forth above.

In one version, a positive electrode as described herein has an electrode energy density of between about 500 and 2500 Whr/kg when measured at a temperature of 100 degrees. In another version, a positive electrode as described herein has an electrode energy density of between about 800 and 1750 Whr/kg. In another version, a positive electrode as described herein has an energy density of between about 1000 and 1600 Whr/kg. In another version, a positive electrode as described herein has an energy density of greater than about 1000 Whr/kg. As used herein, electrode energy density is the energy density at the electrode level; i.e., the total energy stored in the device divided by the mass of the positive electrode in the discharged state, where the mass of the electrode includes the mass of the electrochemically active material, lithium, positive current collector, and any electrochemically inactive components in the cathode such as ion or electron conductor additives.

Mixed Fluoride/Sulfide Cathodes

In one version, at some point in the state of charge, the cathode includes a metal component and a lithium compound component containing lithium, fluorine and sulfur. In one version, the lithium compound component contains a mixture of lithium fluoride and lithium sulfide. In one version, the lithium compound component contains a lithium sulfur-fluoride. In one version, the cathode contains lithium, fluorine, sulfur and a metal component selected from iron, copper, cobalt, manganese, bismuth, or alloys of those metals. In one version, the cathode contains compounds including lithium, fluorine, sulfur and iron. In one version, the cathode contains lithium fluoride, lithium sulfide and a metal component selected from iron, copper, cobalt, manganese, bismuth, or alloys of any of these metals. In one version, the cathode contains lithium fluoride, lithium sulfide and iron. In one version, the cathode contains between about 30 and 80 weight percent lithium fluoride (3LiF+Fe would be 58 wt % LiF), between about 1 and 20 weight percent lithium sulfide and a metal component. In one version, the cathode contains between about 40 and 70 weight percent lithium fluoride, between about 2 and 15 weight percent lithium sulfide and between about 30 and 60 weight percent iron. In one version, the cathode contains between about 50 and 70 weight percent lithium fluoride, between about 0 and 20 weight percent lithium sulfide and between about 20 and 50 weight percent iron. In one version, when the electrochemical cell is in a relatively discharged state the cathode contains lithium fluoride, lithium sulfide and a metal component and in a more charged state contains metal fluoride and lithium sulfide and optional lithium fluoride and metal components. In such version the cathode in the more charged state is substantially free of metal sulfide. In one version, when the electrochemical cell is in a relatively discharged state the cathode contains lithium fluoride, lithium sulfide and iron and in a more charged state contains iron fluoride and lithium sulfide and optional lithium fluoride and iron components. In such version the cathode in the more charged state is substantially free of metal sulfide. In one version, when the electrochemical cell is in a relatively discharged state the cathode contains lithium fluoride, lithium sulfide and a metal component and in a more charged state contains metal fluoride and metal sulfide and optional lithium fluoride lithium sulfide and metal components. In one version, when the electrochemical cell is in a relatively discharged state the cathode contains lithium fluoride, lithium sulfide and iron and in a more charged state contains iron fluoride and iron sulfide and optional lithium fluoride, lithium sulfide and iron components. In other versions, the sulfide component may be iron sulfide (FeS or $FeS_2$), iron sulfate, copper sulfide, lithium sulfide ($Li_xS$), and/or solid sulfur. It has been found that FeS, $FeS_2$, and $Li_2S$ are significantly better lithium ion conductors than other oxides known to conduct lithium such as LiPON, $MoO_x$, $VO_x$, $LiFePO_4$, and lithium titanate.

In some implementations, a cell containing a positive electrode with a sulfide or other conductivity enhancing agent is cycled in a range where the conductivity enhancing agent does not react. Iron sulfide is known to convert to elemental iron and sulfur at a potential of about 1.7 volts versus the lithium/lithium ion couple. It is believed that elemental sulfur may harm certain solid electrolytes (particularly oxide-type solid electrolytes), so it may be desirable to prevent formation of sulfur during normal cycling. In order to prevent electrochemical reduction of sulfides to form sulfur, the device would be configured through the use of a battery management circuit or other control mechanism to prevent the positive electrode from reaching 1.7 volts during discharge. In general, the "cutoff" voltage is chosen so that the desired electrochemical reaction occurs to completion or near completion (all or most of the electrochemically active material in the electrode is converted) but the conductivity enhancing component does not react. In the case of the iron fluoride-iron sulfide system, a discharge voltage of between about 1.8 and 2.2 volts (e.g., about 2 volts) versus the lithium/lithium ion couple is generally suitable. Iron fluoride converts to lithium iron fluoride at about 3 volts and further converts to lithium fluoride and elemental iron at about 2.2 volts.

In certain embodiments, the device includes an interlayer disposed between the positive electrode and the electrolyte. Such interlayer may block sulfur or other species from migrating to the electrolyte and damaging it. Therefore, the interlayer should effectively block diffusion of sulfur and/or other potentially detrimental species between the electrolyte and the positive electrode. The interlayer should also conduct lithium ions and be stable at the cathode operating voltages and versus the cathode materials and the electrolyte materials. Examples of interlayer materials and properties are presented herein in the section on the cathode/electrolyte interlayer.

In some embodiments, a matrix or other strong binding agent is employed to maintain a conductivity enhancing material and the cathode active material in close proximity during repeated cycling. It has been observed that the conductivity enhancing material (e.g., iron sulfide) and the cathode active material may segregate over time during normal cycling. If this occurs, then electrode performance suffers. The conductivity enhancing material should be in close proximity (typically in the nanometer scale) to the electrochemically active material. This close proximal relation can be established during manufacture and then maintained by use of a matrix during cycling. The matrix is an ionic and electronic conductor. Examples of suitable matrix materials include LiF, $AlF_3$, $LiAlF_4$, $SiO_2$, $Al_2O_3$, $MoO_3$, $MoS_2$, $LiFePO_4$, $VO_x$, and $LiTiO_x$.

Figure 3:
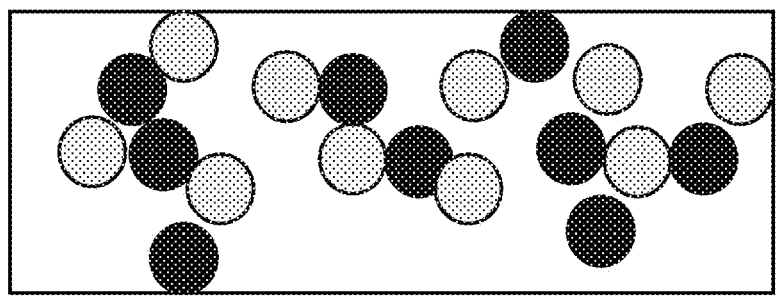
FIG. 3 schematically depicts a matrix material provided as a continuous layer that embeds separate particles or nanodomains of active material and conductivity enhancing agent.
Figure 3:
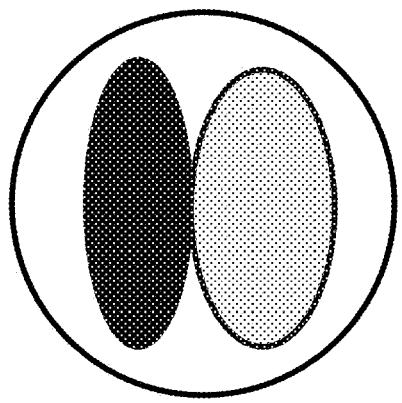

In certain versions, the matrix material is provided as a continuous layer that embeds separate particles or nanodomains of active material and conductivity enhancing agent. See FIG. 3 for two examples. For example, a matrix embeds, when the positive electrode is in the discharged state, separate particles or nanodomains of (i) iron sulfide and (ii) elemental iron and lithium fluoride. In another example, the matrix embeds, when the positive electrode is in the discharged state, separate particles or nanodomains of (i) iron sulfide (ii) elemental iron, and (iii) lithium fluoride. In some implementations, the conductivity enhancing agent is provided in a core-shell arrangement, with the active material (e.g., iron and/or lithium fluoride) coated by the conductivity enhancing agent (e.g., iron sulfide). Such core-shell particles may be embedded in a matrix as described above. In certain versions, the matrix, the active material and the conductivity enhancing agent are provided in the same small particles. As an example, the matrix material may encapsulate two or more small particles or nanodomains, at least one of which is of the active material and at least another of which of the conductivity enhancing agent. In some implementations, the composite particle may have a median characteristic dimension of about 5 nm to 100 nm.

Cathode/Electrolyte Interlayer

In one version, the positive electrode in the discharged state contains a metal component and an interlayer disposed between the cathode and electrolyte, such interlayer being substantially impermeable to the metal component. In some implementations, the interlayer improves cycling performance by preventing migration and/or reaction of the cathode materials with the electrolyte. In one version, the interlayer includes one or more of the following: lithium fluoride, silica, aluminum phosphate, aluminum fluoride, alumina, and molybdenum oxide. In one version, the interlayer is lithium fluoride. In one version, the interlayer is silica. In one version, the positive electrode contains iron and the interlayer is lithium fluoride. In one version, the electrode contains iron and the interlayer is silica. In one version the interlayer has a thickness of between about 2 and 50 nm. In one version, the cathode contains iron and the interlayer is lithium fluoride with a thickness of between about 2 and 50 nm. In one version, the positive electrode contains iron and the interlayer is silica with a thickness of between about 2 and 50 nm. In one version, the electrolyte is LiPON, the positive electrode contains iron and the interlayer is lithium fluoride. In one version, the positive electrode contains iron and the interlayer is silica. In one version, the positive electrode contains iron and the interlayer is lithium fluoride with a thickness of between about 2 and 50 nm. In one version, the positive electrode contains iron and the interlayer is silica with a thickness of between about 2 and 50 nm.

Relatively Small Amount of Excess Lithium

Conventional lithium ion cells as fabricated often contain a large excess of lithium over what is needed for full charge and discharge of the cell. Particularly, solid state and/or thin film lithium ion cells contain a large excess of lithium over what is needed for full discharge of the cell. Negative electrodes with large excess lithium will not change in volume by a large fractional amount. For instance, it is common to use 4× excess lithium. In operation, the cell is cycled to only about 20% of the anode lithium, so the volume change is only 20%.

In one version of the cells described herein there is a relatively small amount of excess lithium. In one version, there is less than about 25% by weight of excess lithium. Without mitigation, only 25% excess lithium would result in negative electrode volume change of about 500%, which places much higher stresses on the electrolyte.

One way to address this challenge is by modifying the electrode structure(s) to control volume change. Further, a glassy electrolyte may tolerate flexes caused by volumetric changes in the negative electrode on the order of 100%. In certain embodiments, excess lithium is plated into open pores, typically in the negative electrode, which relieve the swelling force on the electrolyte. In various embodiments, the pores occupy the same volume whether they are full of lithium or empty. Therefore, when lithium is plated in the pores, the electrolyte does not experience any significant stress. Examples of materials that can provide suitable pores include nanotubes (e.g., carbon nanotubes), carbon buckyballs, carbon fibers, activated carbon, graphite, porous silicon, aerogels, zeolites, xerogels, and the like.

Another way to address the volumetric expansion associated with limited excess lithium in the cell involves using a cell architecture including "multi-stacks" of relatively thinner layers. Each stack includes an anode layer, an electrolyte layer, and a cathode layer. A "one stack" battery (conventional) has all the lithium in one anode of at least 50-200 um thickness, and the volume change of that anode would cause a 50-200 um swelling, which the cell cannot tolerate. However, if the cell contains tens (or hundreds, or thousands) of stacks in a single cell, each of which is, e.g., 100 s of nm in thickness, the system will be better matched between the contraction of the anode to the expansion of the cathode, and the electrolyte may be more able to accommodate a flex of 100 s of nm than 100 s of um. In some examples, a multi-stack configuration would use, for instance, 100 layers of anode/electrolyte/cathode, each layer $1/100^{th}$ as thick as conventional. An example is presented in FIG. 5 below. This design delivers the same amount of energy and the same energy density as a conventional cell, but offers distinct advantages. As explained, stresses are better tolerated on the nanoscale than the macroscale. So having 100 anodes change volume by 100 nm each is more stable than having 1 anode change volume by 10 um.

Additionally, lithium reduction in the cell may be facilitated by using an all solid state system, which significantly reduce or eliminate SEI formation (or more generically, first cycle coulombic inefficiency). The SEI consumes lithium and as a result, the cell must include excess lithium as fabricated.

In certain embodiments, some or all excess lithium in a cell is provided in the positive electrode as fabricated. In some embodiments, the positive electrode material has some quantity of elemental lithium together with the other components described above (e.g., metal and lithium compound particles or nanodomains). In some examples, lithium metal is present in the positive electrode active material at a level of less than about 50% by weight or less than about 30% by weight.

Space-Charge Effects

In one version, the cathode contains two or more components that have different energies of formation of Frenkel defects or different volume or areal concentrations of species. At the interface, an exchange of species resulting from the difference of defect formation energy or concentration causes a space charge layer. In this space charge layer, faster transport of at least one species may result. The species may be lithium ions, lithium vacancies, fluorine atoms, fluorine vacancies, metal atoms, or metal vacancies. In one version, the cathode contains two or more components selected copper fluoride, titanium oxide, lithium fluoride, cobalt fluoride and iron fluoride. In one version, the cathode contains copper fluoride and iron fluoride.

In one version, the lithium and/or metal compounds form nanodomains that improve charge and/or mass transport. In one version, the transport is improved via transport at or along grain boundaries. In one version, there may be a space-charge or ion superhighway effect at grain boundaries due to a depletion or enhancement in the vacancy or interstitial concentration of the diffusing species. See Sata et al, Nature 408 (2000) 946, which is incorporated herein by reference in its entirety. In a non-limiting example, such an effect is observed at a junction between LiF and $TiO_2$, wherein charge transport is improved via a transfer of $Li^+$ that results in an increase of lithium vacancy conductivity in LiF. See Li et al, Nano Lett., 12 (2012) 1241, which is incorporated herein by reference in its entirety. As non-limiting examples, such a space charge effect may improve the fluorine, lithium, or other atom conductivity at a grain boundary between two materials chosen from: Li, LiF, lithium sulfide, iron, iron fluoride, iron oxide, iron oxyfluoride, bismuth, bismuth fluoride, cobalt, cobalt fluoride, copper oxide, copper sulfide, copper, copper fluoride, aluminum, aluminum fluoride, carbon, carbon fluoride, etc.

Applications for the Devices

The devices described herein may generally be used in any application requiring energy storage. The devices may be particularly well suited for in applications such as in electric vehicles, hybrid electric vehicles, consumer electronics, medical electronics, and grid storage and regulation.

Electrode Fabrication Process

The positive electrodes described herein can be fabricated by many different processes. The following is a list of manufacturing options, including methods of material synthesis as well as coating on a substrate:

Vacuum processes, including Sputtering, Evaporation, reactive evaporation, Vapor phase deposition, CVD, PECVD, MOCVD, ALD, PEALD, MBE, IBAD, and PLD.

Wet synthesis, including CBD, Electroplating, Spraying & in situ formation, Langmuir, Langmuir Blodgett, Layer-by-Layer, electrostatic spray deposition, ultrasonic spray deposition, aerosol spray pyrolysis, sol gel synthesis, one pot synthesis, and other bottom-up methods.

Dry synthesis, including pressing, hot pressing, cold pressing, isostatic pressing, sintering, spark plasma sintering, flame pyrolysis, combustion synthesis, plasma synthesis, atomization, and melt spinning Top-down methods such as jet milling, wet/dry milling, planetary milling, and high energy milling.

Coating methods such as slot-die, spin coating, dip coating, doctor blade, metering rod, slot casting, screen printing, inkjet printing, aerosol jet, knife-over roll, comma coating, reverse comma coating, tape casting, slip casting, gravure coating, and microgravure coating.

Processes that are exclusively material synthesis include sol gel synthesis, one pot synthesis, bottom-up synthesis, melt spinning Processes that are exclusively particle size reduction include wet milling, dry milling, planetary milling, high energy milling, jet milling. Processes that are exclusively coating include slot-die, spin coating, dip coating, doctor blade, metering rod, slot casting, screen printing, inkjet printing, aerosol jet, knife-over roll, comma coating, reverse comma coating, tape casting, slip casting, gravure coating, microgravure coating. All other listed processes are some hybrid of synthesis/deposition.

Suitable deposition processes include evaporation, vapor phase deposition, CBD, and slurry coating. Suitable processes for particle formation/downsizing include dry milling, wet milling, high energy milling, or bottom-up chemical synthesis.

In certain embodiments, the positive electrode material is produced using sputtering, PVD, ALD or CBD. In one method described herein, the devices are fabricated by sputtering using an Endura 5500, 200 mm by Applied Materials of San Jose Calif. In one version, the devices are fabricated by sequential deposition of the anode current collector, anode, electrolyte, cathode, and cathode current collector on a substrate. In one version, there is no separate substrate and the anode, electrolyte, cathode, and cathode current collector are deposited directly on the anode current collector. In one version, there is no separate substrate and the cathode, electrolyte, anode, and anode current collector are deposited directly on the cathode current collector.

An example fabrication sequence follows. Starting with a substrate such as a silicon wafer, the process sputters a current collecting layer such as Cu, Al, Ni, W, Ti, TiN, Ta, TaN, or Mo. Using RF or DC sputtering, deposit alternating layers of 3.5 nm LiF and 0.5 nm Fe, both in an argon environment. As one skilled in the art will appreciate, nanostructures will self-form due to the material interfacial energy. Sputtering of alternating layers is done without exposure to the atmosphere between each step. The total thickness of the stack defines the cathode capacity.

Without exposure to atmosphere (particularly water and oxygen), transfer the wafer to a vacuum chamber to sputter LiPON or other solid phase electrolyte. LiPON sputtering is known to those skilled in the art. As a non-limiting example of process conditions, use RF sputtering in a nitrogen plasma at 15 sccm flow rate, 0.01 torr pressure, and 250 watts power over a $Li_3PO_4$ target of 3 in diameter. The LiPON, LiF, and Fe depositions may be shadow-masked so that an area of the bottom current collector is exposed for the electrical test.

FIGS. 4A-D are simplified diagrams illustrating a process for forming a battery cell according to an embodiment. This diagram is merely an example, which should not unduly limit the scope of the claims. One of ordinary skill in the art would recognize many variations, alternatives, and modifications. It is to be appreciated that various steps described below can be added, removed, modified, replaced, re-arranged, repeated, and/or overlapped.

Figure 4A:
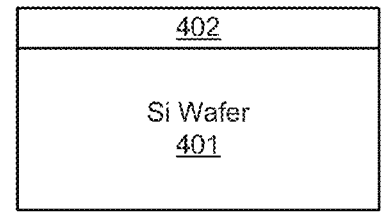
FIGS. 4A-D are simplified diagrams illustrating a process for forming a battery cell according to an embodiment.

As shown in FIG. 4A, a contact layer 402 is formed on the silicon wafer 401. According to an embodiment, battery cells are constructed by sputtering 30 nm Ti and 40 nm TiN on a Si wafer. The Ti and TiN material are used to provide electrical contacts. Depending on the application, other types of conductive materials (e.g., Cu, Al, etc.) can be used as well. For example, the thicknesses of the Ti and/or TiN material can be changed.

Figure 4B:
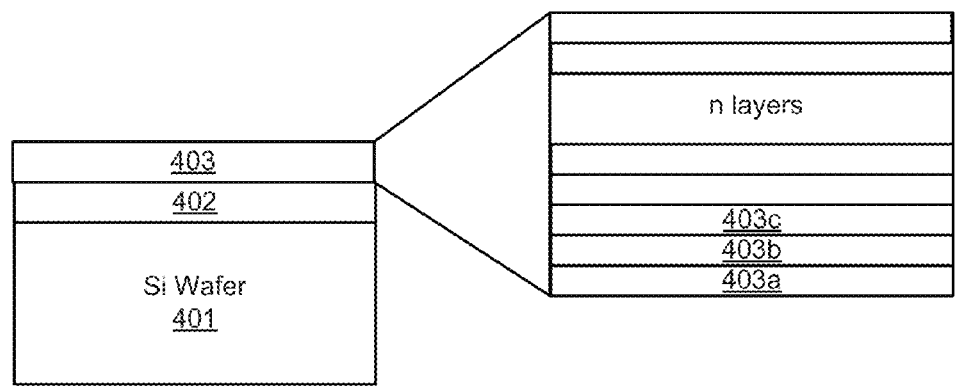

The cathode region 403 is formed and overlays the contact layer 402, as shown in FIG. 4B. In certain embodiments, the cathode region 403 includes multiple cathode layers and are sputtered onto the contact layer 402. As described above, the cathode region 403 includes nanostructured conversion materials. In a specific embodiment, the cathode region 403 comprises layers of material that are mixed together to form the cathode conversion material. In an implementation, the layers are created by making sequential layers of Fe and LiF in the thickness ratio of 1:7, which creates a discharged cell with stoichiometry of Fe+6 LiF. For example, the thickness ratio of 1:7 is based on the stoichiometry of Fe+6 LiF at the discharged state. Depending on the application, other materials may be used to form cathode region 403. In one example, the cathode region 403 includes n layers of Fe and LiF material: 403a being a layer of Fe material, 403b being a layer of LiF material, 403c being a layer of Fe material, and so on. In various embodiments, each cathode layer is very thin (e.g., no thicker than a few nanometers or the size of molecules), which cause the nanostructures of Fe+6LiF to be formed. The sputtering of thin layers facilitates formation of nanostructures. In a specific embodiment, each thin cathode layer is no thicker than one or two layer of Fe atoms or LiF molecules. Due to the nanostructure formation, the cathode region is substantially homogeneous. For example, the nanostructures of Fe+6 LiF form a substantially glassy material. As explained above, as the length scale increases, the cathode performance degrades, showing the benefit of nanostructuring cathodes (or cathode particles or nanodomains) down to less than 10 nm. It is to be understood that while Fe and LiF materials are deposited one layer at a time, the glassy nanostructured materials formed by the Fe and LiF materials are homogeneous and substantially uniform, not layered. Such structures may be created by codepositing the constituent materials. For example, cosputtering or coevaporation of Fe and LiF may create a glassy, amorphous mixture of Fe and LiF.

Figure 4C:
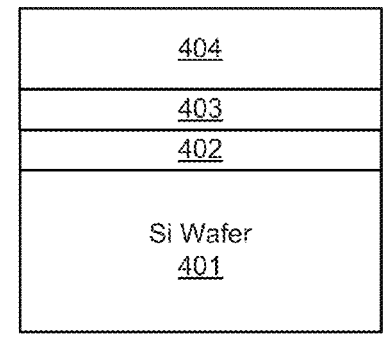

Formation of cathode region 403 may require many repeated sputtering processes. Once the cathode region 403 is formed, an electrolyte region 404 is formed, as shown in FIG. 4C. As explained above, the electrolyte region may comprises solid-state electrolyte material and/or liquid electrolyte material. In a specific embodiment, LiPON electrolyte material with a thickness of about 200 nm is formed and overlays the cathode region 403. It is to be appreciated that other types of materials may be used for electrolyte as well, at different thicknesses.

Figure 4D:
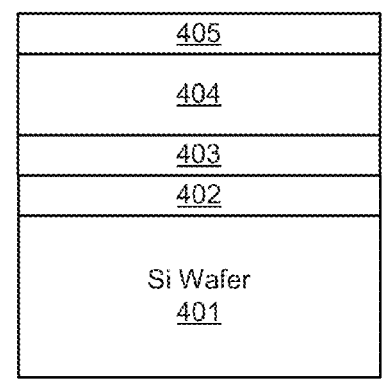

As shown in FIG. 4D, a lithium foil 405 is provided over the electrolyte region 404 to define the battery cell region. For example, the lithium foil 405 has a thickness of about 100 um, and other thicknesses are possible as well. Electrical contacts are made to the TiN and Li foil for measurement on a hot plate maintained at a temperature of about 120° C.

It is to be appreciated that the cathode region 403 with nanostructured conversion materials can be formed in others ways, in addition to the repeated sputtering process described above. According to various embodiments, nanostructured cathode conversion materials can be formed using evaporation processes. For example, materials comprising Fe, Li, and F are evaporated onto the cathode electrical contact layer. In a specific embodiment, a flash evaporation process is performed to allow the Fe and LiF material to evaporate quickly and form substantially uniform and nanostructured cathode conversion material.

In certain embodiments, a conversion material for a cathode is prepared using a process in which one or more precursors or reactants are contacted in solid phase. Many such processes may be used. Collectively they are referred to as solid phase synthesis. Examples include hot pressing, cold pressing, isostatic pressing, sintering, calcining, spark plasma sintering, flame pyrolysis, combustion synthesis, plasma synthesis, atomization, and melt spinning. Some solid phase syntheses involve grinding and mixing of bulk precursor materials. The bulk materials are ground to very small dimensions and then combined or otherwise mixed and reacted as necessary to form the desired composition. Milling may be performed via jet milling, cryo milling, planetary milling (Netzsch, Fritsch), high energy milling (Spex), and other milling techniques known to those skilled in the art. In some embodiments, the ground and mixed particles are calcined. In certain embodiments, the grinding apparatus produces particles or nanodomains having median characteristic dimensions on the order of about 20 nm or less. An examples of solid phase synthesis processes for producing iron fluoride conversion materials are set forth in U.S. Provisional Patent Application No. 61/814,821, filed Apr. 23, 2013, and titled "NANOSTRUCRUED MATERIALS FOR ELECTROCHEMICAL CONVERSION REACTIONS", U.S. Provisional Patent Application No. 61/803,802, filed Mar. 21, 2013, and titled "METHOD FOR FORMING IRON FLUORIDE MATERIAL", both of which are incorporated herein by reference in its entirety. In various embodiments, one reactant contains iron and another reactant contains fluorine. For example, one reactant may be an iron compound containing an anion such as nitrate or nitrite and another reactant may be hydrogen fluoride such as ammonium bifluoride.

In a specific embodiment, nanostructured conversion material is formed by atomically mixing precursor materials in their liquid state. More specifically, an implementation provides a method forming a nanostructured conversion material. The method includes providing a first precursor material that includes a metal-containing material. For example, the metal-containing material includes iron and/or other metal materials. A second precursor material is also provided. The second precursor material includes an oxidizing anion material, such as a fluoride material. The first precursor material and the second precursor material are characterized by a tendency of phase separation. Phase separating materials have a positive enthalpy of mixing. In their stable states, phase separating materials segregate to form distinct regions primarily composed of each individual material. It is to be appreciated that since the two precursor material has a tendency of phase separation, it is difficult to manufacture the nanostructured glassy conversion material with the two precursor materials without using the processes described according embodiments of the present invention herein.

In an atomization process, the two precursor materials are melted into their respective liquid states and injected into a cooled chamber that quenches the materials into an unstable or meta-stable state. For example, the first precursor material and the second precursor material have different melting temperature, and thus can be melted separately or together at a temperature above the melting point. Depending on the specific implementation, the mixing and injection the two precursor materials can be performed in different sequences. In a specific embodiment, the two precursor materials are placed together as late as possible in the process prior to injection. While placed together in their liquid state, the two precursor materials are then injected to a cooling chamber through a single nozzle. For example, the nozzle forces the two precursor materials into small-sized particles or nanodomains, which allows mixing at an atomic level to occur, and the material is quenched rapidly to "freeze in" the mixed state.

Alternatively, the two precursor materials can be injected separately by two or more nozzles into the cooling chamber, and mixing take places solely within the cooling chamber. At the cooling chamber, the two precursor materials are mixed at scale of less than about 20 nm to become a formed particle consisting of nanostructured mixture of the two precursors. Since the two precursor materials have a tendency to have phase separation, the form particles or nanodomains need to be cooled rapidly to stay in the mixed and nanostructured state. In various embodiments, the formed particles or nanodomains are cooled a rate of least about 100 degrees Kelvin per second. In a specific embodiment, the rate of cooling is close to 10,000 degrees kelvin per second. For example, the formed particles or nanodomains are cooled to a room temperature and are sufficiently stable in the nanostructured and mixed state. Cooling may be performed in various ways. In an implementation, cooling is performed by an injected cold inert gas into the cooling chamber. In another implementation, cooling is performed by a cold surface such as a cold copper drum or anvil. The formed particles or nanodomains are then collected. For example, additional processes are performed to use the formed particles or nanodomains as conversion material in a battery cell.

It is to be appreciated that the conversion material can be processed using different techniques, according to various embodiments of the present invention. For example, instead of using a cooling chamber to generate formed particles or nanodomains, a cooling surface can be used. In a specific embodiment, a spinning cooling surface is provided, and the formed particle or nanodomain is quickly cooled as a result of direct contact to the cooling surface.

As mentioned, nanostructured conversion materials may be formed by evaporation processes. In many evaporation techniques, a precursor material is heated to a temperature at which it has a significant vapor pressure and then allowed to deposit on a substrate to a nanoscale thickness. Such techniques include thermal evaporation, e-beam evaporation, vapor phase deposition, close-space sublimation, etc. Depending on the application, precursor material(s) may or may not have a tendency to have phase separation. In their respective vapor state, the two precursor materials are mixed in a chamber to form a mixed material within the chamber, and the mixed material is characterized by a length scale of less than about 20 nm. Cooling may take place naturally or by contact with a cold surface or cold gas. The mixed material is then collected.

To deposit an iron fluoride compound as described herein, co-evaporation of iron and fluorine containing material may be performed so that the two principal components of the material mix in the gas phase before they are deposited on the substrate to form nanodomains or particles having a length scale of about 20 nm or less. In another embodiment, sources of each of the individual components of the composition are separately of evaporated and deposited onto the substrate so that the components form distinct layers. By maintaining these layers at sufficiently thin dimensions, and in appropriate mass ratios, the desired compound is formed. Typically, each layer is quite thin, typically on the order of a nanometer or smaller. The mass ratios are chosen to produce an active compound or mixture having the molar ratios or stoichiometries set forth elsewhere herein.

One example of a suitable evaporation technique is vapor transport deposition or flash evaporation. It provides continuous deposition of the desired film material by saturating a carrier gas with a vapor from a subliming source. The saturated mixture is directed over a substrate at a relatively low temperature, resulting in a supersaturation condition and subsequent film growth. In one implementation, a reactor employs a separate powder source for fluorine and iron. A helium source blows heated helium into the powders which are sublimated and transported into the reactor where, in the vapor phase, the components mix before being deposited on a cold substrate. In an appropriately designed apparatus, each of the powders is provided via a separate tube, and during transport through the tube, the powder is vaporized by the hot helium or other carrier gas. A non-limiting list of evaporation sources may include LiF, FeF3, FeF2, LiFeF3, Fe, and Li. The evaporated source material may be exposed to a reactive process in an ambient gas or plasma produced by a fluorine-containing material such as $F_2$, $CF_4$, $SF_6$, $NF_3$, etc. Appropriate precursors for an $FeLi_aF_b$ compound may include iron nanoparticles, iron (II) fluoride, iron (III) fluoride, stainless steel, lithium metal, lithium fluoride, or vapor phase precursors such as $F_2$, $CF_4$, $SF_6$, and $NF_3$.

In certain embodiments, a positive electrode and associated half-cell may be prepared by the following process:
Mix 5 wt % superP carbon, 5 wt % PVDF binder, with balance 90 wt % comprised of 3 mol % LiN and 1 mol % FeF3. Mix that powder with 4× by weight of NMP, and add 1% of a surfactant such as oleic acid or oleylamine Mill via high energy milling (Spex 8000M) in a hardened stainless steel vial with hardened stainless steel balls for 1 hour, or wet milling (Fritsch Pulverisette 7 or Netzsch microcer) in a ceramic vial with a ceramic agitator and yttria-stabilized zirconia beads of 0.1 mm or smaller for 4 hours. Coat that mixture on a Cu or Al foil via microgravure or capillary coating to create a wet coating of 1 um. Dry in an inert environment until the solvent is evaporated. Transfer without exposure to atmosphere to a vacuum chamber to deposit an electrolyte via sputtering or evaporation of $Li_3PO_4$. To test in a half-cell format, transfer the wafer to an inert environment, press 100 um thick Li foil on top, press a stainless steel disk on the Li foil, and contact the stainless steel disk with one electrode and the bottom foil underneath with the other electrode. Test the wafer at 100° C. in an oven or on a hotplate by performing a galvanostatic test between 1V and 4V.

Cell Construction

The above disclosure describes various elements of a battery including current collectors, anodes, cathodes, and electrolytes. Conventional format battery designs may be employed. These include both cylindrical and prismatic configurations such as those employed in consumer electronics, electric vehicles, medical devices, uninterruptable power supplies, etc. The size and footprint of these batteries may be similar to those of conventional format batteries such as A, AA, AAA, C, 18650, etc.

While the specification has focused primarily on solid state electrolytes, it should be understood that the positive electrodes disclosed herein may be employed in batteries using liquid and gel electrolytes as well.

Figure 5:
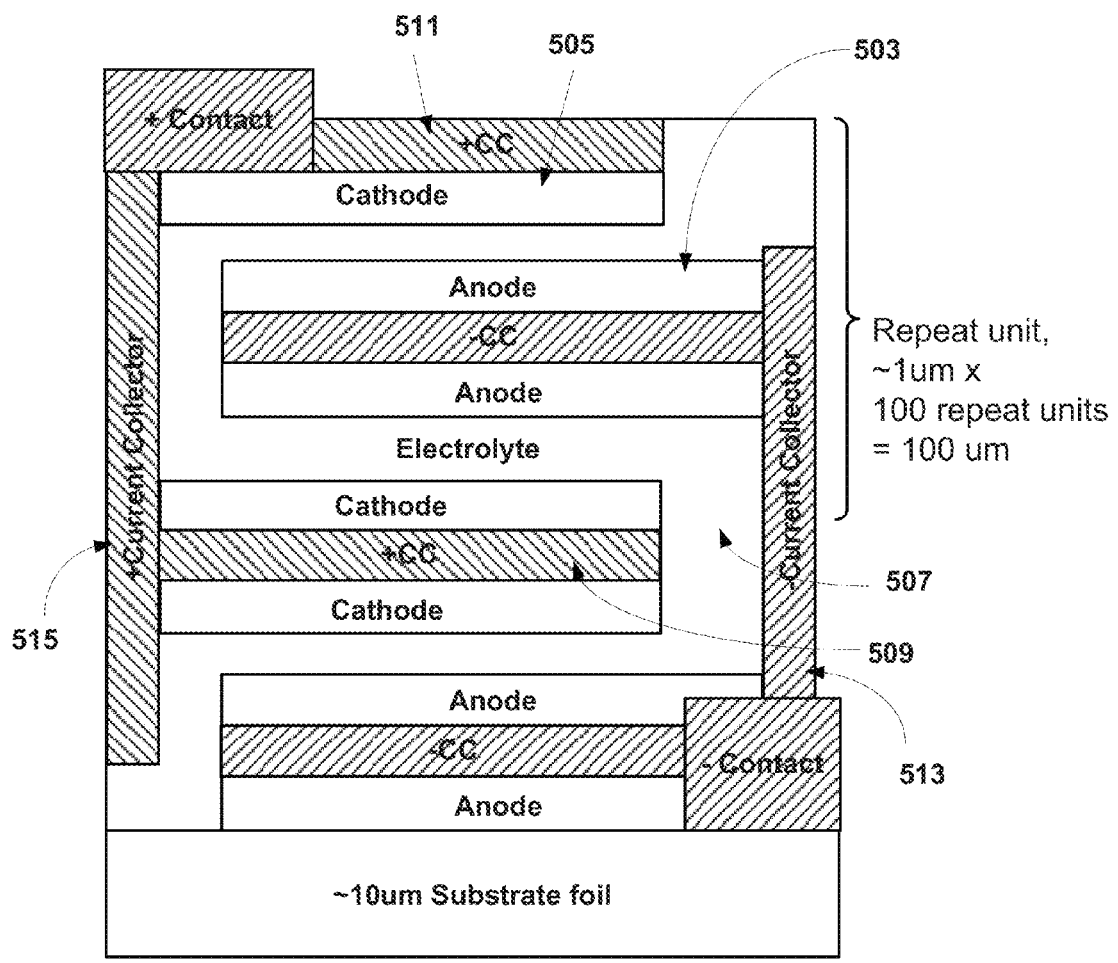
FIG. 5 presents an example of a small multi-stack battery configuration.

FIG. 5 presents an example of a small multi-stack battery configuration. While the depicted device shows only two anodes 503 and two cathodes 505, the concept is readily extendable to designs having more, and often many anodes and cathodes; for instance 100 layers of anode/electrolyte/cathode, each layer on the order of a 100 nm thick.

The anodes 503, cathodes 505, and electrolyte 507 may have compositions, properties, and/or morphologies disclosed above.

Note that there is a current collector disposed between two layers of active material in each electrode. These current collectors (509 and 511) are horizontally oriented in the depicted embodiment. These individual electrode current collectors are electrically connected to a bus or vertical current collector (513 and 515) as depicted in the figure. Solid electrolyte not only separate adjacent anodes and cathodes but also separates the electrodes from the vertical current collectors of the opposite polarity.

In various embodiments, the device is provide with a battery maintenance or battery controller apparatus such as a battery charger and associated circuitry for controlling discharge and/or charge parameters such as cut off voltages, cut off capacities, current, temperature, and the like.

Experimental Results

Figure 6:
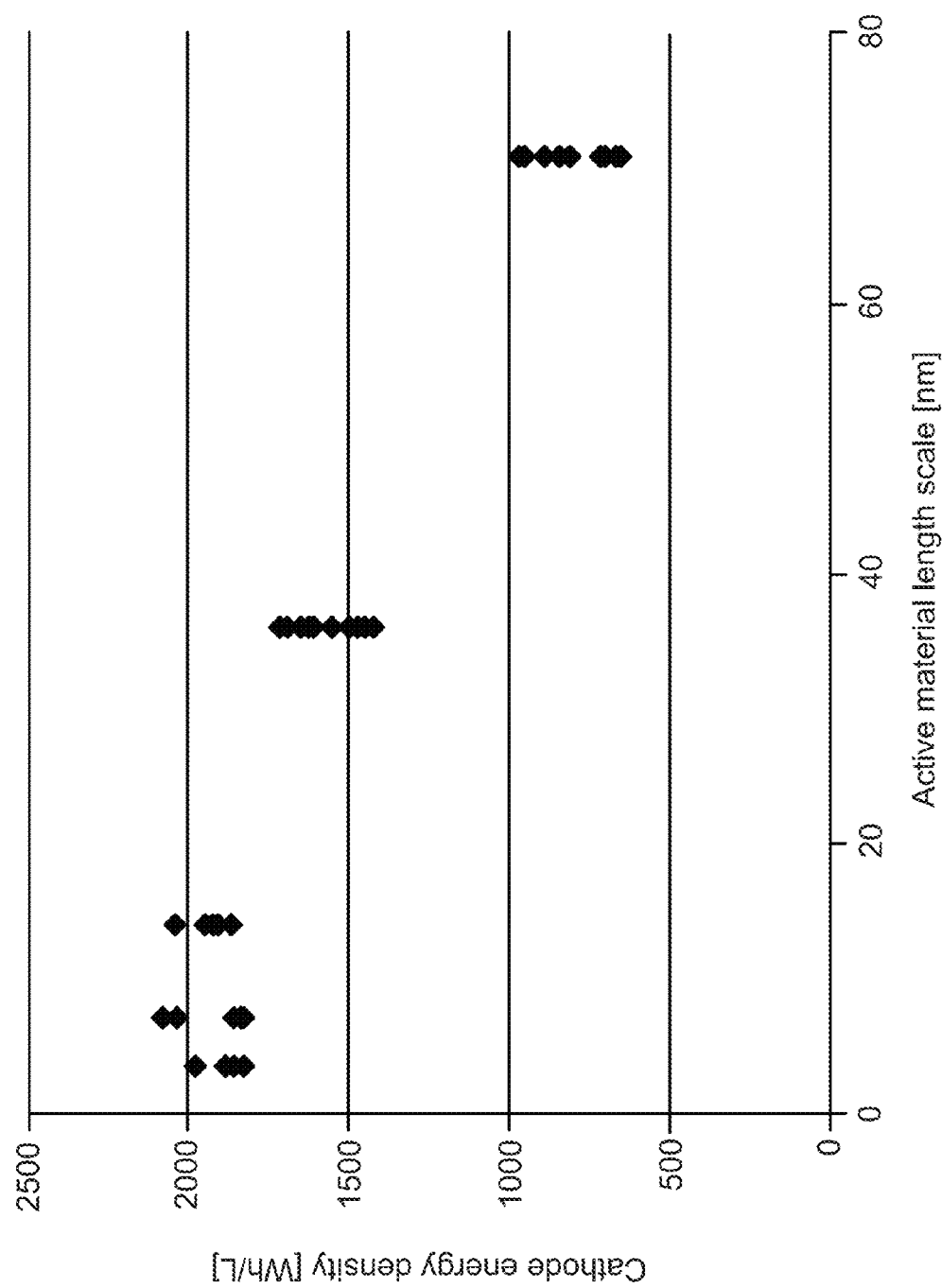
FIG. 6 presents a plot of cell performance measured by cathode volumetric energy density versus LiF in a laminate structure.

FIG. 6: A plot of cell performance measured by cathode volumetric energy density versus the LiF material of small length scale in a laminate structure. The energy density is measured by galvanostatic discharge between 1 to 4V vs Li at a 10 C rate and 120° C.; all the cells are an equal total thickness (e.g. a cell with length scale 35 nm has twice as many layers as a cell with length scale 70 nm). Cells are constructed by sputtering 30 nm Ti and 40 nm TiN on a Si wafer, then sputtering the cathode layers, then a 200 nm LiPON electrolyte. Li foil of 100 um thickness is punched out in a circle of 0.3 cm² area and pressed on to define the cell area. Electrical contacts are made to the TiN and Li foil for measurement on a hot plate maintained at 120° C.

The laminates are created by making sequential layers of Fe and LiF in the thickness ratio of 1:7, which creates a discharged cell with stoichiometry ~Fe+3 LiF. As the length scale increases, the cathode performance degrades, showing the benefit of nanostructuring cathodes (or cathode particles) down to less than 10 nm.

A table summarizing the data from FIGS. 7-10 below. It is useful to note that modest amounts of sulfur in the cathode significantly improves the electrode's mass loading ability.

| | Composition | | | |
|---|---|---|---|---|
| | 3LiF +Fe | 3LiF + Fe | 3LiF + Fe + $S_{0.14}$ | 3LiF + Fe + $S_{0.53}$ |
| Thickness | 66 nm | 129 nm | 134 nm | 134 nm |
| Energy retention at 10 C vs 1 C | 88% | 58% | 83% | 106% |
| Voltage hysteresis at 1 C rate | 0.89 V | 0.72 V | 0.72 V | 0.75 V |
| Voltage hysteresis at 10 C rate | 0.91 V | 0.92 V | 0.88 V | 0.61 V |

Figure 7:
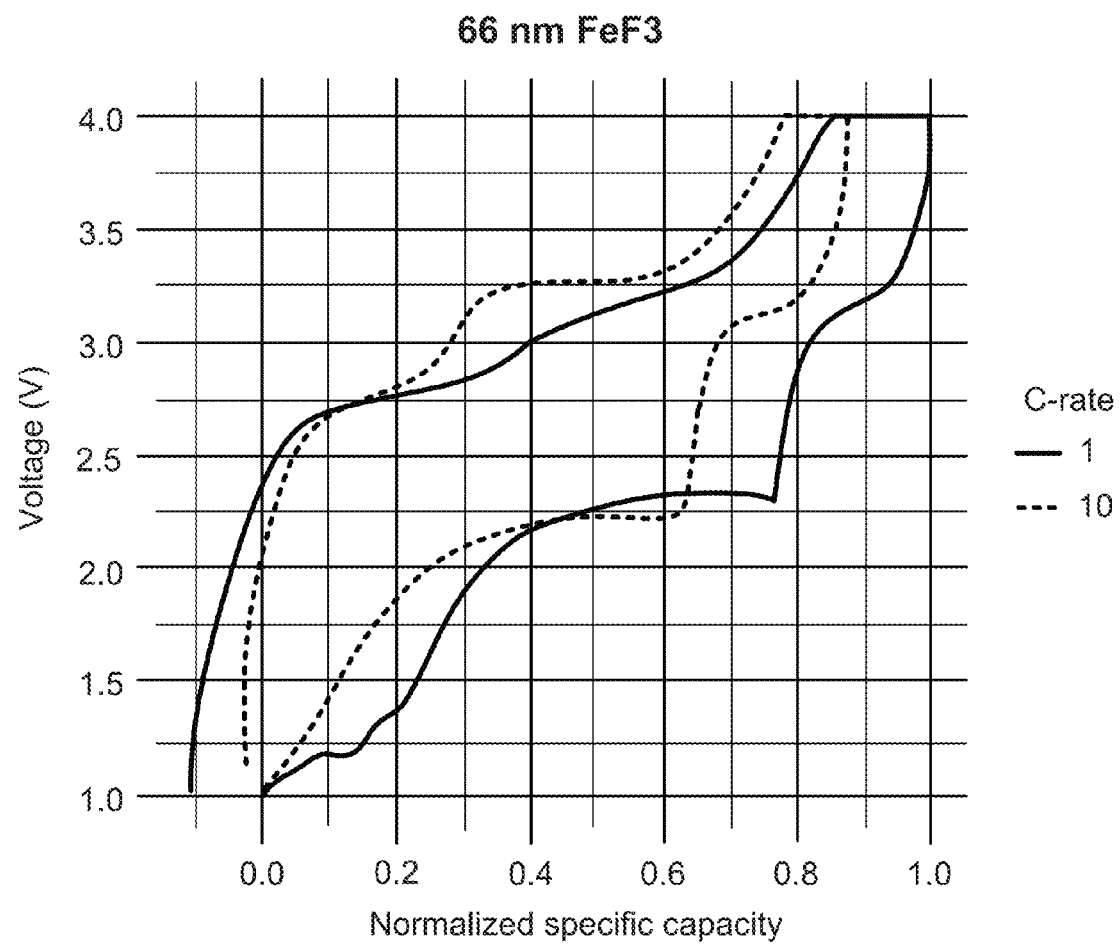
FIG. 7 presents a plot of constant current charge and discharge of a 66 nm cathode of 3LiF+Fe at 120° C.

FIG. 7: A plot of constant current charge and discharge of a 66 nm cathode of 3LiF+Fe at 120° C. The cell is constructed and measured as above, at C-rates of 10 C (dotted line) and 1 C (solid line). The energy density at 10 C is 88% as high as at 1 C, the voltage hysteresis is 0.89V at 1 C and 0.91V at 10 C. There is a marked degradation in performance of a 66 nm cathode of 3LiF+Fe as a function of C-rate.

Figure 8:
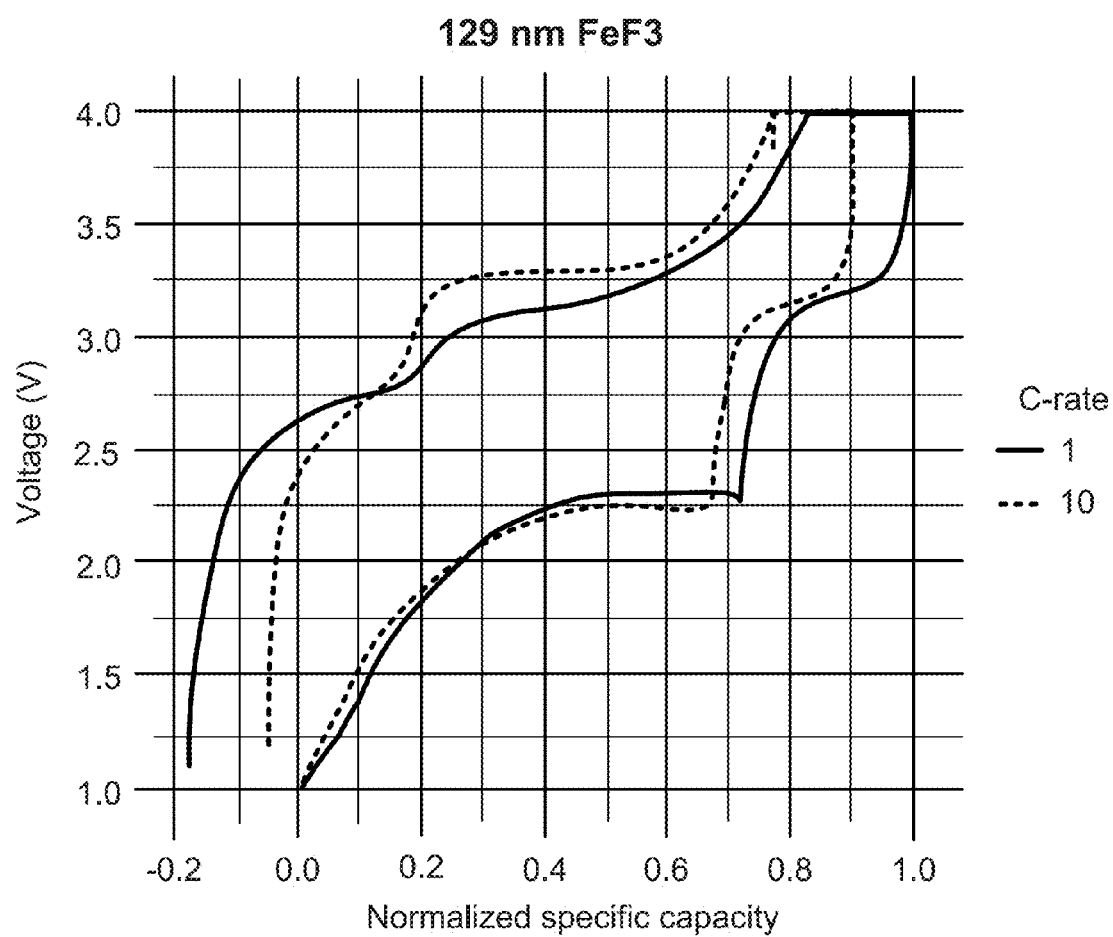
FIG. 8 presents a plot of constant current charge and discharge of a 129 nm cathode of 3LiF+Fe at 120° C.

FIG. 8: A plot of constant current charge and discharge of a 129 nm cathode of 3LiF+Fe at 120° C. The cell is constructed and measured as above, at C-rates of 10 C (dotted line) and 1 C (solid line). The energy density at 10 C is 58% as large as that at 1 C, the voltage hysteresis is 0.92V at 10 C and 0.72V at 1 C. The degradation of performance versus rate is even more significant as the cathode becomes thicker, an indication that performance is limited by mass transfer.

Figure 9:
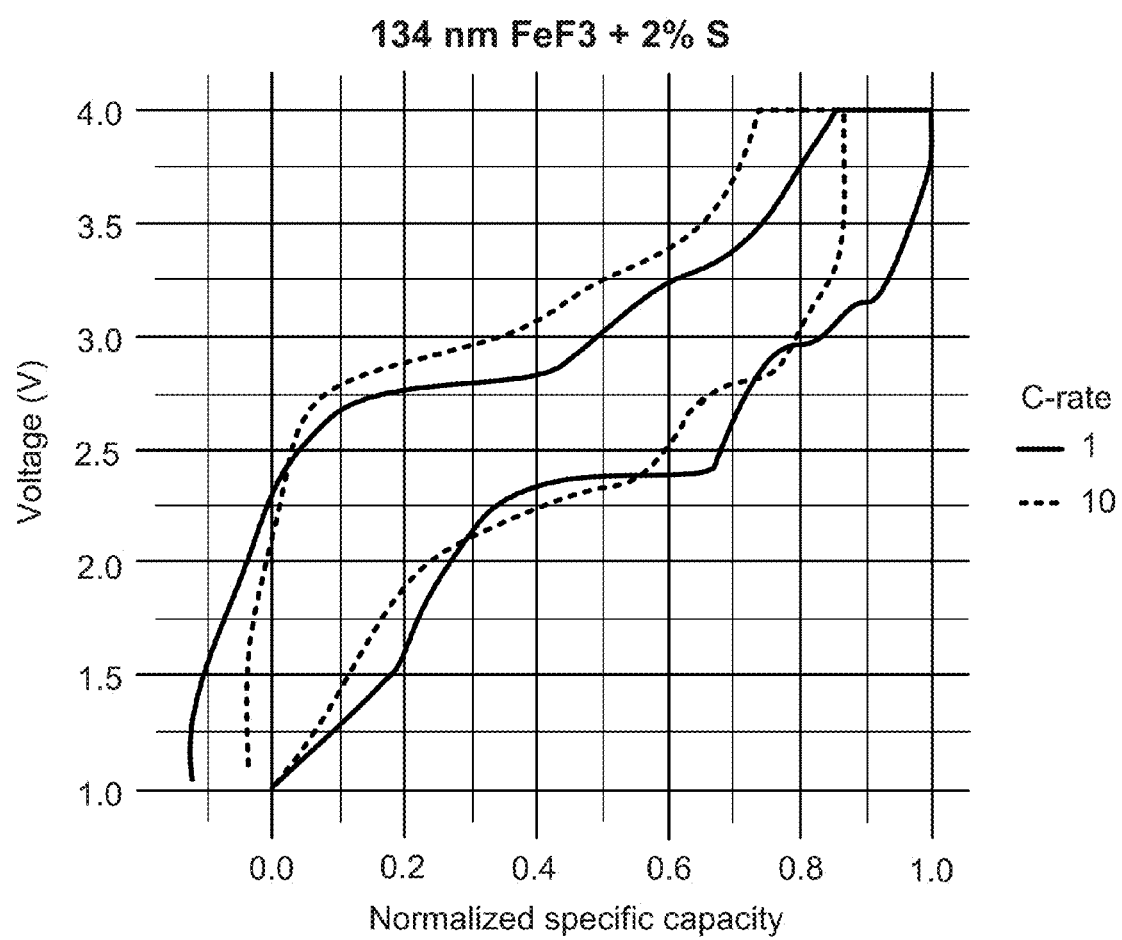
FIG. 9 presents a plot of a constant current discharge of a cell whose cathode is 134 nm (3LiF+Fe+$S_{0.14}$).

FIG. 9: a plot of a constant current discharge of a cell whose cathode is 134 nm (3LiF+Fe+$S_{0.14}$). The cell is constructed and measured as above, at C-rates of 10 C (dotted line) and 1 C (solid line). The energy density at 10 C is 83% that at 1 C, the voltage hysteresis at 1 C is 0.72V and at 10 C is 0.88V. Compared to a cathode of similar thickness and no sulfur content in FIG. 3, this cathode has much better rate performance, showing a marked benefit from 2% S content.

Figure 10:
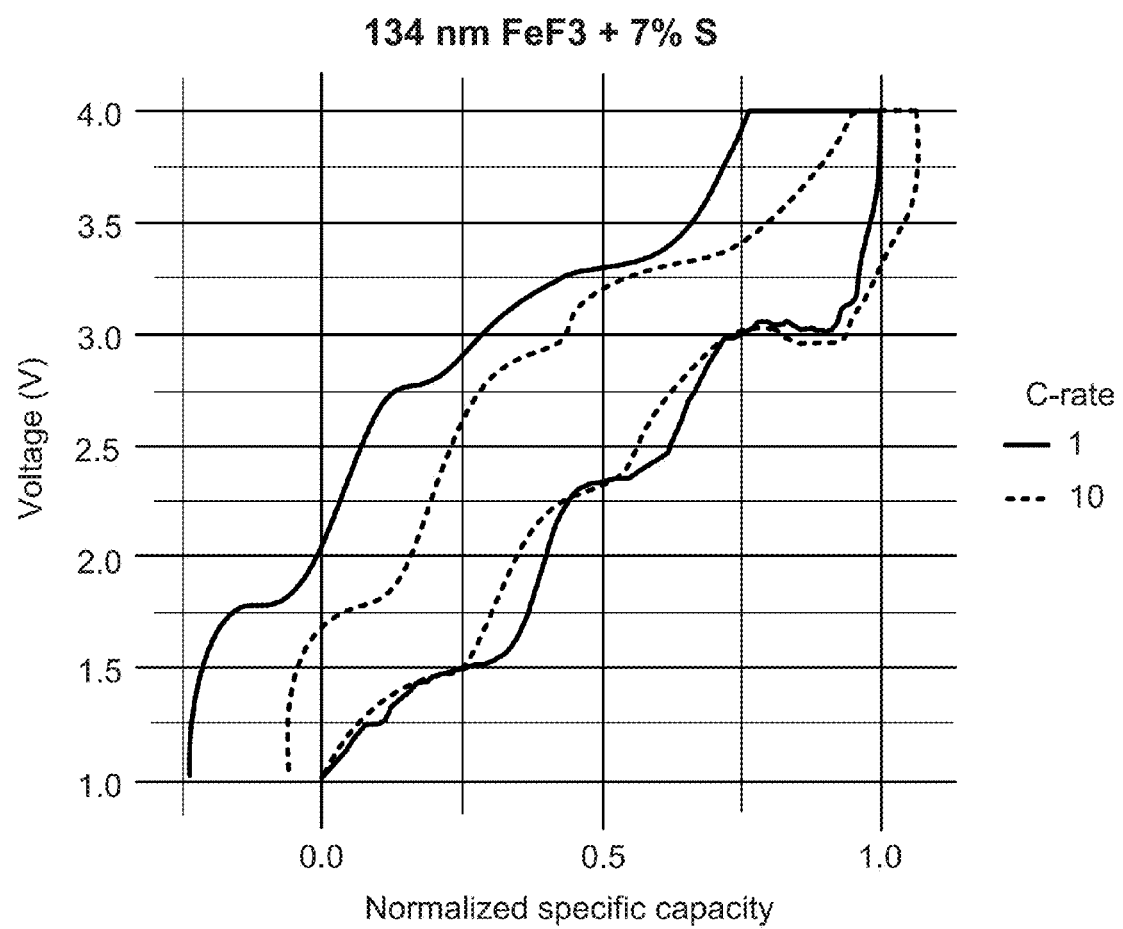
FIG. 10 presents a plot of a constant current discharge of a cell whose cathode is 134 nm (3LiF+Fe+S$_{0.53}$).

FIG. 10: A plot of a constant current discharge of a cell whose cathode is 134 nm (3LiF+Fe+$S_{0.53}$). The cell is constructed and measured as above, at C-rates of 10 C (dotted line) and 1 C (solid line). The data at 10 C shows a 106% higher energy density than 1 C, a capacity-averaged voltage hysteresis of 0.61V vs 0.75V at 1 C, and an energy efficiency of 74% versus 64% at 1 C. Within the statistical variation, there is virtually no degradation in performance at 10 C versus 1 C, showing that the sulfide loading of 7% has substantially improved the cell mass transport.

Figure 11:
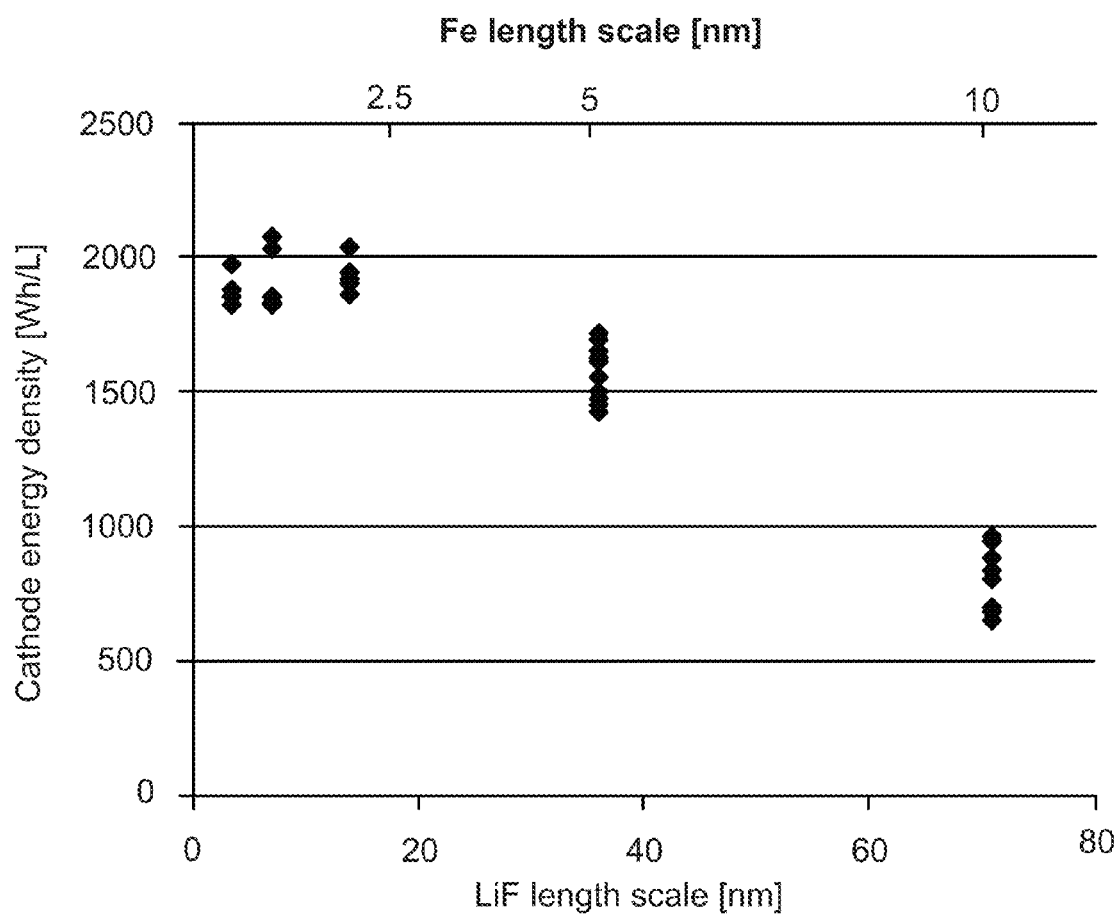
FIG. 11 provides a plot of cell performance measured by cathode volumetric energy density versus the LiF material length scale in a laminate structure.

As described above, cathode energy density is improved by nanostructured conversion materials according to embodiments of the present invention. FIG. 11 provides a plot of cell performance measured by cathode volumetric energy density versus the LiF material length scale in a laminate structure. The energy density is measured by galvanostatic discharge between 1 to 4V vs Li at a 10 C rate and 120° C. All the measured cells, which the plot is based upon, have substantially the same total thickness (e.g., a cell with length scale 35 nm has twice as many layers as a cell with length scale 70 nm). As shown in FIG. 11, as the LiF length scale is less than 40 nm and the Fe length scale is about 5 nm, the cathode energy density is about 1500 Wh/L or even greater. When the LiF length scale is less than 20 nm and the Fe length scale is less than about 5 nm, the cathode energy density about 2500 Wh/L or greater. It is to be appreciated that the high energy density can be achieved due to the nanostructuring of the particles. The nanostructure can be formed in various ways according to embodiments of the present invention, as described below.

Figure 12:
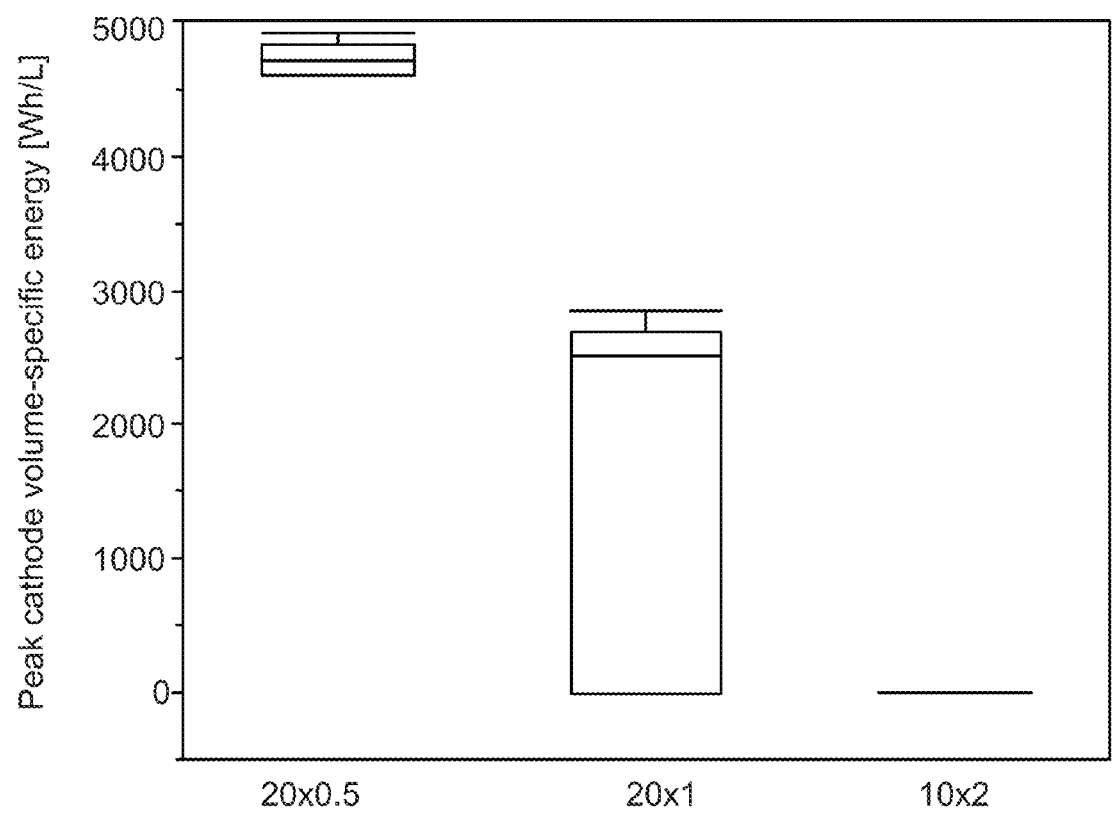
FIG. 12 is a plot of cell performance measured by cathode volumetric energy density versus Fe length scale in a laminate structure.

FIG. 12 is a plot of cell performance measured by cathode volumetric energy density versus the Fe material at small length scale in a laminate structure. The energy density is measured by galvanostatic discharge between 1 to 4V vs Li at a 10 C rate and 120° C. in a full cell configuration. For the purpose of the measurement, cells are constructed by sputtering 50 nm Pt on a Si/SiO$_2$ wafer, then sputtering the cathode layers, then a 200 nm LiPON electrolyte. A top electrode of Fe is sputtered on in a defined area, and during charge, Li is plated onto the Fe surface, creating an anode in situ. Electrical contacts are made to the Pt and Fe for measurement on a hot plate maintained at 120° C. The laminates are created by making sequential layers of Fe and LiF, as described above, in the thickness ratio of 1:3, which creates a discharged cell with stoichiometry ~Fe+3 LiF. As the length scale increases, the cathode performance degrades, showing the benefit of nanostructuring cathode morphology down to less than 2 nm. More specifically, as shown in FIG. 12, the cathode energy density versus layer structure plot shows that as the length scale decreases, the per volume energy density increases. The "20×0.5" on the x-axis denotes 20 layers of (0.5 nm Fe+1.5 nm LiF), "20×1" denotes 20 layers of (1 nm Fe+3 nm LiF), and "10×2" denotes 10 layers of (2 nm Fe+6 nm LiF).

Figure 13:
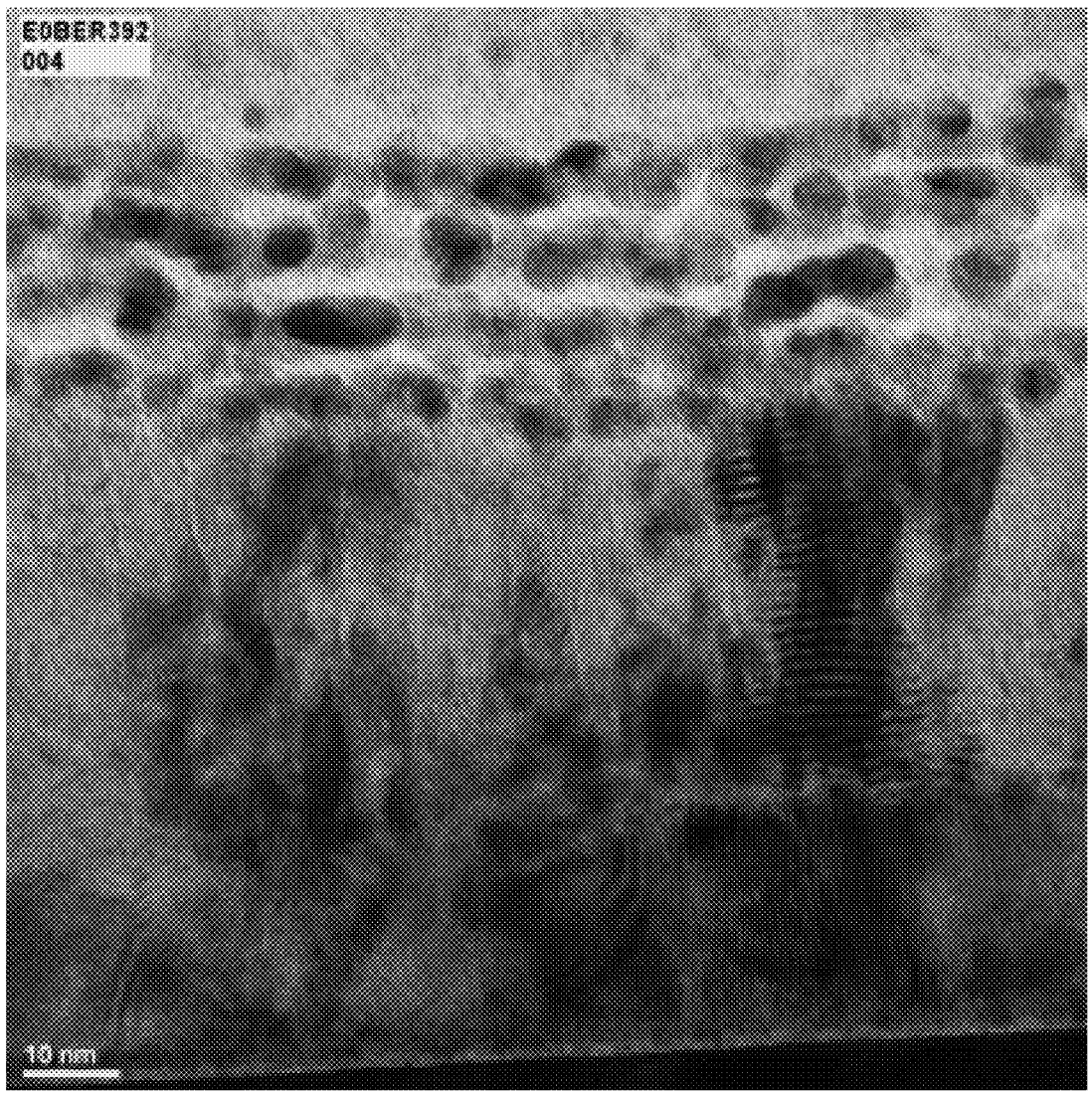
FIG. 13 provides a cross-section view of nanostructured conversion material on a scale of about 5 nm.

FIG. 13 provides a cross-section view of nanostructured conversion material on a scale of about 5 nm. As can be seen from FIG. 3 described above, the ~5 nm length scale does not perform as well as conversion material nanostructured at a finer scale (the low performance is an indication of less than ideal material structure). For example, the views shown in FIGS. 13-15 are a part of the cell structure shown in FIGS. 1A and B.

Figure 14:
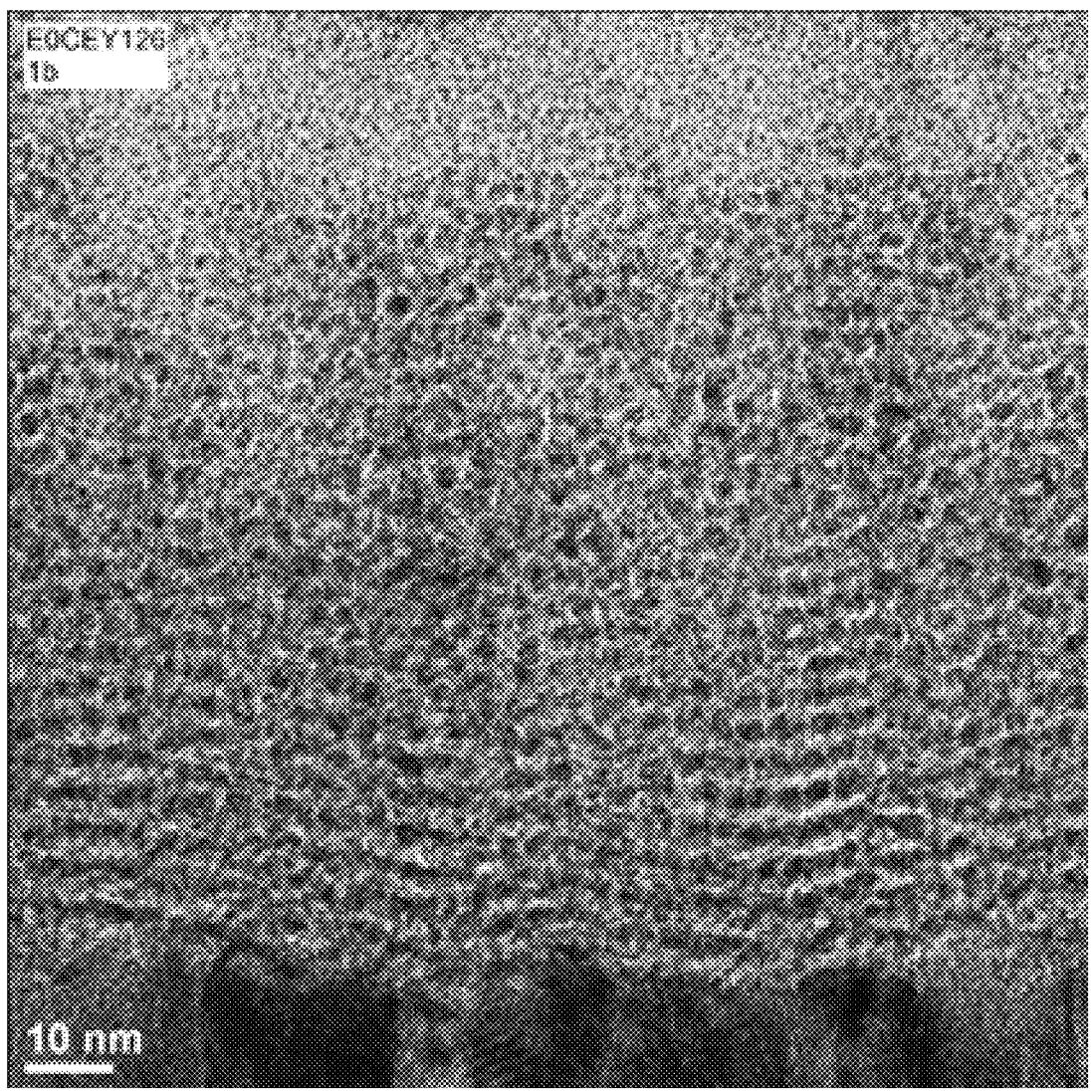
FIG. 14 provides a cross-section view of nanostructured conversion material on a scale of about 2 nm.

FIG. 14 provides a cross-section view of nanostructured conversion material on a scale of about 2 nm. At a smaller scale in comparison to FIG. 13, the nanostructured conversion material is performs better than the microstructure shown in FIG. 13.

Figure 15:
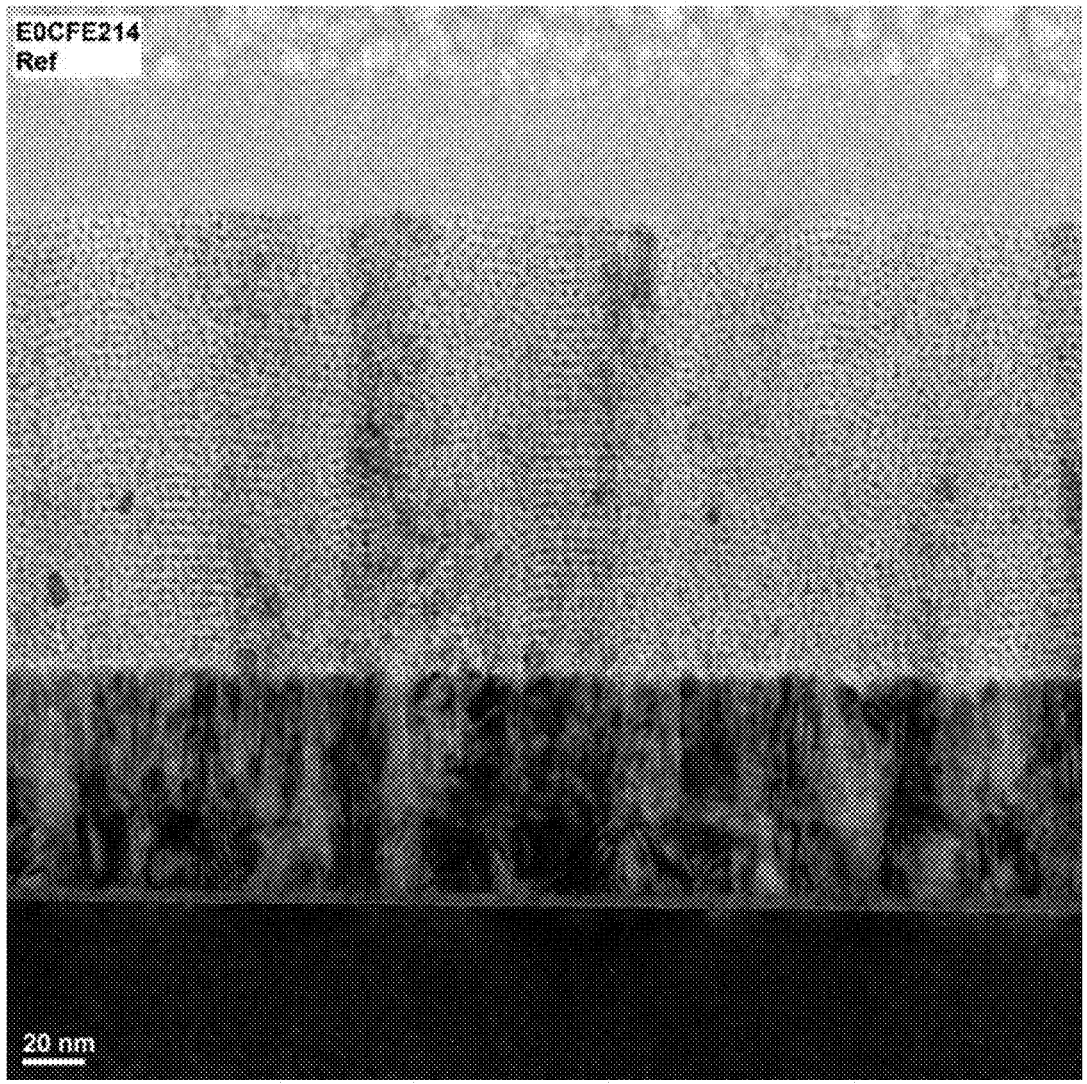
FIG. 15 provides a cross-section view of nanostructured conversion material on a scale of about 2 nm.

FIG. 15 provides a cross-section view of nanostructured conversion material on a scale of about 2 nm.

Figure 16:
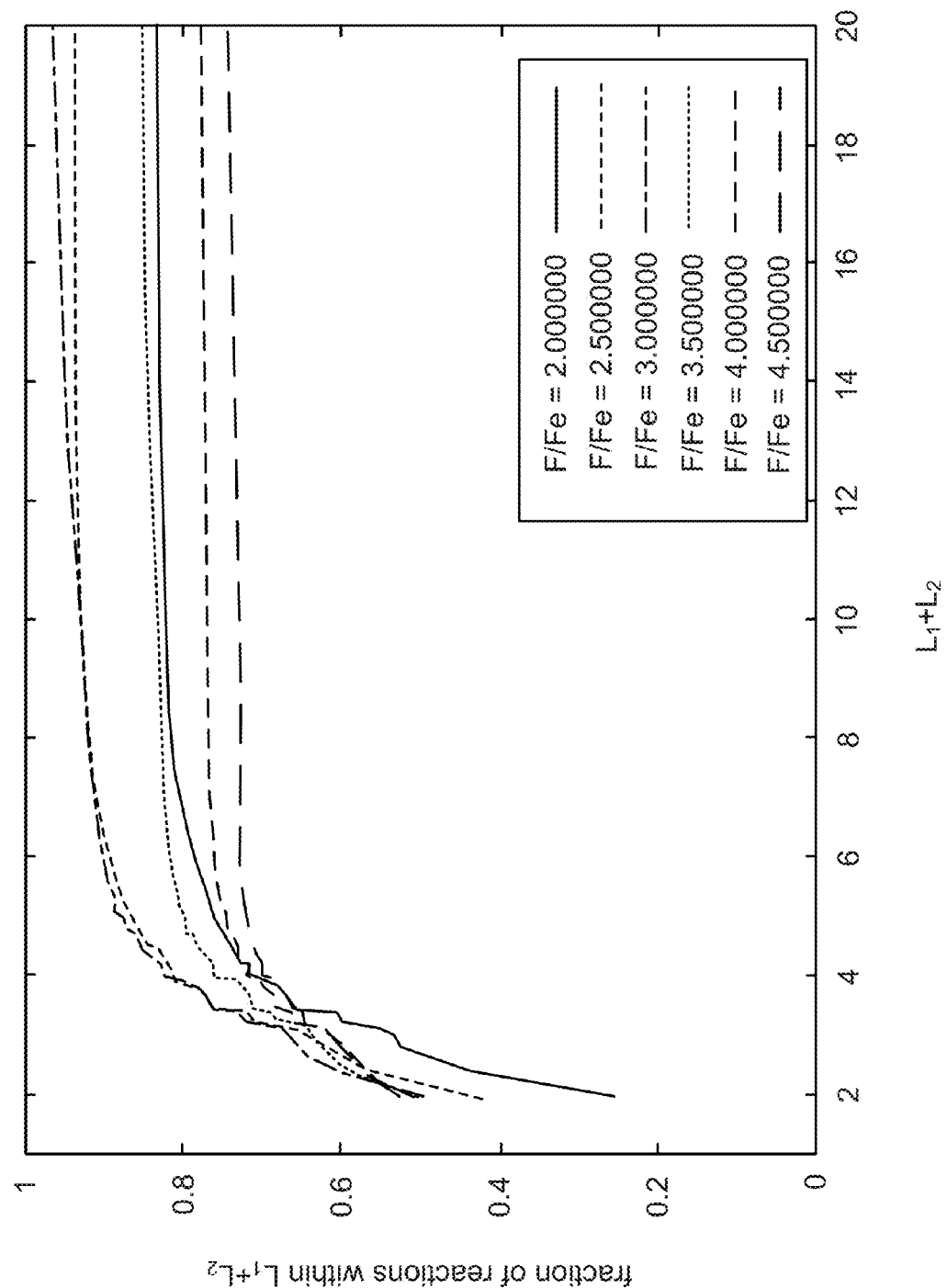
FIG. 16 is a plot illustrating an example of the benefits of nanostructuring a conversion material and maintaining uniformity of composition.
Figure 17:
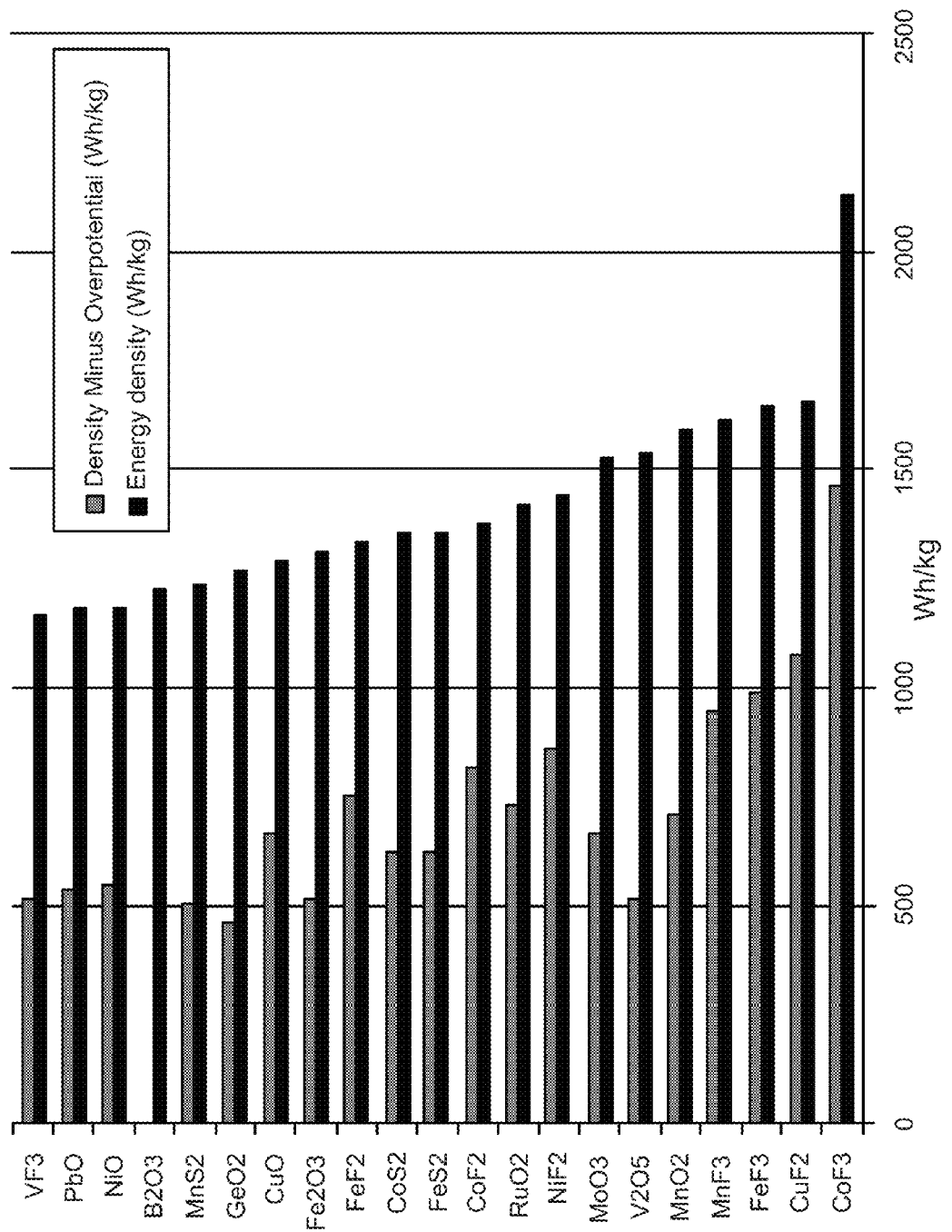
FIG. 17 presents theoretical energy density of lithiated conversion cathode materials versus a standard Li anode.

FIG. 16 is a plot illustrating an example of the benefits of nanostructuring a conversion material and maintaining uniformity of composition. For example, a model was created to count the number of reactions within a distance from any given atom. Assuming that a reaction such as Li+F+Fe→Fe-LiF is one step in the multistep FeF3 conversion lithiation reaction, this model computes the distances L1 and L2, where L1 is the distance between F and Li, and L2 is the distance between F and Fe. As can be seen from the calculation, a greater fraction of reactions may be completed within a shorter distance when the nearly correct stoichiometry of F/Fe=3 and F/Fe=2.5 are considered. This will lead to a battery with higher performance: higher efficiency, greater charge/discharge speed, and higher delivered energy. Therefore, a glassy/amorphous conversion material should be created in a manner that keeps near ideal stoichiometry uniformly throughout the material.

Figure 18:
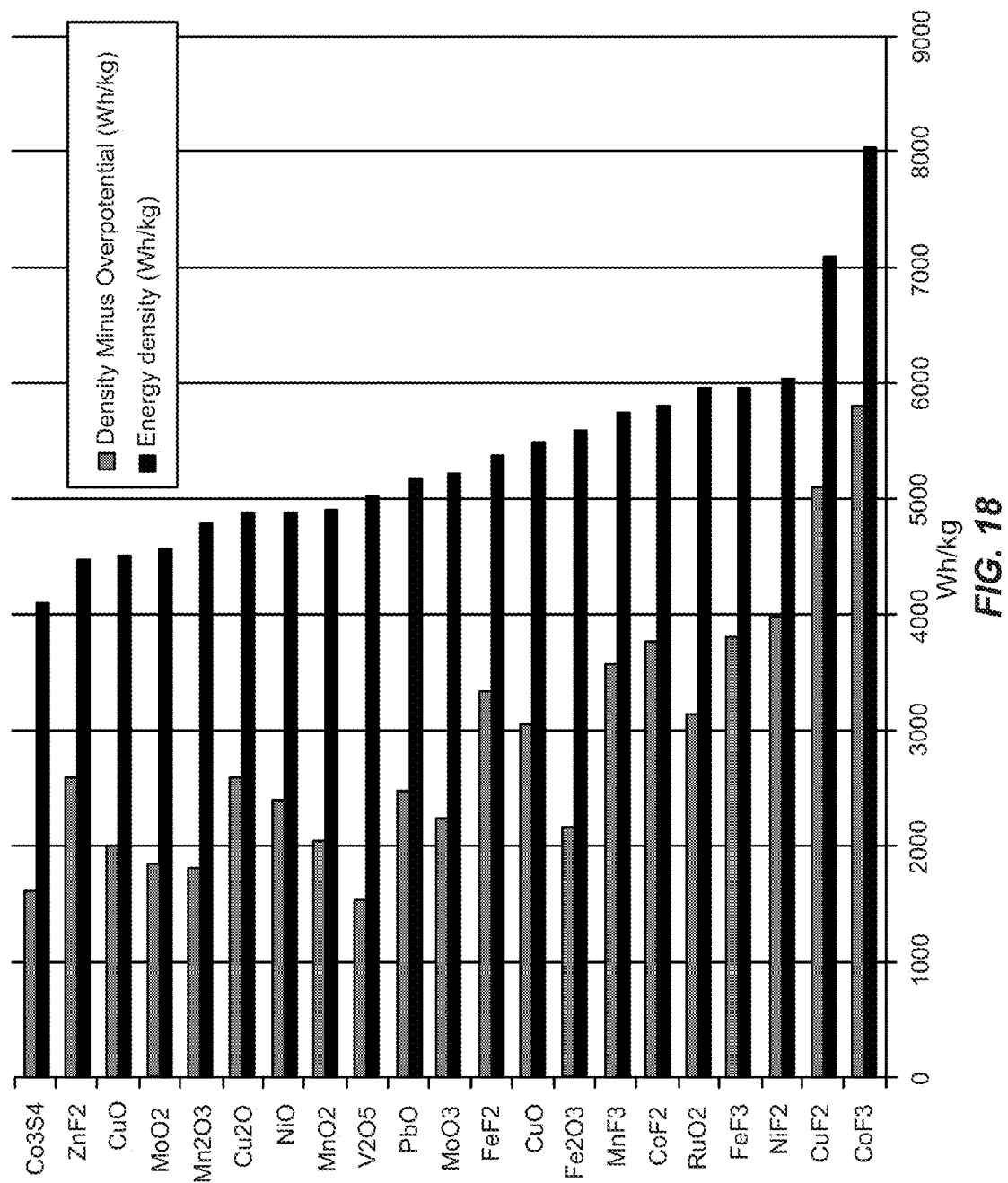
FIG. 18 presents theoretical specific energy of lithiated conversion cathode materials versus the standard Li anode.

FIG. 27 presents theoretical energy density of lithiated conversion cathode materials versus a standard Li anode. The overpotential is assumed to be 0.7V, accounting for the mass transport losses, activation losses at reasonable voltage, and hysteresis inherent to conversion reactions. FIG. 18 presents theoretical specific energy of lithiated conversion cathode materials versus the standard Li anode. Again, the overpotential is assumed to be 0.7V, accounting for the mass transport losses, activation losses at reasonable voltage, and hysteresis inherent to conversion reactions. The presented values are theoretical values, so full conversion at the thermodynamic potentials is assumed.

Figure 19:
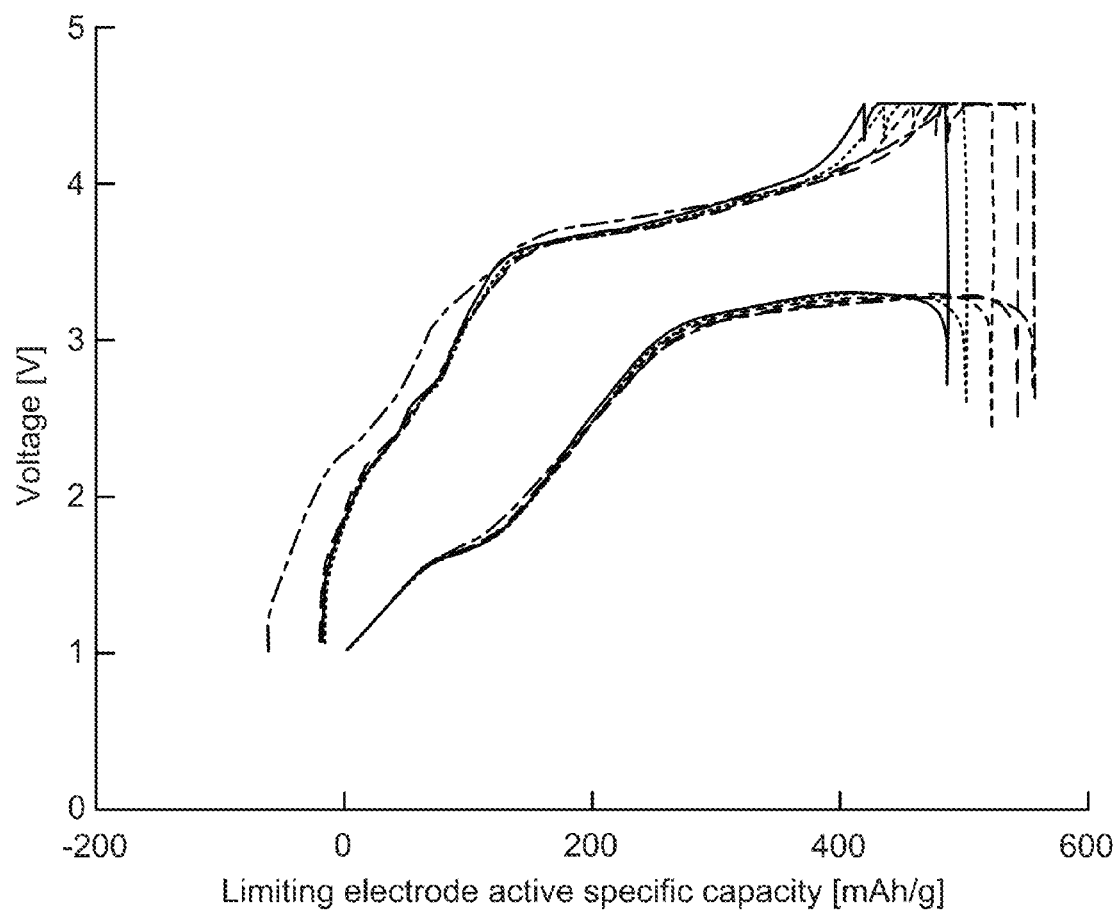
FIG. 19 presents a plot (voltage (measured against a standard lithium electrode) versus cathode material active capacity) for the first 5 cycles of charge/discharge of a cupric fluoride sample.

FIG. 19 presents a plot (voltage (measured against a standard lithium electrode) versus cathode material active capacity) for the first 5 cycles of charge/discharge of a cupric fluoride sample. As shown, this positive electrode active material demonstrates reversibility, with only moderate hysteresis, high average voltage, and near full capacity.

Figure 20:
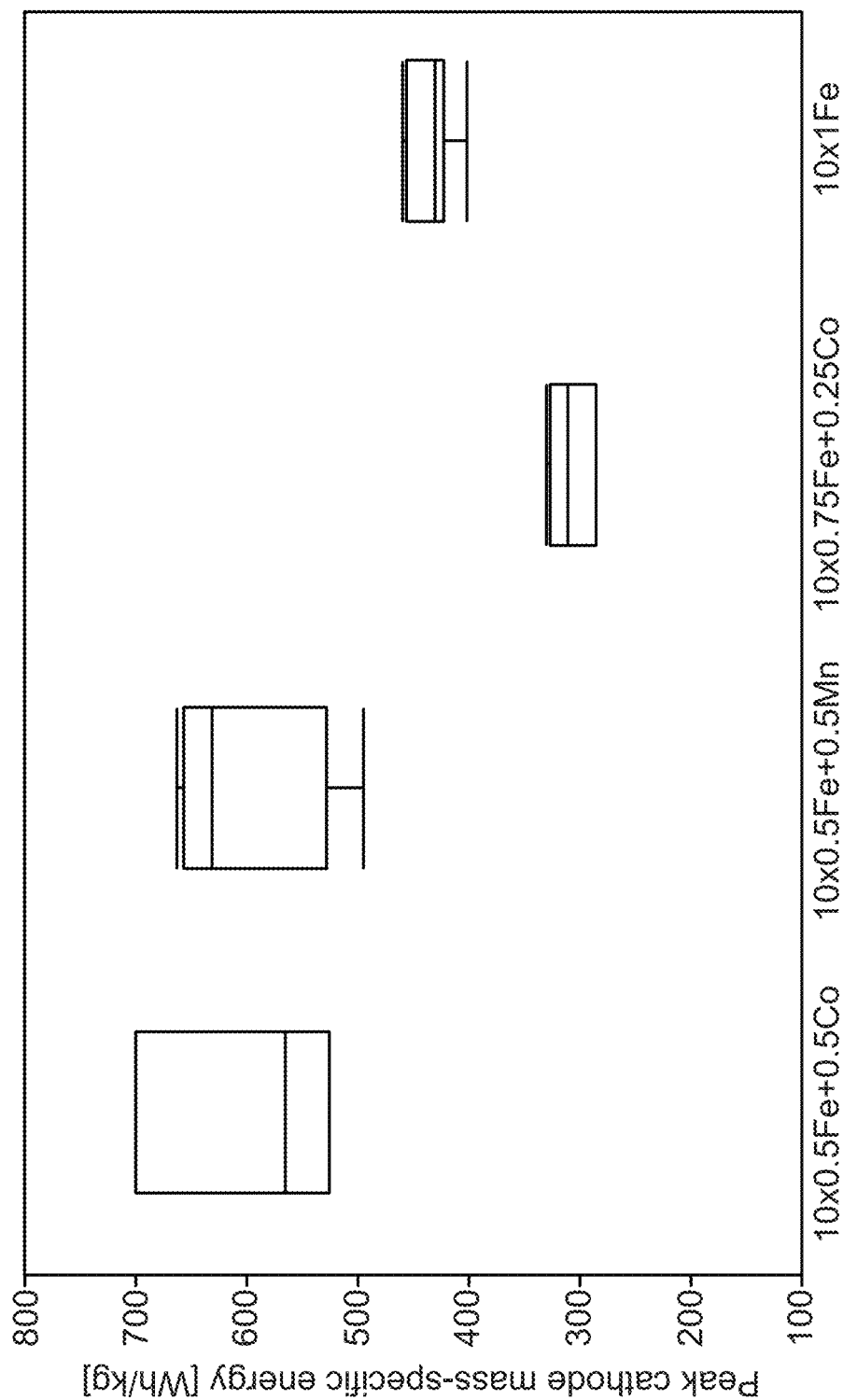
FIG. 20 presents discharge energy for samples containing certain transition metal alloys used in a conversion material.

FIG. 20 presents discharge energy for samples containing certain transition metal alloys used in a conversion material. Specifically, the conversion material compositions were FeCo+LiF, FeMn+LiF, Fe$_3$Co+LiF, and a control sample, Fe+LiF. The discharge rate was 10 C, and the discharge voltage limits are 4 to 1V versus a standard lithium metal electrode. The samples had a nominal thickness ratio of 7LiF:1M, where M is the metal, which was an alloy in the non-control cases. In each sample, ten layers of metal (at the recited compositions) were formed and ten layers of LiF were interleaved between the metal layers. As can be seen, the 50% Fe–50% Co and the 50% Fe–50% Mn samples provided particularly high specific capacities.

Figure 21:
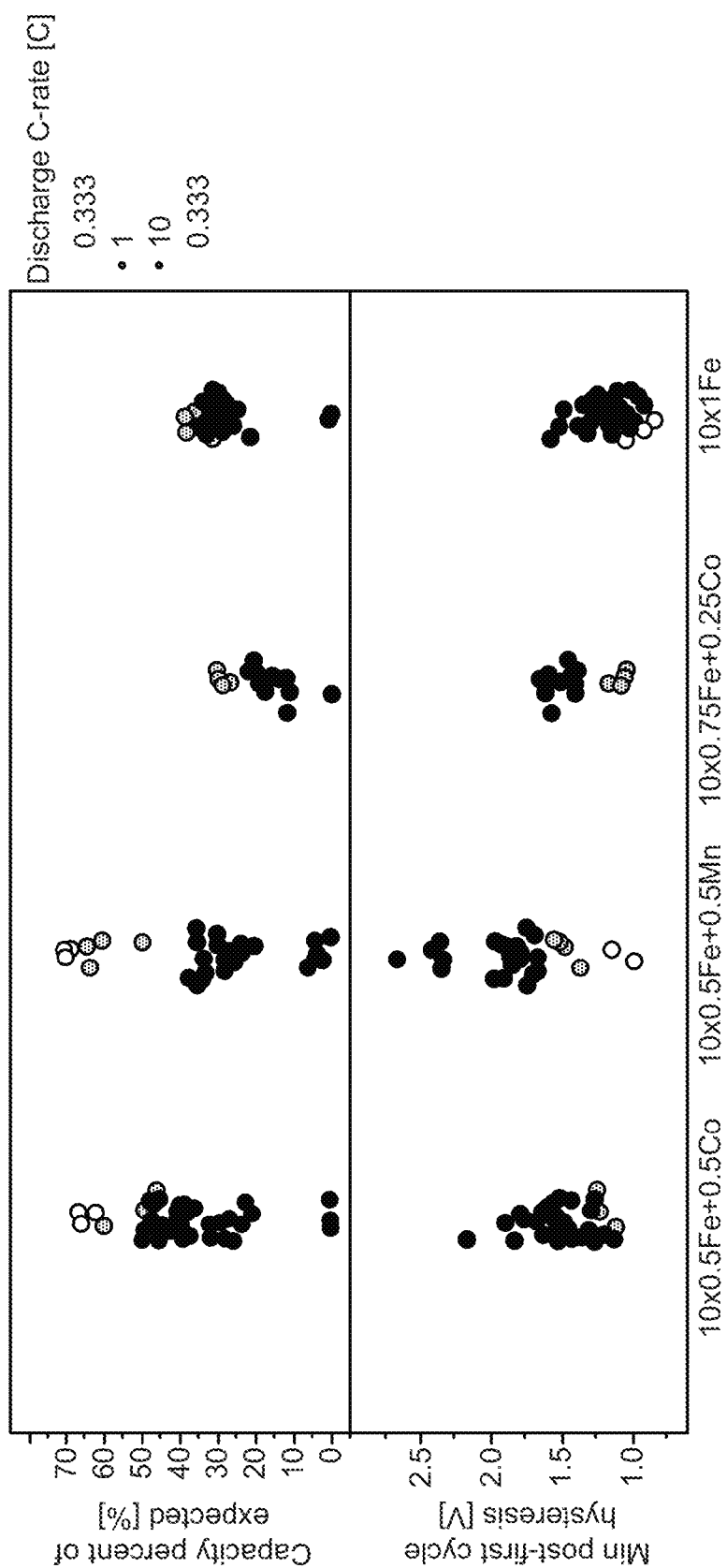
FIG. 21, capacity and hysteresis statistics are provided for the following conversion material samples: FeCo+LiF, FeMn+LiF, Fe$_3$Co+LiF, and a control sample of Fe+LiF.

In FIG. 21, capacity and hysteresis statistics are provided for the following conversion material samples: FeCo+LiF, FeMn+LiF, Fe$_3$Co+LiF, and a control sample of Fe+LiF. The samples were discharged at rates given as C/3, 1 C, 10 C in different colors (C/3 in white, 1 C in gray, and 10 C in black), and voltage limits were 4-1V versus a lithium metal electrode.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A positive electrode material comprising :
   composite particles or nanodomains comprising:
      in the discharged state:
         a metal component having a median characteristic length scale of between 3 nm and 10 nm and selected from the group consisting of iron, cobalt, manganese, copper, nickel, bismuth, and alloys thereof; and
         a lithium fluoride compound intermixed with the metal component, wherein substantially all of the lithium fluoride compound is characterized by an amorphous structure; and
      in the charged state:
         a metal fluoride component selected from the group consisting of iron fluoride, cobalt fluoride, manganese fluoride, copper fluoride, nickel fluoride, bismuth fluoride, and combinations thereof, wherein substantially all of the metal fluoride component is characterized by an amorphous structure.

2. The positive electrode material of claim 1, wherein the metal component is iron, manganese, or cobalt and the mole ratio of metal component to lithium fluoride compound is about 1:2 to 1:4.5.

3. The positive electrode material of claim 1, wherein the metal component is iron.

4. The positive electrode material of claim 1, wherein the metal fluoride component is iron fluoride.

5. The positive electrode material of claim 1, wherein the metal component is iron and the metal fluoride component is ferric fluoride.

6. The positive electrode material of claim 1, wherein the composite particles or nanodomains comprise individual particles of the positive electrode material.

7. The positive electrode of claim 1, further comprising $MoO_3$, $MoO_2$, $MoS_2$, $V_2O_3$, $V_2O_5$, or combinations thereof.

8. The positive electrode material of claim 1, wherein the metal component in the composite particles or nanodomains is present as metal nanodomains.

9. The positive electrode material of claim 1, wherein the positive electrode material further comprises a conductive additive.

10. The positive electrode material of claim 1, wherein the composite particles or nanodomains further comprise a mixed ion-electron conductor.

11. The positive electrode material of claim 1, wherein the composite particles or nanodomains further comprise a lithium ion conductor.

12. The positive electrode material of claim 11, wherein the lithium ion conductor comprises thio-LISICON, garnet, lithium sulfide, FeS, $FeS_2$, copper sulfide, titanium sulfide, $Li_2S$—$P_2S_5$, lithium iron sulfide, $Li_2S$—$SiS_2$, $Li_2S$—$SiS_2$—$Al_2S_3$, $Li_2S$—$SiS_2$—$GeS_2$, $Li_2S$—$SiS_2$—$P_2S_5$, $Li_2S$—$P_2S_5$, $Li_2S$—$GeS_2$—$Ga_2S_3$, or $Li_{10}GeP_2S_{12}$.

13. The positive electrode material of claim 1, wherein the metal component has a median characteristic length scale of 5 nm or less.

14. The positive electrode material of claim 1, wherein the composite particles or nanodomains are substantially homogeneous within a volume of about 1000 $nm^3$.

15. The positive electrode material of claim 1, wherein the metal component is an alloy of iron with cobalt, copper, nickel and/or manganese.

16. The positive electrode material of claim 1, wherein the lithium fluoride compound comprises lithium oxyfluoride.

17. A solid-state energy storage device comprising the positive electrode material of claim 1.

* * * * *